US010357714B2

(12) United States Patent
Challinor et al.

(10) Patent No.: US 10,357,714 B2
(45) Date of Patent: Jul. 23, 2019

(54) GESTURE-BASED USER INTERFACE FOR NAVIGATING A MENU

(75) Inventors: Ryan Challinor, Somerville, MA (US); Dare Matheson, Providence, RI (US); Kasson D. Crooker, Arlington, MA (US); Marc A. Flury, Rosemount, MN (US); Matthew C. Boch, Somerville, MA (US); Eran B. Egozy, Brookline, MA (US); Dean N. Tate, Cambridge, MA (US)

(73) Assignee: HARMONIX MUSIC SYSTEMS, INC., Boston, MA (US)

( * ) Notice: Subject to any disclaimer, the term of this patent is extended or adjusted under 35 U.S.C. 154(b) by 90 days.

(21) Appl. No.: 12/913,493

(22) Filed: Oct. 27, 2010

(65) Prior Publication Data

US 2011/0185309 A1 Jul. 28, 2011

Related U.S. Application Data

(60) Provisional application No. 61/255,462, filed on Oct. 27, 2009.

(51) Int. Cl.
*G06F 3/01* (2006.01)
*A63F 13/42* (2014.01)
(Continued)

(52) U.S. Cl.
CPC ............ *A63F 13/42* (2014.09); *A63F 13/213* (2014.09); *A63F 13/533* (2014.09); *G06F 3/011* (2013.01);
(Continued)

(58) Field of Classification Search
CPC .... G06F 3/017; G06F 3/04842; G06F 3/0485; G06F 8/34; G06F 3/0482
(Continued)

(56) References Cited

U.S. PATENT DOCUMENTS

| D211,666 S | 7/1968 | MacGillavry |
| 3,430,530 A | 3/1969 | Grindinger |

(Continued)

FOREIGN PATENT DOCUMENTS

| AT | 468071 T | 6/2010 |
| AU | 741239 B2 | 4/1999 |

(Continued)

OTHER PUBLICATIONS

"BVH File Specification", Character Studio, http://web.archive.org/web/20060321075406/http://character-studio.net/bvh_file_specification.htm, Mar. 21, 2006 (16 pages).
(Continued)

*Primary Examiner* — Doon Y Chow
*Assistant Examiner* — Le V Nguyen
(74) *Attorney, Agent, or Firm* — Wilmer Cutler Pickering Hale and Dorr LLP

(57) ABSTRACT

The invention includes methods, systems, computer program products and means for providing an intuitive user interface for interacting with a game console that obviates the need for, or use of, a typical game controller. In one embodiment, the user interface comprises an analog-like mechanism for manipulating a menu and icon system. The menu system allows the user to highlight a menu option or icon using movement along one axis and to activate the menu option or icon via movement on a different axis. In one embodiment, highlighting is associated with a vertical motion and activation is associated with a horizontal motion. The vertical motion can be tied to the vertical movement of a particular appendage, e.g., the up and down movement of the user's right arm, and the horizontal motion can be tied to the horizontal movement of that or another appendage, e.g., movement of the right arm or hand across the body from right to left.

16 Claims, 10 Drawing Sheets

(51) Int. Cl.
*A63F 13/533* (2014.01)
*A63F 13/213* (2014.01)
*G06F 3/0482* (2013.01)

(52) U.S. Cl.
CPC ............ *G06F 3/017* (2013.01); *G06F 3/0482* (2013.01); *A63F 2300/1087* (2013.01); *A63F 2300/308* (2013.01); *A63F 2300/6045* (2013.01)

(58) Field of Classification Search
USPC ........................................ 715/863, 822, 784
See application file for complete search history.

(56) References Cited

U.S. PATENT DOCUMENTS

| | | |
|---|---|---|
| 3,897,711 A | 8/1975 | Elledge |
| D245,038 S | 7/1977 | Ebata et al. |
| D247,795 S | 4/1978 | Darrell |
| 4,128,037 A | 12/1978 | Montemurro |
| D259,785 S | 7/1981 | Kushida et al. |
| 4,295,406 A | 10/1981 | Smith |
| D262,017 S | 11/1981 | Frakes, Jr. |
| D265,821 S | 8/1982 | Okada et al. |
| D266,664 S | 10/1982 | Hoshino et al. |
| D287,521 S | 12/1986 | Obara |
| 4,644,495 A | 2/1987 | Crane |
| 4,766,541 A | 8/1988 | Bleich et al. |
| 4,783,812 A | 11/1988 | Kaneoka |
| 4,794,838 A | 1/1989 | Corrigau, III |
| 4,843,568 A | 6/1989 | Krueger et al. |
| 4,890,833 A | 1/1990 | Lantz et al. |
| D310,668 S | 9/1990 | Takada |
| 5,074,182 A | 12/1991 | Capps et al. |
| 5,107,443 A | 4/1992 | Smith et al. |
| 5,107,743 A | 4/1992 | Decker |
| 5,109,482 A | 4/1992 | Bohrman |
| 5,140,889 A | 8/1992 | Segan et al. |
| 5,194,683 A | 3/1993 | Tsumura et al. |
| 5,208,413 A | 5/1993 | Tsumura et al. |
| 5,250,745 A | 10/1993 | Tsumura |
| 5,262,765 A | 11/1993 | Tsumura et al. |
| 5,287,789 A | 2/1994 | Zimmerman |
| D345,554 S | 3/1994 | Dones |
| 5,362,049 A | 11/1994 | Hofer |
| 5,368,309 A | 11/1994 | Monroe et al. |
| 5,393,926 A | 2/1995 | Johnson |
| 5,395,123 A | 3/1995 | Kondo |
| 5,398,585 A | 3/1995 | Starr |
| 5,399,799 A | 3/1995 | Gabriel |
| 5,434,949 A | 7/1995 | Jeong |
| 5,453,570 A | 9/1995 | Umeda et al. |
| 5,464,946 A | 11/1995 | Lewis |
| 5,471,576 A | 11/1995 | Yee |
| 5,482,087 A | 1/1996 | Overbergh et al. |
| 5,488,196 A | 1/1996 | Zimmerman et al. |
| 5,491,297 A | 2/1996 | Johnson et al. |
| 5,510,573 A | 4/1996 | Cho et al. |
| 5,513,129 A | 4/1996 | Fakespace |
| 5,524,637 A | 6/1996 | Erickson |
| 5,534,917 A | 7/1996 | MacDougall |
| 5,537,528 A | 7/1996 | Takahashi et al. |
| 5,553,864 A | 9/1996 | Sitrick |
| 5,557,056 A | 9/1996 | Hong et al. |
| 5,557,057 A | 9/1996 | Starr |
| 5,563,358 A | 10/1996 | Zimmerman |
| 5,565,639 A | 10/1996 | Bae |
| 5,567,162 A | 10/1996 | Park |
| 5,568,275 A | 10/1996 | Norton et al. |
| 5,574,238 A | 11/1996 | Mencher |
| 5,588,096 A | 12/1996 | Sato et al. |
| 5,613,909 A | 3/1997 | Stelovsky |
| 5,616,078 A | 4/1997 | Oh |
| 5,627,335 A | 5/1997 | Rigopulos et al. |
| 5,631,433 A | 5/1997 | Iida et al. |
| 5,634,849 A | 6/1997 | Abecassis |
| 5,663,517 A | 9/1997 | Oppenheim |
| 5,670,729 A | 9/1997 | Miller et al. |
| 5,681,223 A | 10/1997 | Weinreich |
| 5,689,618 A | 11/1997 | Gasper et al. |
| 5,693,903 A | 12/1997 | Heidorn et al. |
| 5,701,511 A | 12/1997 | Smith |
| D389,216 S | 1/1998 | Isetani et al. |
| 5,704,836 A | 1/1998 | Norton et al. |
| 5,711,715 A | 1/1998 | Ringo et al. |
| 5,715,179 A | 2/1998 | Park |
| 5,719,344 A | 2/1998 | Pawate |
| 5,723,802 A | 3/1998 | Johnson et al. |
| 5,734,961 A | 3/1998 | Castille |
| 5,739,457 A | 4/1998 | Devecka |
| 5,763,804 A | 6/1998 | Rigopulos et al. |
| 5,768,396 A | 6/1998 | Sone |
| 5,772,512 A | 6/1998 | Chichester |
| 5,777,251 A | 7/1998 | Hotta et al. |
| 5,782,692 A | 7/1998 | Stelovsky |
| D398,916 S | 9/1998 | Bernardi |
| 5,804,752 A | 9/1998 | Sone et al. |
| D399,887 S | 10/1998 | Schultz et al. |
| D400,196 S | 10/1998 | Cameron et al. |
| 5,824,933 A | 10/1998 | Gabriel |
| 5,825,427 A | 10/1998 | MacLeod |
| 5,830,065 A | 11/1998 | Sitrick |
| 5,832,229 A | 11/1998 | Tomoda et al. |
| 5,833,469 A | 11/1998 | Ito et al. |
| 5,838,909 A | 11/1998 | Roy et al. |
| D403,024 S | 12/1998 | Muraki et al. |
| 5,861,881 A | 1/1999 | Freeman et al. |
| 5,874,686 A | 2/1999 | Ghias et al. |
| 5,879,236 A | 3/1999 | Lambright |
| 5,880,788 A | 3/1999 | Bregler |
| 5,886,275 A | 3/1999 | Kato et al. |
| 5,889,224 A | 3/1999 | Tanaka |
| 5,906,494 A | 5/1999 | Ogawa et al. |
| D411,258 S | 6/1999 | Isetani et al. |
| 5,913,727 A | 6/1999 | Ahdoot |
| 5,915,288 A | 6/1999 | Gabriel |
| 5,915,972 A | 6/1999 | Tada |
| 5,915,975 A | 6/1999 | McGrath |
| 5,925,843 A | 7/1999 | Miller et al. |
| 5,953,005 A | 9/1999 | Liu |
| 5,953,485 A | 9/1999 | Abecassis |
| 5,969,716 A | 10/1999 | Davis et al. |
| 5,983,280 A | 11/1999 | Hunt |
| 5,990,405 A | 11/1999 | Auten et al. |
| 5,999,173 A | 12/1999 | Ubillos |
| 6,001,013 A | 12/1999 | Ota |
| 6,009,457 A | 12/1999 | Moller |
| 6,011,212 A | 1/2000 | Rigopulos et al. |
| 6,016,380 A | 1/2000 | Norton |
| 6,018,121 A | 1/2000 | Devecka |
| 6,032,156 A | 2/2000 | Marcus |
| 6,065,042 A | 5/2000 | Reimer et al. |
| 6,066,792 A | 5/2000 | Sone |
| 6,067,126 A | 5/2000 | Alexander |
| 6,067,566 A | 5/2000 | Moline |
| 6,072,113 A | 6/2000 | Tohgi et al. |
| 6,072,480 A | 6/2000 | Gorbet et al. |
| 6,073,489 A | 6/2000 | French et al. |
| 6,074,215 A | 6/2000 | Tsurumi |
| 6,075,197 A | 6/2000 | Chan |
| 6,077,162 A | 6/2000 | Weiss |
| 6,083,009 A | 7/2000 | Kim et al. |
| 6,091,408 A | 7/2000 | Treibitz et al. |
| 6,098,458 A | 8/2000 | French et al. |
| 6,118,444 A | 9/2000 | Garmon et al. |
| 6,121,531 A | 9/2000 | Kato |
| 6,126,548 A | 10/2000 | Jacobs et al. |
| 6,137,487 A | 10/2000 | Mantha |
| 6,142,870 A | 11/2000 | Wada et al. |
| 6,150,947 A | 11/2000 | Shima |
| 6,162,981 A | 12/2000 | Newcomer et al. |
| 6,166,314 A | 12/2000 | Weinstock et al. |
| 6,177,623 B1 | 1/2001 | Ooseki |
| 6,182,044 B1 | 1/2001 | Fong et al. |

(56) References Cited

U.S. PATENT DOCUMENTS

| | | |
|---|---|---|
| 6,184,899 B1 | 2/2001 | Akemann |
| 6,191,350 B1 | 2/2001 | Okulov et al. |
| 6,191,773 B1 * | 2/2001 | Maruno et al. ............... 345/158 |
| 6,206,782 B1 | 3/2001 | Walker et al. |
| 6,215,411 B1 | 4/2001 | Gothard |
| 6,219,045 B1 | 4/2001 | Leahy et al. |
| 6,224,486 B1 | 5/2001 | Walker et al. |
| 6,225,547 B1 | 5/2001 | Toyama et al. |
| 6,227,968 B1 | 5/2001 | Suzuki et al. |
| 6,227,974 B1 | 5/2001 | Eilat et al. |
| 6,243,087 B1 | 6/2001 | Davis et al. |
| 6,243,092 B1 | 6/2001 | Okita et al. |
| 6,252,153 B1 | 6/2001 | Toyama |
| 6,262,724 B1 | 7/2001 | Crow et al. |
| 6,263,392 B1 | 7/2001 | McCauley |
| 6,267,674 B1 | 7/2001 | Kondo et al. |
| 6,268,557 B1 | 7/2001 | Devecka |
| 6,283,860 B1 | 9/2001 | Lyons et al. |
| 6,287,198 B1 | 9/2001 | McCauley |
| 6,288,727 B1 | 9/2001 | Akemann |
| 6,292,620 B1 | 9/2001 | Ohmori et al. |
| 6,307,576 B1 | 10/2001 | Rosenfeld |
| 6,308,565 B1 | 10/2001 | French et al. |
| 6,309,301 B1 | 10/2001 | Sano |
| 6,319,129 B1 | 11/2001 | Igarashi et al. |
| 6,319,130 B1 | 11/2001 | Ooseki et al. |
| 6,320,110 B1 | 11/2001 | Ishikawa et al. |
| 6,326,536 B1 | 12/2001 | Wang |
| 6,329,620 B1 | 12/2001 | Oishi et al. |
| 6,337,433 B1 | 1/2002 | Nishimoto |
| 6,342,665 B1 | 1/2002 | Okita et al. |
| 6,345,111 B1 | 2/2002 | Yamaguchi et al. |
| 6,347,994 B1 | 2/2002 | Yoshikawa et al. |
| 6,347,998 B1 | 2/2002 | Yoshitomi et al. |
| 6,350,942 B1 | 2/2002 | Thomson |
| 6,352,432 B1 | 3/2002 | Tsai et al. |
| 6,353,174 B1 | 3/2002 | Schmidt et al. |
| D455,792 S | 4/2002 | Isetani et al. |
| 6,369,313 B2 | 4/2002 | Devecka |
| 6,379,244 B1 | 4/2002 | Sagawa et al. |
| 6,380,474 B2 | 4/2002 | Taruguchi et al. |
| 6,380,950 B1 | 4/2002 | Montgomery et al. |
| 6,384,736 B1 | 5/2002 | Gothard |
| 6,390,923 B1 | 5/2002 | Yoshitomi et al. |
| 6,392,133 B1 | 5/2002 | Georges |
| 6,407,324 B1 | 6/2002 | Hulcher |
| 6,410,835 B2 | 6/2002 | Suzuki et al. |
| 6,417,432 B1 | 7/2002 | Downing |
| 6,425,822 B1 | 7/2002 | Hayashida et al. |
| 6,425,825 B1 | 7/2002 | Sitrick |
| 6,425,827 B1 | 7/2002 | Nimura |
| 6,425,828 B2 | 7/2002 | Walker et al. |
| 6,429,863 B1 | 8/2002 | LoPiccolo et al. |
| 6,430,997 B1 | 8/2002 | French et al. |
| 6,437,227 B1 | 8/2002 | Theimer |
| 6,438,581 B1 | 8/2002 | Neuhauser et al. |
| 6,438,611 B1 | 8/2002 | Hara et al. |
| D462,698 S | 9/2002 | Sturm |
| 6,444,887 B1 | 9/2002 | Hiraoka et al. |
| 6,450,886 B1 | 9/2002 | Oishi et al. |
| 6,450,888 B1 | 9/2002 | Takase et al. |
| 6,461,239 B1 | 10/2002 | Sagawa et al. |
| 6,463,205 B1 | 10/2002 | Aschbrenner et al. |
| 6,464,585 B1 | 10/2002 | Miyamoto et al. |
| 6,468,161 B1 | 10/2002 | Shimomura |
| 6,471,584 B1 | 10/2002 | Wada et al. |
| 6,482,087 B1 | 11/2002 | Egozy et al. |
| 6,483,018 B2 | 11/2002 | Mead |
| 6,504,089 B1 | 1/2003 | Negishi et al. |
| 6,504,990 B1 | 1/2003 | Abecassis |
| 6,506,969 B1 | 1/2003 | Baron |
| 6,514,083 B1 | 2/2003 | Kumar et al. |
| 6,527,639 B2 | 3/2003 | Suzuki |
| 6,530,834 B2 | 3/2003 | Kondo |
| 6,530,839 B2 | 3/2003 | Horio |
| 6,535,269 B2 | 3/2003 | Sherman et al. |
| 6,540,613 B2 | 4/2003 | Okubo et al. |
| 6,541,692 B2 | 4/2003 | Miller |
| 6,542,155 B1 | 4/2003 | Mifune et al. |
| 6,542,168 B2 | 4/2003 | Negishi et al. |
| 6,544,119 B2 | 4/2003 | Kubo et al. |
| 6,544,122 B2 | 4/2003 | Araki et al. |
| 6,544,125 B2 | 4/2003 | Horigami et al. |
| 6,554,706 B2 | 4/2003 | Kim et al. |
| 6,554,711 B1 | 4/2003 | Kawasaki et al. |
| 6,555,737 B2 | 4/2003 | Miyaki et al. |
| 6,570,078 B2 | 5/2003 | Ludwig |
| 6,577,330 B1 | 6/2003 | Tsuda et al. |
| 6,582,235 B1 | 6/2003 | Tsai et al. |
| 6,582,309 B2 | 6/2003 | Higurashi et al. |
| 6,589,120 B1 | 7/2003 | Takahashi |
| 6,597,861 B1 | 7/2003 | Tozaki et al. |
| 6,598,074 B1 | 7/2003 | Moller et al. |
| 6,599,195 B1 | 7/2003 | Araki et al. |
| 6,607,446 B1 | 8/2003 | Shimomura et al. |
| 6,608,249 B2 | 8/2003 | Georges |
| 6,609,979 B1 | 8/2003 | Wada |
| 6,611,278 B2 | 8/2003 | Rosenfeld |
| 6,612,931 B2 | 9/2003 | Kojima et al. |
| 6,613,100 B2 | 9/2003 | Miller |
| 6,618,053 B1 | 9/2003 | Tanner |
| 6,621,503 B1 | 9/2003 | Ubillos |
| 6,623,358 B2 | 9/2003 | Harima |
| 6,625,388 B2 | 9/2003 | Winter et al. |
| 6,629,892 B2 | 10/2003 | Oe et al. |
| 6,634,886 B2 | 10/2003 | Oyama et al. |
| 6,636,238 B1 | 10/2003 | Amir et al. |
| 6,636,877 B1 | 10/2003 | Doleac et al. |
| 6,638,160 B2 | 10/2003 | Yoshitomi |
| 6,645,067 B1 | 11/2003 | Okita et al. |
| 6,645,076 B1 | 11/2003 | Sugai |
| 6,645,784 B2 | 11/2003 | Tayebati et al. |
| 6,653,545 B2 | 11/2003 | Redmann et al. |
| 6,654,863 B2 | 11/2003 | Nishio |
| 6,659,873 B1 | 12/2003 | Kitano et al. |
| 6,661,496 B2 | 12/2003 | Sherman et al. |
| 6,663,491 B2 | 12/2003 | Watabe et al. |
| 6,666,764 B1 | 12/2003 | Kudo |
| 6,669,563 B1 | 12/2003 | Kitami et al. |
| 6,676,523 B1 | 1/2004 | Kasai et al. |
| 6,682,424 B2 | 1/2004 | Yamauchi et al. |
| 6,684,480 B2 | 2/2004 | Conrad |
| 6,685,480 B2 | 2/2004 | Nishimoto et al. |
| 6,695,694 B2 | 2/2004 | Ishikawa et al. |
| 6,697,079 B2 | 2/2004 | Rose |
| 6,710,785 B1 | 3/2004 | Asai et al. |
| 6,712,692 B2 | 3/2004 | Basson et al. |
| 6,725,108 B1 | 4/2004 | Hall |
| 6,727,889 B2 | 4/2004 | Shaw |
| 6,733,382 B2 | 5/2004 | Oe et al. |
| 6,738,052 B1 | 5/2004 | Manke et al. |
| 6,740,802 B1 | 5/2004 | Browne, Jr. |
| 6,740,803 B2 | 5/2004 | Brinkman et al. |
| 6,743,099 B2 | 6/2004 | Yabe et al. |
| 6,749,432 B2 | 6/2004 | French et al. |
| 6,749,508 B2 | 6/2004 | Kohira et al. |
| 6,750,848 B1 | 6/2004 | Pryor |
| 6,758,753 B1 | 7/2004 | Nagata et al. |
| 6,758,756 B1 | 7/2004 | Horigami et al. |
| 6,764,399 B2 | 7/2004 | Nagata et al. |
| 6,765,590 B1 | 7/2004 | Watahiki et al. |
| 6,765,726 B2 | 7/2004 | French et al. |
| 6,767,282 B2 | 7/2004 | Matsuyama et al. |
| 6,769,689 B1 | 8/2004 | Shimomura et al. |
| 6,786,821 B2 | 9/2004 | Nobe et al. |
| 6,788,880 B1 | 9/2004 | Fuchigami et al. |
| 6,801,930 B1 | 10/2004 | Dionne et al. |
| 6,802,019 B1 | 10/2004 | Lauder |
| 6,811,491 B1 | 11/2004 | Levenberg et al. |
| 6,821,203 B2 | 11/2004 | Suga et al. |
| 6,831,220 B2 | 12/2004 | Varme |
| 6,831,656 B2 | 12/2004 | Kitao |
| 6,835,136 B2 | 12/2004 | Kitao |
| 6,835,887 B2 | 12/2004 | Devecka |

(56) References Cited

U.S. PATENT DOCUMENTS

| | | | |
|---|---|---|---|
| 6,838,608 B2 | 1/2005 | Koike |
| 6,843,726 B1 | 1/2005 | Nomi et al. |
| 6,850,252 B1 | 2/2005 | Hoffberg |
| 6,852,034 B2 | 2/2005 | Nagata et al. |
| 6,856,923 B2 | 2/2005 | Jung |
| 6,857,960 B2 | 2/2005 | Okubo et al. |
| D503,407 S | 3/2005 | Kaku |
| 6,860,810 B2 | 3/2005 | Cannon et al. |
| 6,876,496 B2 | 4/2005 | French et al. |
| 6,881,148 B2 | 4/2005 | Yotsugi et al. |
| 6,881,887 B2 | 4/2005 | Berens |
| 6,890,262 B2 | 5/2005 | Oishi et al. |
| 6,893,343 B2 | 5/2005 | Suda et al. |
| 6,894,693 B1 | 5/2005 | Nash |
| 6,898,637 B2 | 5/2005 | Curtin |
| 6,905,413 B1 | 6/2005 | Terao et al. |
| 6,909,420 B1 * | 6/2005 | Nicolas et al. ............... 345/156 |
| 6,915,488 B2 | 7/2005 | Omori et al. |
| 6,921,332 B2 | 7/2005 | Fukunaga et al. |
| 6,924,425 B2 | 8/2005 | Naples et al. |
| 6,930,235 B2 | 8/2005 | Sandborn et al. |
| 6,930,236 B2 | 8/2005 | Jung |
| 6,949,023 B1 | 9/2005 | Okubo et al. |
| 6,953,887 B2 | 10/2005 | Nagashima et al. |
| 6,964,610 B2 | 11/2005 | Yamauchi et al. |
| 6,967,275 B2 | 11/2005 | Ozick |
| 6,976,918 B2 | 12/2005 | Hosokawa |
| 6,991,542 B2 | 1/2006 | Asami et al. |
| 6,995,765 B2 | 2/2006 | Boudier |
| 6,995,869 B2 | 2/2006 | Onodera |
| 6,998,527 B2 | 2/2006 | Agnihotri |
| 7,000,200 B1 | 2/2006 | Martins |
| 7,001,272 B2 | 2/2006 | Yamashita et al. |
| 7,008,323 B1 | 3/2006 | Hayashi |
| 7,010,291 B2 | 3/2006 | Iwanaga |
| D519,569 S | 4/2006 | Kiyono et al. |
| 7,022,905 B1 | 4/2006 | Hinman et al. |
| 7,027,046 B2 | 4/2006 | Zhang |
| 7,027,124 B2 | 4/2006 | Foote et al. |
| 7,030,307 B2 | 4/2006 | Wedel |
| 7,030,311 B2 | 4/2006 | Brinkman et al. |
| 7,037,197 B2 | 5/2006 | Watanabe |
| 7,038,855 B2 | 5/2006 | French et al. |
| 7,044,856 B2 | 5/2006 | Suzuki |
| 7,044,857 B1 | 5/2006 | Klitsner et al. |
| 7,047,503 B1 | 5/2006 | Parrish et al. |
| 7,064,672 B2 | 6/2006 | Gothard |
| 7,066,818 B2 | 6/2006 | Ikeda |
| 7,069,296 B2 | 6/2006 | Moller et al. |
| 7,070,500 B1 | 7/2006 | Nomi et al. |
| 7,071,914 B1 | 7/2006 | Marks |
| 7,074,999 B2 | 7/2006 | Sitrick et al. |
| 7,076,052 B2 | 7/2006 | Yoshimura |
| 7,079,026 B2 | 7/2006 | Smith |
| 7,079,114 B1 | 7/2006 | Smith et al. |
| 7,084,855 B2 | 8/2006 | Kaku et al. |
| 7,084,888 B2 | 8/2006 | Takahama et al. |
| 7,098,392 B2 | 8/2006 | Sitrick et al. |
| 7,098,921 B2 | 8/2006 | Nash et al. |
| 7,103,873 B2 | 9/2006 | Tanner et al. |
| 7,119,268 B2 | 10/2006 | Futamase et al. |
| 7,122,751 B1 | 10/2006 | Anderson et al. |
| 7,123,272 B2 | 10/2006 | Moriyama |
| 7,126,607 B2 | 10/2006 | Emerson |
| 7,128,649 B2 | 10/2006 | Nobe et al. |
| 7,129,408 B2 | 10/2006 | Uehara |
| 7,134,876 B2 | 11/2006 | Hou |
| 7,142,807 B2 | 11/2006 | Lee |
| 7,143,353 B2 | 11/2006 | McGee et al. |
| 7,145,070 B2 | 12/2006 | Barry |
| D535,659 S | 1/2007 | Hally et al. |
| 7,164,075 B2 | 1/2007 | Tada |
| 7,164,076 B2 | 1/2007 | McHale et al. |
| 7,169,998 B2 | 1/2007 | Kondo et al. |
| 7,170,510 B2 | 1/2007 | Kawahara et al. |
| 7,174,510 B2 | 2/2007 | Salter |
| 7,181,636 B2 | 2/2007 | Kim et al. |
| 7,189,912 B2 | 3/2007 | Jung |
| 7,192,353 B2 | 3/2007 | Okubo |
| 7,194,676 B2 | 3/2007 | Fayan et al. |
| 7,199,298 B2 | 4/2007 | Funaki |
| 7,199,801 B2 | 4/2007 | Tsunashima et al. |
| 7,201,659 B2 | 4/2007 | Nakayama et al. |
| 7,221,852 B2 | 5/2007 | Iizuka et al. |
| 7,223,913 B2 | 5/2007 | Knapp et al. |
| 7,227,526 B2 | 6/2007 | Hildreth et al. |
| 7,259,357 B2 | 8/2007 | Walker |
| 7,259,971 B1 | 8/2007 | Allen et al. |
| 7,263,668 B1 | 8/2007 | Lentz |
| 7,271,329 B2 | 9/2007 | Franzblau |
| 7,272,780 B2 | 9/2007 | Abbott et al. |
| 7,274,803 B1 | 9/2007 | Sharma et al. |
| 7,304,232 B1 | 12/2007 | Nicholes |
| 7,317,812 B1 | 1/2008 | Krahnstoever et al. |
| 7,320,643 B1 | 1/2008 | Brosius et al. |
| 7,323,631 B2 | 1/2008 | Miyaki et al. |
| 7,324,165 B2 | 1/2008 | Shan et al. |
| 7,336,890 B2 | 2/2008 | Lu et al. |
| 7,346,472 B1 | 3/2008 | Moskowitz et al. |
| 7,352,359 B2 | 4/2008 | Zalewski et al. |
| 7,352,952 B2 | 4/2008 | Herberger et al. |
| 7,359,121 B2 | 4/2008 | French et al. |
| 7,359,617 B2 | 4/2008 | Ma |
| D568,659 S | 5/2008 | Ophardt et al. |
| D568,892 S | 5/2008 | Stabb et al. |
| D569,382 S | 5/2008 | Yow et al. |
| 7,367,887 B2 | 5/2008 | Watabe et al. |
| 7,383,508 B2 | 6/2008 | Toyama et al. |
| 7,386,782 B2 | 6/2008 | Comps et al. |
| 7,391,409 B2 | 6/2008 | Zalewski et al. |
| 7,391,874 B1 | 6/2008 | Semmes, Jr. et al. |
| D572,265 S | 7/2008 | Guimaraes et al. |
| 7,398,002 B2 | 7/2008 | Hsiao et al. |
| 7,408,106 B2 | 8/2008 | Weiner et al. |
| 7,423,213 B2 | 9/2008 | Sitrick |
| 7,430,360 B2 | 9/2008 | Abecassis |
| 7,432,810 B2 | 10/2008 | Menache et al. |
| 7,435,178 B1 | 10/2008 | Tam et al. |
| 7,453,035 B1 | 11/2008 | Evans et al. |
| 7,458,025 B2 | 11/2008 | Crow et al. |
| 7,459,324 B1 | 12/2008 | Ptasinski et al. |
| 7,459,624 B2 | 12/2008 | Schmidt et al. |
| 7,462,772 B2 | 12/2008 | Salter |
| 7,480,446 B2 | 1/2009 | Bhadkamkar et al. |
| 7,480,873 B2 | 1/2009 | Kawahara |
| 7,488,886 B2 | 2/2009 | Kemp |
| D590,407 S | 4/2009 | Watanabe et al. |
| 7,521,619 B2 | 4/2009 | Salter |
| 7,528,315 B2 | 5/2009 | Goodwin |
| 7,530,030 B2 | 5/2009 | Baudisch |
| 7,536,654 B2 | 5/2009 | Anthony et al. |
| 7,538,776 B2 | 5/2009 | Edwards et al. |
| 7,546,130 B2 | 6/2009 | Vance |
| 7,559,834 B1 | 7/2009 | York |
| 7,559,841 B2 | 7/2009 | Hashimoto |
| 7,579,543 B2 | 8/2009 | Haruyama et al. |
| D599,812 S | 9/2009 | Hirsch |
| D599,819 S | 9/2009 | Lew |
| 7,582,015 B2 | 9/2009 | Onoda et al. |
| 7,587,680 B2 | 9/2009 | Wada |
| 7,589,727 B2 | 9/2009 | Haeker |
| 7,593,618 B2 | 9/2009 | Xu et al. |
| 7,599,554 B2 | 10/2009 | Agnihotri et al. |
| 7,605,322 B2 | 10/2009 | Nakamura |
| 7,612,278 B2 | 11/2009 | Sitrick et al. |
| 7,614,011 B2 | 11/2009 | Karidis et al. |
| 7,625,284 B2 | 12/2009 | Kay et al. |
| 7,628,699 B2 | 12/2009 | Onoda et al. |
| 7,640,069 B1 | 12/2009 | Johnston |
| D607,892 S | 1/2010 | Murchie et al. |
| 7,649,134 B2 | 1/2010 | Kashioka |
| D609,715 S | 2/2010 | Chaudhri |
| 7,660,510 B2 | 2/2010 | Kawahara et al. |
| 7,660,700 B2 | 2/2010 | Moskowitz et al. |

(56) References Cited

U.S. PATENT DOCUMENTS

| | | |
|---|---|---|
| 7,690,017 B2 | 3/2010 | Stecyk et al. |
| 7,692,630 B2 | 4/2010 | Natsume et al. |
| 7,714,849 B2 | 5/2010 | Pryor |
| 7,716,572 B2 | 5/2010 | Beauregard et al. |
| 7,722,450 B2 | 5/2010 | Onoda et al. |
| 7,747,348 B2 | 6/2010 | Shim et al. |
| D619,598 S | 7/2010 | Maitlen et al. |
| D619,609 S | 7/2010 | Meziere |
| 7,754,961 B1 | 7/2010 | Yang et al. |
| 7,758,427 B2 | 7/2010 | Egozy |
| 7,760,908 B2 | 7/2010 | Curtner et al. |
| 7,772,480 B2 | 8/2010 | Brennan |
| 7,774,706 B2 | 8/2010 | Sakai |
| 7,789,741 B1 | 9/2010 | Fields et al. |
| 7,791,808 B2 | 9/2010 | French et al. |
| 7,797,641 B2 | 9/2010 | Karukka et al. |
| D624,932 S | 10/2010 | Chaudhri |
| 7,806,759 B2 | 10/2010 | McHale et al. |
| 7,806,764 B2 | 10/2010 | Brosnan et al. |
| 7,814,436 B2 | 10/2010 | Schrag et al. |
| 7,818,689 B2 | 10/2010 | Wada |
| 7,823,070 B2 | 10/2010 | Nelson et al. |
| 7,829,777 B2 | 11/2010 | Kyuma et al. |
| 7,838,755 B2 | 11/2010 | Taub et al. |
| 7,840,907 B2 | 11/2010 | Kikuchi et al. |
| D628,582 S | 12/2010 | Kurozumi et al. |
| 7,853,896 B2 | 12/2010 | Ok et al. |
| 7,853,897 B2 | 12/2010 | Ogawa et al. |
| 7,865,834 B1 | 1/2011 | van Os et al. |
| 7,877,690 B2 | 1/2011 | Margulis |
| 7,881,702 B2 | 2/2011 | Heyworth et al. |
| 7,890,867 B1 | 2/2011 | Margulis |
| 7,893,337 B2 | 2/2011 | Lenz |
| 7,895,617 B2 | 2/2011 | Pedlow, Jr. |
| 7,899,389 B2 | 3/2011 | Mangum |
| 7,904,814 B2 | 3/2011 | Errico et al. |
| 7,917,644 B2 | 3/2011 | Vedantham et al. |
| 7,920,931 B2 | 4/2011 | Van de Sluis et al. |
| 7,923,620 B2 | 4/2011 | Foster |
| 7,928,307 B2 | 4/2011 | Hetherington et al. |
| 7,935,880 B2 | 5/2011 | Stoddard et al. |
| 7,949,494 B2 | 5/2011 | Moskowitz et al. |
| D640,711 S | 6/2011 | Ng et al. |
| D642,192 S | 7/2011 | Arnold |
| 7,973,230 B2 | 7/2011 | Mahowald |
| 7,979,574 B2* | 7/2011 | Gillo et al. ............ 709/238 |
| 7,980,997 B2 | 7/2011 | Thukral et al. |
| 7,982,114 B2 | 7/2011 | Applewhite et al. |
| 8,003,872 B2 | 8/2011 | Lopiccolo et al. |
| 8,009,022 B2* | 8/2011 | Kipman ............ G06F 3/011 |
| | | 340/407.1 |
| 8,010,088 B2 | 8/2011 | Cheng |
| 8,026,435 B2 | 9/2011 | Stoddard et al. |
| 8,038,535 B2 | 10/2011 | Jensen |
| 8,057,290 B2 | 11/2011 | Vance et al. |
| 8,068,605 B2 | 11/2011 | Holmberg |
| D650,802 S | 12/2011 | Jang et al. |
| 8,074,184 B2 | 12/2011 | Garside et al. |
| 8,076,564 B2 | 12/2011 | Applewhite |
| 8,076,574 B2 | 12/2011 | Irmer et al. |
| 8,079,901 B2 | 12/2011 | Brosius et al. |
| 8,079,907 B2 | 12/2011 | Egozy |
| 8,080,722 B2 | 12/2011 | Applewhite et al. |
| D651,608 S | 1/2012 | Allen et al. |
| D651,609 S | 1/2012 | Pearson et al. |
| 8,122,375 B2 | 2/2012 | Ito |
| D658,195 S | 4/2012 | Cranfill |
| D658,196 S | 4/2012 | Wood et al. |
| D660,861 S | 5/2012 | Lee et al. |
| 8,176,438 B2 | 5/2012 | Zaman et al. |
| 8,176,439 B2 | 5/2012 | Kamen et al. |
| 8,198,526 B2 | 6/2012 | Izen et al. |
| 8,202,161 B2 | 6/2012 | Leake et al. |
| 8,205,172 B2 | 6/2012 | Wong et al. |
| 8,209,606 B2 | 6/2012 | Ording |
| 8,214,175 B2 | 7/2012 | Moskowitz et al. |
| 8,225,227 B2 | 7/2012 | Headrick et al. |
| 8,230,360 B2 | 7/2012 | Ma et al. |
| D664,975 S | 8/2012 | Arnold |
| 8,255,831 B2 | 8/2012 | Araumi |
| 8,261,209 B2 | 9/2012 | Goto et al. |
| 8,444,464 B2 | 5/2013 | Boch et al. |
| 8,449,360 B2 | 5/2013 | Stoddard et al. |
| 8,493,354 B1* | 7/2013 | Birnbaum ............ G06F 3/016 |
| | | 340/407.2 |
| 8,702,485 B2 | 4/2014 | Flury et al. |
| 8,744,121 B2* | 6/2014 | Polzin ............ A63F 13/213 |
| | | 382/103 |
| 8,745,541 B2* | 6/2014 | Wilson ............ G06F 3/017 |
| | | 345/156 |
| 8,749,557 B2 | 6/2014 | Evertt et al. |
| 9,358,456 B1 | 6/2016 | Challinor et al. |
| 9,383,814 B1 | 7/2016 | Capper et al. |
| 2001/0004861 A1 | 6/2001 | Suzuki et al. |
| 2001/0007824 A1 | 7/2001 | Fukuda |
| 2001/0007829 A1 | 7/2001 | Suzuki |
| 2001/0008844 A1 | 7/2001 | Yamauchi et al. |
| 2001/0008846 A1 | 7/2001 | Yamauchi et al. |
| 2001/0012795 A1 | 8/2001 | Asami et al. |
| 2001/0014440 A1 | 8/2001 | Oyama et al. |
| 2001/0014620 A1 | 8/2001 | Nobe et al. |
| 2001/0014621 A1 | 8/2001 | Okubo et al. |
| 2001/0016510 A1 | 8/2001 | Ishikawa et al. |
| 2001/0023202 A1 | 9/2001 | Okubo |
| 2001/0024972 A1 | 9/2001 | Kitao |
| 2001/0030652 A1 | 10/2001 | Kitao |
| 2001/0031653 A1 | 10/2001 | Oe et al. |
| 2001/0033287 A1 | 10/2001 | Naegle et al. |
| 2001/0034014 A1 | 10/2001 | Nishimoto et al. |
| 2001/0035868 A1 | 11/2001 | Uehara et al. |
| 2001/0036861 A1 | 11/2001 | Uehara et al. |
| 2001/0037181 A1 | 11/2001 | Matsuura et al. |
| 2001/0039207 A1 | 11/2001 | Horigami et al. |
| 2001/0041615 A1 | 11/2001 | Kondo |
| 2002/0002411 A1 | 1/2002 | Higurashi et al. |
| 2002/0002900 A1 | 1/2002 | Cho |
| 2002/0004420 A1 | 1/2002 | Suga et al. |
| 2002/0005109 A1 | 1/2002 | Miller |
| 2002/0006819 A1 | 1/2002 | Kubo et al. |
| 2002/0006823 A1 | 1/2002 | Horio |
| 2002/0013166 A1 | 1/2002 | Yoshitomi |
| 2002/0016203 A1 | 2/2002 | Nagata et al. |
| 2002/0019258 A1 | 2/2002 | Kim et al. |
| 2002/0022520 A1 | 2/2002 | Oe et al. |
| 2002/0022522 A1 | 2/2002 | Yamada |
| 2002/0025841 A1 | 2/2002 | Nobe et al. |
| 2002/0025842 A1 | 2/2002 | Nobe et al. |
| 2002/0025853 A1 | 2/2002 | Kojima et al. |
| 2002/0027899 A1 | 3/2002 | Ikeda |
| 2002/0032054 A1 | 3/2002 | Hosoya |
| 2002/0041385 A1 | 4/2002 | Onodera |
| 2002/0052236 A1 | 5/2002 | Kohira et al. |
| 2002/0054127 A1 | 5/2002 | Omori et al. |
| 2002/0055383 A1 | 5/2002 | Onda et al. |
| 2002/0055386 A1 | 5/2002 | Yotsugi et al. |
| 2002/0061776 A1 | 5/2002 | Wada et al. |
| 2002/0065121 A1 | 5/2002 | Fukunaga et al. |
| 2002/0085833 A1 | 7/2002 | Miyauchi |
| 2002/0091455 A1 | 7/2002 | Williams |
| 2002/0091847 A1 | 7/2002 | Curtin |
| 2002/0094865 A1 | 7/2002 | Araki et al. |
| 2002/0094866 A1 | 7/2002 | Takeda et al. |
| 2002/0105229 A1 | 8/2002 | Tanaka |
| 2002/0119811 A1 | 8/2002 | Yabe et al. |
| 2002/0128736 A1 | 9/2002 | Yoshida et al. |
| 2002/0142818 A1 | 10/2002 | Nakatsuka et al. |
| 2002/0142824 A1 | 10/2002 | Kazaoka et al. |
| 2002/0142827 A1 | 10/2002 | Aida et al. |
| 2002/0142834 A1 | 10/2002 | Sobue |
| 2002/0151337 A1 | 10/2002 | Yamashita et al. |
| 2002/0160823 A1 | 10/2002 | Watabe et al. |
| 2002/0160824 A1 | 10/2002 | Goto et al. |
| 2002/0169014 A1 | 11/2002 | Egozy et al. |
| 2002/0187835 A1 | 12/2002 | Nakayama et al. |

(56) References Cited

U.S. PATENT DOCUMENTS

| | | |
|---|---|---|
| 2002/0198045 A1 | 12/2002 | Okubo |
| 2003/0000364 A1 | 1/2003 | Deverich |
| 2003/0003431 A1 | 1/2003 | Maeda |
| 2003/0003991 A1 | 1/2003 | Kuraishi |
| 2003/0003992 A1 | 1/2003 | Furuya |
| 2003/0011620 A1 | 1/2003 | Moriyama |
| 2003/0014262 A1 | 1/2003 | Kim |
| 2003/0017872 A1 | 1/2003 | Oishi et al. |
| 2003/0028598 A1 | 2/2003 | Moller et al. |
| 2003/0032478 A1 | 2/2003 | Takahama et al. |
| 2003/0045334 A1 | 3/2003 | Hosokawa |
| 2003/0063115 A1 | 4/2003 | Kaku et al. |
| 2003/0069071 A1 | 4/2003 | Britt et al. |
| 2003/0070159 A1 | 4/2003 | Webb |
| 2003/0078086 A1 | 4/2003 | Matsuyama et al. |
| 2003/0078102 A1 | 4/2003 | Okita et al. |
| 2003/0099461 A1 | 5/2003 | Johnson |
| 2003/0104868 A1 | 6/2003 | Okita et al. |
| 2003/0109298 A1 | 6/2003 | Oishi et al. |
| 2003/0151628 A1 | 8/2003 | Salter |
| 2003/0164084 A1 | 9/2003 | Redmann et al. |
| 2003/0195041 A1 | 10/2003 | McCauley |
| 2003/0199317 A1 | 10/2003 | McCauley |
| 2003/0214498 A1 | 11/2003 | Gothard |
| 2003/0218626 A1 | 11/2003 | Greene |
| 2003/0232644 A1 | 12/2003 | Takahashi et al. |
| 2003/0232645 A1 | 12/2003 | Suda et al. |
| 2004/0005924 A1 | 1/2004 | Watabe et al. |
| 2004/0012540 A1 | 1/2004 | Treibitz et al. |
| 2004/0021684 A1 | 2/2004 | Millner |
| 2004/0043815 A1 | 3/2004 | Kaminkow |
| 2004/0054725 A1 | 3/2004 | Moller et al. |
| 2004/0063479 A1 | 4/2004 | Kimura |
| 2004/0063480 A1 | 4/2004 | Wang |
| 2004/0072620 A1 | 4/2004 | Nagata et al. |
| 2004/0077405 A1 | 4/2004 | Watanabe |
| 2004/0082380 A1 | 4/2004 | George et al. |
| 2004/0082386 A1 | 4/2004 | George et al. |
| 2004/0089139 A1 | 5/2004 | Georges et al. |
| 2004/0092303 A1 | 5/2004 | George et al. |
| 2004/0092304 A1 | 5/2004 | George et al. |
| 2004/0092305 A1 | 5/2004 | George et al. |
| 2004/0092306 A1 | 5/2004 | George et al. |
| 2004/0092307 A1 | 5/2004 | George et al. |
| 2004/0092313 A1 | 5/2004 | Saito et al. |
| 2004/0092314 A1 | 5/2004 | George et al. |
| 2004/0093354 A1 | 5/2004 | Xu et al. |
| 2004/0098582 A1 | 5/2004 | Mori |
| 2004/0109000 A1 | 6/2004 | Chosokabe |
| 2004/0113360 A1 | 6/2004 | George et al. |
| 2004/0116069 A1 | 6/2004 | Fadavi-Ardekani et al. |
| 2004/0116184 A1 | 6/2004 | George et al. |
| 2004/0116185 A1 | 6/2004 | George et al. |
| 2004/0123726 A1 | 7/2004 | Kato et al. |
| 2004/0127282 A1 | 7/2004 | Naobayashi |
| 2004/0127285 A1 | 7/2004 | Kavana |
| 2004/0127291 A1 | 7/2004 | George et al. |
| 2004/0132518 A1 | 7/2004 | Uehara et al. |
| 2004/0132531 A1 | 7/2004 | George et al. |
| 2004/0137984 A1 | 7/2004 | Salter |
| 2004/0147300 A1 | 7/2004 | Seelig et al. |
| 2004/0152514 A1 | 8/2004 | Kasai et al. |
| 2004/0154460 A1 | 8/2004 | Virolainen et al. |
| 2004/0181592 A1 | 9/2004 | Samra et al. |
| 2004/0184473 A1 | 9/2004 | Tavli et al. |
| 2004/0186720 A1 | 9/2004 | Kemmochi |
| 2004/0193413 A1* | 9/2004 | Wilson et al. ............ 704/243 |
| 2004/0204211 A1 | 10/2004 | Suzuki |
| 2004/0204238 A1 | 10/2004 | Aoki |
| 2004/0205204 A1 | 10/2004 | Chafe |
| 2004/0207774 A1 | 10/2004 | Gothard |
| 2004/0209673 A1 | 10/2004 | Shiraishi |
| 2004/0229685 A1 | 11/2004 | Smith et al. |
| 2004/0236543 A1 | 11/2004 | Stephens |
| 2004/0239678 A1 | 12/2004 | Tsunashima et al. |
| 2004/0240855 A1 | 12/2004 | Kagle |
| 2004/0243482 A1 | 12/2004 | Laut |
| 2004/0254016 A1 | 12/2004 | Shimazaki |
| 2004/0259631 A1 | 12/2004 | Katz et al. |
| 2004/0259632 A1 | 12/2004 | Crittenden et al. |
| 2004/0259644 A1 | 12/2004 | McCauley |
| 2005/0014554 A1 | 1/2005 | Walker et al. |
| 2005/0027381 A1 | 2/2005 | George et al. |
| 2005/0027383 A1 | 2/2005 | Nagata et al. |
| 2005/0045025 A1 | 3/2005 | Wells et al. |
| 2005/0049047 A1 | 3/2005 | Kitao |
| 2005/0054440 A1 | 3/2005 | Anderson et al. |
| 2005/0059480 A1 | 3/2005 | Soukup et al. |
| 2005/0060231 A1 | 3/2005 | Soukup et al. |
| 2005/0070349 A1 | 3/2005 | Kimura |
| 2005/0070359 A1 | 3/2005 | Rodriquez et al. |
| 2005/0073427 A1 | 4/2005 | Gothard |
| 2005/0075165 A1 | 4/2005 | George et al. |
| 2005/0082559 A1 | 4/2005 | Hasan Zaidi et al. |
| 2005/0101364 A1 | 5/2005 | Onoda et al. |
| 2005/0106546 A1 | 5/2005 | Strom |
| 2005/0108657 A1 | 5/2005 | Han |
| 2005/0115383 A1 | 6/2005 | Chang |
| 2005/0120865 A1 | 6/2005 | Tada |
| 2005/0120868 A1 | 6/2005 | Hinman et al. |
| 2005/0143174 A1 | 6/2005 | Goldman et al. |
| 2005/0159209 A1 | 7/2005 | Fiden et al. |
| 2005/0164779 A1 | 7/2005 | Okuniewicz |
| 2005/0181864 A1 | 8/2005 | Britt et al. |
| 2005/0215319 A1 | 9/2005 | Rigopulos et al. |
| 2005/0221892 A1 | 10/2005 | Takase |
| 2005/0227767 A1 | 10/2005 | Shimomura et al. |
| 2005/0229769 A1 | 10/2005 | Resnikoff |
| 2005/0235809 A1 | 10/2005 | Kageyama |
| 2005/0250565 A1 | 11/2005 | Nojiri et al. |
| 2005/0252362 A1 | 11/2005 | McHale et al. |
| 2005/0255914 A1 | 11/2005 | McHale et al. |
| 2005/0255923 A1 | 11/2005 | Aoki |
| 2005/0273319 A1 | 12/2005 | Dittmar et al. |
| 2006/0003839 A1 | 1/2006 | Lawrence et al. |
| 2006/0009282 A1 | 1/2006 | George et al. |
| 2006/0009979 A1 | 1/2006 | McHale et al. |
| 2006/0025282 A1 | 2/2006 | Redmann |
| 2006/0026304 A1 | 2/2006 | Price |
| 2006/0030382 A1 | 2/2006 | Okamura et al. |
| 2006/0032085 A1 | 2/2006 | Randall |
| 2006/0052161 A1 | 3/2006 | Soukup et al. |
| 2006/0052162 A1 | 3/2006 | Soukup et al. |
| 2006/0052163 A1 | 3/2006 | Aida |
| 2006/0052167 A1 | 3/2006 | Boddicker et al. |
| 2006/0052169 A1 | 3/2006 | Britt et al. |
| 2006/0058099 A1 | 3/2006 | Soukup et al. |
| 2006/0058101 A1 | 3/2006 | Rigopulos |
| 2006/0063573 A1 | 3/2006 | Ishikawa et al. |
| 2006/0068911 A1 | 3/2006 | Pirich et al. |
| 2006/0107819 A1 | 5/2006 | Salter |
| 2006/0107822 A1 | 5/2006 | Bowen |
| 2006/0135253 A1 | 6/2006 | George et al. |
| 2006/0152622 A1 | 7/2006 | Tan et al. |
| 2006/0154710 A1 | 7/2006 | Serafat |
| 2006/0166744 A1 | 7/2006 | Igarashi et al. |
| 2006/0175758 A1 | 8/2006 | Riolo |
| 2006/0189879 A1 | 8/2006 | Miyajima et al. |
| 2006/0191401 A1 | 8/2006 | Ueshima et al. |
| 2006/0204214 A1 | 9/2006 | Shah et al. |
| 2006/0209019 A1* | 9/2006 | Hu ........................ G06F 3/016 345/156 |
| 2006/0218239 A1 | 9/2006 | Umezawa et al. |
| 2006/0218288 A1 | 9/2006 | Umezawa et al. |
| 2006/0247046 A1 | 11/2006 | Choi et al. |
| 2006/0252474 A1* | 11/2006 | Zalewski ................ A63F 13/10 463/1 |
| 2006/0252503 A1 | 11/2006 | Salter |
| 2006/0258450 A1 | 11/2006 | Ishihata et al. |
| 2006/0266200 A1 | 11/2006 | Goodwin |
| 2006/0287105 A1 | 12/2006 | Willis |
| 2006/0287106 A1 | 12/2006 | Jensen |
| 2006/0288842 A1 | 12/2006 | Sitrick et al. |
| 2006/0290810 A1 | 12/2006 | Mallinson |

(56) References Cited

U.S. PATENT DOCUMENTS

| | | |
|---|---|---|
| 2007/0010329 A1 | 1/2007 | Craig et al. |
| 2007/0015570 A1 | 1/2007 | Pryzby |
| 2007/0015571 A1 | 1/2007 | Walker et al. |
| 2007/0026943 A1 | 2/2007 | Yoshimura |
| 2007/0059670 A1 | 3/2007 | Yates |
| 2007/0060312 A1 | 3/2007 | Dempsey et al. |
| 2007/0060336 A1 | 3/2007 | Marks et al. |
| 2007/0081562 A1 | 4/2007 | Ma |
| 2007/0088812 A1 | 4/2007 | Clark |
| 2007/0111802 A1 | 5/2007 | Ishihara et al. |
| 2007/0119292 A1 | 5/2007 | Nakamura |
| 2007/0126874 A1 | 6/2007 | Kake |
| 2007/0139443 A1* | 6/2007 | Marks .................... G06F 3/017 345/629 |
| 2007/0140510 A1 | 6/2007 | Redmann |
| 2007/0155494 A1 | 7/2007 | Wells et al. |
| 2007/0162497 A1 | 7/2007 | Pauws |
| 2007/0162850 A1 | 7/2007 | Adler et al. |
| 2007/0163427 A1 | 7/2007 | Rigopulos et al. |
| 2007/0163428 A1 | 7/2007 | Salter |
| 2007/0168415 A1 | 7/2007 | Matahira et al. |
| 2007/0175317 A1 | 8/2007 | Salter |
| 2007/0178973 A1 | 8/2007 | Camhi |
| 2007/0201815 A1 | 8/2007 | Griffin |
| 2007/0218444 A1 | 9/2007 | Konetski et al. |
| 2007/0226293 A1 | 9/2007 | Sakurada et al. |
| 2007/0232374 A1 | 10/2007 | Lopiccolo et al. |
| 2007/0234284 A1 | 10/2007 | Tanner et al. |
| 2007/0234885 A1 | 10/2007 | Schmidt et al. |
| 2007/0243915 A1 | 10/2007 | Egozy et al. |
| 2007/0245881 A1 | 10/2007 | Egozy et al. |
| 2007/0256540 A1 | 11/2007 | Salter |
| 2007/0256541 A1 | 11/2007 | McCauley |
| 2007/0260984 A1 | 11/2007 | Marks et al. |
| 2007/0265095 A1 | 11/2007 | Jonishi |
| 2007/0265098 A1 | 11/2007 | Shimada et al. |
| 2007/0270223 A1 | 11/2007 | Nonaka et al. |
| 2007/0273700 A1 | 11/2007 | Nash et al. |
| 2007/0297755 A1 | 12/2007 | Holt et al. |
| 2008/0001950 A1 | 1/2008 | Lin et al. |
| 2008/0009346 A1 | 1/2008 | Jessop et al. |
| 2008/0009347 A1 | 1/2008 | Radek |
| 2008/0026355 A1 | 1/2008 | Petef |
| 2008/0053295 A1 | 3/2008 | Goto et al. |
| 2008/0076497 A1 | 3/2008 | Kiskis et al. |
| 2008/0096654 A1 | 4/2008 | Mondesir et al. |
| 2008/0100572 A1* | 5/2008 | Boillot .................... G06F 1/1632 345/158 |
| 2008/0101762 A1 | 5/2008 | Kellock et al. |
| 2008/0102958 A1 | 5/2008 | Kitamura et al. |
| 2008/0113698 A1 | 5/2008 | Egozy |
| 2008/0113797 A1 | 5/2008 | Egozy |
| 2008/0115657 A1 | 5/2008 | Wakiyama |
| 2008/0125229 A1 | 5/2008 | Jonishi |
| 2008/0132334 A1 | 6/2008 | Nonaka et al. |
| 2008/0141181 A1* | 6/2008 | Ishigaki et al. ................ 715/863 |
| 2008/0143722 A1 | 6/2008 | Pagan |
| 2008/0146342 A1 | 6/2008 | Harvey et al. |
| 2008/0152191 A1 | 6/2008 | Fujimura et al. |
| 2008/0155421 A1 | 6/2008 | Ubillos et al. |
| 2008/0155474 A1 | 6/2008 | Duhig |
| 2008/0184870 A1 | 8/2008 | Toivola |
| 2008/0188305 A1 | 8/2008 | Yamazaki et al. |
| 2008/0191864 A1 | 8/2008 | Wolfson |
| 2008/0192736 A1 | 8/2008 | Jabri et al. |
| 2008/0194319 A1 | 8/2008 | Pryzby et al. |
| 2008/0200224 A1 | 8/2008 | Parks |
| 2008/0202321 A1 | 8/2008 | Goto et al. |
| 2008/0220864 A1 | 9/2008 | Brosius et al. |
| 2008/0222685 A1 | 9/2008 | McCarthy et al. |
| 2008/0231926 A1* | 9/2008 | Klug .................... H04N 13/0425 359/23 |
| 2008/0234023 A1 | 9/2008 | Mullahkhel et al. |
| 2008/0268943 A1 | 10/2008 | Jacob |
| 2008/0273755 A1 | 11/2008 | Hildreth |
| 2008/0276175 A1 | 11/2008 | Kim et al. |
| 2008/0280680 A1 | 11/2008 | Dutilly et al. |
| 2008/0288866 A1 | 11/2008 | Spencer et al. |
| 2008/0289477 A1 | 11/2008 | Salter |
| 2008/0300053 A1 | 12/2008 | Muller |
| 2008/0311969 A1 | 12/2008 | Kay et al. |
| 2008/0311970 A1 | 12/2008 | Kay et al. |
| 2009/0010335 A1 | 1/2009 | Harrison et al. |
| 2009/0013253 A1 | 1/2009 | Laefer et al. |
| 2009/0015653 A1 | 1/2009 | Baek |
| 2009/0027337 A1 | 1/2009 | Hildreth |
| 2009/0038467 A1 | 2/2009 | Brennan |
| 2009/0069096 A1 | 3/2009 | Nishimoto |
| 2009/0073117 A1 | 3/2009 | Tsurumi et al. |
| 2009/0075711 A1 | 3/2009 | Brosius et al. |
| 2009/0082078 A1 | 3/2009 | Schmidt et al. |
| 2009/0083281 A1 | 3/2009 | Sarig et al. |
| 2009/0088249 A1 | 4/2009 | Kay et al. |
| 2009/0098918 A1 | 4/2009 | Teasdale et al. |
| 2009/0100992 A1 | 4/2009 | Elion |
| 2009/0104956 A1 | 4/2009 | Kay et al. |
| 2009/0106667 A1 | 4/2009 | Lyle et al. |
| 2009/0122146 A1 | 5/2009 | Zalewski et al. |
| 2009/0135135 A1 | 5/2009 | Tsurumi |
| 2009/0149257 A1 | 6/2009 | Ferguson et al. |
| 2009/0158220 A1 | 6/2009 | Zalewski et al. |
| 2009/0165632 A1 | 7/2009 | Rigopulos et al. |
| 2009/0177742 A1 | 7/2009 | Rhoads et al. |
| 2009/0186698 A1 | 7/2009 | Ludden |
| 2009/0188371 A1 | 7/2009 | Chiu et al. |
| 2009/0189775 A1 | 7/2009 | Lashina et al. |
| 2009/0191932 A1 | 7/2009 | Chiu et al. |
| 2009/0197665 A1 | 8/2009 | Christensen |
| 2009/0213123 A1* | 8/2009 | Crow .................... G06K 9/00342 345/473 |
| 2009/0215533 A1 | 8/2009 | Zalewski et al. |
| 2009/0217211 A1 | 8/2009 | Hildreth et al. |
| 2009/0222392 A1 | 9/2009 | Martin et al. |
| 2009/0222765 A1 | 9/2009 | Ekstrand |
| 2009/0228544 A1 | 9/2009 | Demers et al. |
| 2009/0231425 A1 | 9/2009 | Zalewski |
| 2009/0233714 A1 | 9/2009 | Toro |
| 2009/0241758 A1 | 10/2009 | Neubacker |
| 2009/0258686 A1 | 10/2009 | McCauley et al. |
| 2009/0258700 A1 | 10/2009 | Bright et al. |
| 2009/0258703 A1 | 10/2009 | Brunstetter |
| 2009/0260508 A1 | 10/2009 | Elion |
| 2009/0262118 A1 | 10/2009 | Arikan et al. |
| 2009/0265668 A1 | 10/2009 | Esser et al. |
| 2009/0278796 A1 | 11/2009 | Komazaki |
| 2009/0282335 A1 | 11/2009 | Alexandersson |
| 2009/0300676 A1 | 12/2009 | Harter, Jr. |
| 2009/0310027 A1 | 12/2009 | Fleming |
| 2009/0317783 A1 | 12/2009 | Noguchi |
| 2009/0318228 A1 | 12/2009 | Hughes |
| 2010/0009746 A1 | 1/2010 | Raymond et al. |
| 2010/0009749 A1 | 1/2010 | Chrzanowski, Jr. et al. |
| 2010/0009750 A1 | 1/2010 | Egozy et al. |
| 2010/0029386 A1 | 2/2010 | Pitsch et al. |
| 2010/0035682 A1 | 2/2010 | Gentile et al. |
| 2010/0035688 A1 | 2/2010 | Picunko |
| 2010/0039378 A1 | 2/2010 | Yabe et al. |
| 2010/0041477 A1 | 2/2010 | Kay et al. |
| 2010/0062405 A1 | 3/2010 | Zboray et al. |
| 2010/0064238 A1 | 3/2010 | Ludwig |
| 2010/0080528 A1 | 4/2010 | Yen et al. |
| 2010/0087240 A1 | 4/2010 | Egozy et al. |
| 2010/0100848 A1 | 4/2010 | Ananian et al. |
| 2010/0113117 A1 | 5/2010 | Ku et al. |
| 2010/0118033 A1 | 5/2010 | Faria |
| 2010/0120470 A1 | 5/2010 | Kim et al. |
| 2010/0137049 A1 | 6/2010 | Epstein |
| 2010/0138785 A1* | 6/2010 | Uoi et al. ................ 715/810 |
| 2010/0144436 A1 | 6/2010 | Marks et al. |
| 2010/0151948 A1 | 6/2010 | Vance et al. |
| 2010/0160038 A1 | 6/2010 | Youm et al. |
| 2010/0161432 A1 | 6/2010 | Kumanov et al. |
| 2010/0167823 A1 | 7/2010 | Winkler |
| 2010/0186579 A1 | 7/2010 | Schnitman |

(56) References Cited

U.S. PATENT DOCUMENTS

| | | |
|---|---|---|
| 2010/0192106 A1 | 7/2010 | Watanabe et al. |
| 2010/0199221 A1* | 8/2010 | Yeung et al. .................. 715/850 |
| 2010/0209003 A1 | 8/2010 | Toebes et al. |
| 2010/0216598 A1 | 8/2010 | Nicolas et al. |
| 2010/0228740 A1 | 9/2010 | Cannistraro et al. |
| 2010/0231523 A1 | 9/2010 | Chou |
| 2010/0238182 A1 | 9/2010 | Geisner et al. |
| 2010/0245241 A1 | 9/2010 | Kim et al. |
| 2010/0247081 A1 | 9/2010 | Victoria Pons et al. |
| 2010/0255398 A1 | 10/2010 | Jacobson et al. |
| 2010/0255827 A1 | 10/2010 | Jordan et al. |
| 2010/0261146 A1 | 10/2010 | Kim |
| 2010/0265398 A1 | 10/2010 | Johnson et al. |
| 2010/0278393 A1 | 11/2010 | Snook et al. |
| 2010/0283723 A1 | 11/2010 | Konishi |
| 2010/0299405 A1 | 11/2010 | Socher et al. |
| 2010/0300264 A1 | 12/2010 | Foster |
| 2010/0300265 A1 | 12/2010 | Foster et al. |
| 2010/0300266 A1 | 12/2010 | Stoddard et al. |
| 2010/0300267 A1 | 12/2010 | Stoddard et al. |
| 2010/0300268 A1 | 12/2010 | Applewhite et al. |
| 2010/0300269 A1 | 12/2010 | Applewhite |
| 2010/0300270 A1 | 12/2010 | Applewhite et al. |
| 2010/0300272 A1 | 12/2010 | Scherf |
| 2010/0302145 A1 | 12/2010 | Langridge et al. |
| 2010/0302155 A1* | 12/2010 | Sands et al. .................. 345/163 |
| 2010/0304810 A1 | 12/2010 | Stoddard |
| 2010/0304811 A1 | 12/2010 | Schmidt et al. |
| 2010/0304812 A1 | 12/2010 | Stoddard et al. |
| 2010/0304860 A1 | 12/2010 | Gault et al. |
| 2010/0304863 A1 | 12/2010 | Applewhite et al. |
| 2010/0304865 A1 | 12/2010 | Picunko et al. |
| 2010/0306655 A1 | 12/2010 | Mattingly et al. |
| 2010/0306713 A1* | 12/2010 | Geisner .................. G06F 3/0481 715/863 |
| 2011/0010667 A1 | 1/2011 | Sakai et al. |
| 2011/0021273 A1 | 1/2011 | Buckley et al. |
| 2011/0028214 A1 | 2/2011 | Bright et al. |
| 2011/0039659 A1 | 2/2011 | Kim et al. |
| 2011/0047471 A1 | 2/2011 | Lord et al. |
| 2011/0066940 A1 | 3/2011 | Asghari Kamrani et al. |
| 2011/0080336 A1 | 4/2011 | Leyvand et al. |
| 2011/0083106 A1* | 4/2011 | Hamagishi .................. 715/836 |
| 2011/0083112 A1* | 4/2011 | Matsubara et al. .......... 715/863 |
| 2011/0083122 A1 | 4/2011 | Chen et al. |
| 2011/0098106 A1 | 4/2011 | He et al. |
| 2011/0098109 A1 | 4/2011 | Leake et al. |
| 2011/0105206 A1 | 5/2011 | Rowe |
| 2011/0111850 A1 | 5/2011 | Beerhorst et al. |
| 2011/0118621 A1 | 5/2011 | Chu |
| 2011/0140931 A1 | 6/2011 | Geurts et al. |
| 2011/0151974 A1 | 6/2011 | Deaguero |
| 2011/0151975 A1 | 6/2011 | Mori |
| 2011/0159938 A1 | 6/2011 | Umeda |
| 2011/0169832 A1* | 7/2011 | Brown .................. G06F 3/0304 345/427 |
| 2011/0185309 A1* | 7/2011 | Challinor et al. ............ 715/784 |
| 2011/0195779 A1 | 8/2011 | Lau |
| 2011/0197740 A1 | 8/2011 | Chang et al. |
| 2011/0237324 A1 | 9/2011 | Clavin et al. |
| 2011/0238676 A1 | 9/2011 | Liu et al. |
| 2011/0251840 A1 | 10/2011 | Cook et al. |
| 2011/0255803 A1 | 10/2011 | Togawa |
| 2011/0256929 A1 | 10/2011 | Dubrofsky et al. |
| 2011/0257771 A1 | 10/2011 | Bennett et al. |
| 2011/0283236 A1 | 11/2011 | Beaumier et al. |
| 2011/0291988 A1* | 12/2011 | Bamji .................. G06F 3/0428 345/175 |
| 2011/0306396 A1 | 12/2011 | Flury et al. |
| 2011/0306397 A1 | 12/2011 | Fleming et al. |
| 2011/0306398 A1 | 12/2011 | Boch et al. |
| 2011/0312397 A1 | 12/2011 | Applewhite et al. |
| 2011/0312415 A1 | 12/2011 | Booth et al. |
| 2012/0013493 A1 | 1/2012 | Kato |
| 2012/0021833 A1 | 1/2012 | Boch et al. |
| 2012/0052942 A1 | 3/2012 | Esaki et al. |
| 2012/0052947 A1 | 3/2012 | Yun |
| 2012/0063617 A1 | 3/2012 | Ramos |
| 2012/0069131 A1 | 3/2012 | Abelow |
| 2012/0094730 A1 | 4/2012 | Egozy |
| 2012/0108305 A1 | 5/2012 | Akiyama et al. |
| 2012/0108334 A1 | 5/2012 | Tarama et al. |
| 2012/0143358 A1 | 6/2012 | Adams et al. |
| 2012/0157263 A1 | 6/2012 | Sivak et al. |
| 2012/0214587 A1 | 8/2012 | Segal |
| 2012/0309477 A1 | 12/2012 | Mayles et al. |
| 2013/0132837 A1 | 5/2013 | Mead et al. |
| 2013/0203492 A1 | 8/2013 | Yum |
| 2013/0257807 A1* | 10/2013 | Harris .................. G06F 3/0418 345/175 |
| 2014/0208204 A1* | 7/2014 | Lacroix .................. G06F 3/016 715/702 |
| 2015/0141102 A1 | 5/2015 | Asami et al. |

FOREIGN PATENT DOCUMENTS

| | | |
|---|---|---|
| AU | 200194329 | 10/2001 |
| AU | 2003285918 | 5/2004 |
| AU | 2010229693 A1 | 11/2011 |
| CA | 2587415 A1 | 5/2005 |
| CA | 2609587 A1 | 12/2005 |
| CA | 2720723 A1 | 11/2009 |
| CA | 2757238 A1 | 9/2010 |
| CA | 2760210 A1 | 12/2010 |
| DE | 19716937 A1 | 3/1998 |
| DE | 69804915 T2 | 5/2002 |
| DE | 69726507 T2 | 11/2004 |
| DE | 69832379 T2 | 8/2006 |
| DE | 69739885 | 7/2010 |
| EP | 0903169 A2 | 3/1999 |
| EP | 919267 A2 | 6/1999 |
| EP | 972550 A2 | 1/2000 |
| EP | 974382 A1 | 1/2000 |
| EP | 974954 A1 | 1/2000 |
| EP | 978301 A1 | 2/2000 |
| EP | 982055 A1 | 3/2000 |
| EP | 992928 A2 | 4/2000 |
| EP | 992929 A2 | 4/2000 |
| EP | 993847 A1 | 4/2000 |
| EP | 0997870 A1 | 5/2000 |
| EP | 1003130 A2 | 5/2000 |
| EP | 1022672 A1 | 7/2000 |
| EP | 1029565 A2 | 8/2000 |
| EP | 1029566 A2 | 8/2000 |
| EP | 1029570 A2 | 8/2000 |
| EP | 1029571 A2 | 8/2000 |
| EP | 1031363 A2 | 8/2000 |
| EP | 1031904 A2 | 8/2000 |
| EP | 1033157 A2 | 9/2000 |
| EP | 1033158 A2 | 9/2000 |
| EP | 1043745 A1 | 10/2000 |
| EP | 1043746 A1 | 10/2000 |
| EP | 1048330 A2 | 11/2000 |
| EP | 1061501 A1 | 12/2000 |
| EP | 1064974 A2 | 1/2001 |
| EP | 1064975 A2 | 1/2001 |
| EP | 1066866 A2 | 1/2001 |
| EP | 1079368 A1 | 2/2001 |
| EP | 1 081 680 A1 | 3/2001 |
| EP | 1081679 A1 | 3/2001 |
| EP | 1082981 A2 | 3/2001 |
| EP | 1082982 A2 | 3/2001 |
| EP | 1082983 A2 | 3/2001 |
| EP | 1088573 A1 | 4/2001 |
| EP | 1 096 468 A2 | 5/2001 |
| EP | 1114659 A2 | 7/2001 |
| EP | 1122703 A2 | 8/2001 |
| EP | 1125607 A2 | 8/2001 |
| EP | 1125613 A2 | 8/2001 |
| EP | 1127599 A2 | 8/2001 |
| EP | 1130569 A2 | 9/2001 |
| EP | 1132889 A2 | 9/2001 |
| EP | 1134723 A2 | 9/2001 |
| EP | 1136107 A2 | 9/2001 |

(56) References Cited

FOREIGN PATENT DOCUMENTS

| | | | |
|---|---|---|---|
| EP | 1138357 | A1 | 10/2001 |
| EP | 1139293 | A2 | 10/2001 |
| EP | 1145744 | A2 | 10/2001 |
| EP | 1145745 | A2 | 10/2001 |
| EP | 1145748 | A2 | 10/2001 |
| EP | 1145749 | A2 | 10/2001 |
| EP | 1150276 | A2 | 10/2001 |
| EP | 1151770 | A2 | 11/2001 |
| EP | 1151773 | A2 | 11/2001 |
| EP | 1157723 | A2 | 11/2001 |
| EP | 1159992 | A2 | 12/2001 |
| EP | 1160762 | A2 | 12/2001 |
| EP | 1161974 | A2 | 12/2001 |
| EP | 1 174 856 | A2 | 1/2002 |
| EP | 1170041 | A2 | 1/2002 |
| EP | 1178427 | A1 | 2/2002 |
| EP | 1184061 | A1 | 3/2002 |
| EP | 1187427 | A2 | 3/2002 |
| EP | 1192976 | A2 | 4/2002 |
| EP | 1195721 | A2 | 4/2002 |
| EP | 1197947 | A2 | 4/2002 |
| EP | 1199702 | A2 | 4/2002 |
| EP | 1199703 | A2 | 4/2002 |
| EP | 1 201 277 | A2 | 5/2002 |
| EP | 1206950 | A2 | 5/2002 |
| EP | 1208885 | A1 | 5/2002 |
| EP | 1214959 | A2 | 6/2002 |
| EP | 1220539 | A2 | 7/2002 |
| EP | 1228794 | A2 | 8/2002 |
| EP | 1245255 | A2 | 10/2002 |
| EP | 1249260 | A2 | 10/2002 |
| EP | 1258274 | A2 | 11/2002 |
| EP | 1264622 | A2 | 12/2002 |
| EP | 1270049 | A2 | 1/2003 |
| EP | 1270050 | A2 | 1/2003 |
| EP | 1271294 | A2 | 1/2003 |
| EP | 1279425 | A2 | 1/2003 |
| EP | 1287864 | A2 | 3/2003 |
| EP | 1306112 | A1 | 5/2003 |
| EP | 1413340 | A1 | 4/2004 |
| EP | 000181482-0005 | | 9/2004 |
| EP | 1503365 | A1 | 2/2005 |
| EP | 1533010 | A1 | 5/2005 |
| EP | 1542132 | A1 | 6/2005 |
| EP | 1552864 | A1 | 7/2005 |
| EP | 1552865 | A1 | 7/2005 |
| EP | 1569171 | A1 | 8/2005 |
| EP | 1604711 | A1 | 12/2005 |
| EP | 1609513 | A1 | 12/2005 |
| EP | 1630746 | A1 | 3/2006 |
| EP | 1666109 | A1 | 6/2006 |
| EP | 1696385 | A2 | 8/2006 |
| EP | 1699017 | A2 | 9/2006 |
| EP | 1731204 | A1 | 12/2006 |
| EP | 1743680 | A1 | 1/2007 |
| EP | 1 758 387 | A1 | 2/2007 |
| EP | 1 825 896 | A1 | 8/2007 |
| EP | 000859418-0008 | | 2/2008 |
| EP | 000890447-0040 | | 4/2008 |
| EP | 000890447-0046 | | 4/2008 |
| EP | 2000190 | A2 | 12/2008 |
| EP | 2001569 | A2 | 12/2008 |
| EP | 2027577 | A1 | 2/2009 |
| EP | 2206539 | A1 | 7/2010 |
| EP | 2206540 | A1 | 7/2010 |
| EP | 2301253 | A1 | 3/2011 |
| EP | 2411101 | A2 | 2/2012 |
| EP | 2494432 | A2 | 9/2012 |
| FI | 200705530 | | 1/2009 |
| FI | 20096276 | | 12/2009 |
| GB | 2118809 | A | 11/1983 |
| GB | 2330739 | A | 4/1999 |
| GB | 2425730 | A | 11/2006 |
| GB | 2465918 | A | 6/2010 |
| GB | 2471871 | A | 1/2011 |
| HK | 1018021 | A1 | 10/2002 |
| HK | 1023734 | A1 | 2/2006 |
| JP | 7185131 | A | 7/1995 |
| JP | 3014386 | B1 | 8/1995 |
| JP | 2552427 | Y2 | 11/1996 |
| JP | 11053563 | A | 2/1999 |
| JP | 11128534 | A | 5/1999 |
| JP | 11128535 | A | 5/1999 |
| JP | 11151380 | A | 6/1999 |
| JP | 11156054 | A | 6/1999 |
| JP | 2922509 | | 7/1999 |
| JP | 11219443 | A | 8/1999 |
| JP | 2951948 | B1 | 9/1999 |
| JP | 2982147 | B1 | 11/1999 |
| JP | 11313979 | A | 11/1999 |
| JP | 11328124 | A | 11/1999 |
| JP | 3003851 | U | 1/2000 |
| JP | 2000014931 | | 1/2000 |
| JP | 2000037490 | | 2/2000 |
| JP | 3017986 | B1 | 3/2000 |
| JP | 3031676 | B1 | 4/2000 |
| JP | 2000107447 | A | 4/2000 |
| JP | 2000107458 | | 4/2000 |
| JP | 2000112485 | A | 4/2000 |
| JP | 2000116938 | A | 4/2000 |
| JP | 3053090 | B1 | 6/2000 |
| JP | 2000157723 | | 6/2000 |
| JP | 3066528 | U | 7/2000 |
| JP | 2000218046 | | 8/2000 |
| JP | 3088409 | B2 | 9/2000 |
| JP | 2000237454 | A | 9/2000 |
| JP | 2000237455 | A | 9/2000 |
| JP | 2000245957 | | 9/2000 |
| JP | 2000245964 | A | 9/2000 |
| JP | 2000245967 | | 9/2000 |
| JP | 2000250534 | | 9/2000 |
| JP | 2000/288254 | | 10/2000 |
| JP | 2000293292 | A | 10/2000 |
| JP | 2000293294 | A | 10/2000 |
| JP | 2000300838 | A | 10/2000 |
| JP | 2000300851 | A | 10/2000 |
| JP | 2000308759 | A | 11/2000 |
| JP | 2000317144 | A | 11/2000 |
| JP | 2000325665 | A | 11/2000 |
| JP | 2000350861 | A | 12/2000 |
| JP | 2001000610 | A | 1/2001 |
| JP | 2001009149 | A | 1/2001 |
| JP | 2001009152 | A | 1/2001 |
| JP | 2001009157 | A | 1/2001 |
| JP | 2001046739 | A | 2/2001 |
| JP | 2001062144 | A | 3/2001 |
| JP | 2001070637 | A | 3/2001 |
| JP | 2001070640 | A | 3/2001 |
| JP | 2001070652 | A | 3/2001 |
| JP | 2001075579 | A | 3/2001 |
| JP | 2001096059 | A | 4/2001 |
| JP | 2001096061 | A | 4/2001 |
| JP | 2001129244 | A | 5/2001 |
| JP | 2001145777 | A | 5/2001 |
| JP | 2001145778 | A | 5/2001 |
| JP | 3179769 | B2 | 6/2001 |
| JP | 2001162049 | A | 6/2001 |
| JP | 2001170352 | A | 6/2001 |
| JP | 2001175254 | A | 6/2001 |
| JP | 3187758 | B2 | 7/2001 |
| JP | 2001190834 | A | 7/2001 |
| JP | 2001190835 | A | 7/2001 |
| JP | 2001190844 | A | 7/2001 |
| JP | 2001198351 | U | 7/2001 |
| JP | 2001198352 | A | 7/2001 |
| JP | 2001198354 | A | 7/2001 |
| JP | 3202733 | B2 | 8/2001 |
| JP | 2001212369 | A | 8/2001 |
| JP | 2001218980 | A | 8/2001 |
| JP | 2001222280 | A | 8/2001 |
| JP | 2001224850 | A | 8/2001 |
| JP | 2001231904 | A | 8/2001 |
| JP | 2001232059 | A | 8/2001 |
| JP | 2001232062 | A | 8/2001 |

(56) References Cited

FOREIGN PATENT DOCUMENTS

| | | |
|---|---|---|
| JP | 2001-252470 | 9/2001 |
| JP | 3204652 B2 | 9/2001 |
| JP | 2001252467 A | 9/2001 |
| JP | 2001252470 A | 9/2001 |
| JP | 2001259224 A | 9/2001 |
| JP | 2001269482 A | 10/2001 |
| JP | 2001273517 A | 10/2001 |
| JP | 2001293246 | 10/2001 |
| JP | 2001293254 A | 10/2001 |
| JP | 2001293256 A | 10/2001 |
| JP | 2001299975 A | 10/2001 |
| JP | 2001312260 A | 11/2001 |
| JP | 2001312740 A | 11/2001 |
| JP | 2001314645 A | 11/2001 |
| JP | 2001321565 A | 11/2001 |
| JP | 2001344049 A | 12/2001 |
| JP | 2001353374 A | 12/2001 |
| JP | 3245139 B2 | 1/2002 |
| JP | 2002000936 A | 1/2002 |
| JP | 2002018123 A | 1/2002 |
| JP | 2002018134 A | 1/2002 |
| JP | 2002028368 A | 1/2002 |
| JP | 3258647 B2 | 2/2002 |
| JP | 3261110 B2 | 2/2002 |
| JP | 2002045567 A | 2/2002 |
| JP | 2002056340 A | 2/2002 |
| JP | 2002066127 A | 3/2002 |
| JP | 2002066128 A | 3/2002 |
| JP | 2002084292 A | 3/2002 |
| JP | 3270928 B2 | 4/2002 |
| JP | 2002116752 A | 4/2002 |
| JP | 2002140727 A | 5/2002 |
| JP | 2002143567 A | 5/2002 |
| JP | 2002153673 A | 5/2002 |
| JP | 3306021 B2 | 7/2002 |
| JP | 2002204426 A | 7/2002 |
| JP | 3310257 B2 | 8/2002 |
| JP | 3317686 B2 | 8/2002 |
| JP | 3317956 B2 | 8/2002 |
| JP | 2002224435 A | 8/2002 |
| JP | 2002239223 A | 8/2002 |
| JP | 2002239233 A | 8/2002 |
| JP | 3320700 B2 | 9/2002 |
| JP | 3321111 B2 | 9/2002 |
| JP | 2002263229 A | 9/2002 |
| JP | 3333773 B2 | 10/2002 |
| JP | 3338005 B2 | 10/2002 |
| JP | 2002282417 A | 10/2002 |
| JP | 2002282418 A | 10/2002 |
| JP | 2002292123 A | 10/2002 |
| JP | 2002292139 A | 10/2002 |
| JP | 2002301263 A | 10/2002 |
| JP | 3345591 B2 | 11/2002 |
| JP | 3345719 B2 | 11/2002 |
| JP | 2002325975 A | 11/2002 |
| JP | 3351780 B2 | 12/2002 |
| JP | 2002360937 A | 12/2002 |
| JP | 3361084 B2 | 1/2003 |
| JP | 3370313 B2 | 1/2003 |
| JP | 3371132 B2 | 1/2003 |
| JP | 2003000951 A | 1/2003 |
| JP | 2003010541 A | 1/2003 |
| JP | 2003010542 A | 1/2003 |
| JP | 2003019346 A | 1/2003 |
| JP | 2003030686 A | 1/2003 |
| JP | 2003058317 A | 2/2003 |
| JP | 3392833 B2 | 3/2003 |
| JP | 2003117233 A | 4/2003 |
| JP | 2003126548 A | 5/2003 |
| JP | 3417555 B2 | 6/2003 |
| JP | 3417918 B2 | 6/2003 |
| JP | 3420221 B2 | 6/2003 |
| JP | 2003175279 A | 6/2003 |
| JP | 3425548 B2 | 7/2003 |
| JP | 3425552 B2 | 7/2003 |
| JP | 3433918 B2 | 8/2003 |
| JP | 3439187 B2 | 8/2003 |
| JP | 2003236244 A | 8/2003 |
| JP | 3442730 B2 | 9/2003 |
| JP | 3448043 B2 | 9/2003 |
| JP | 2003256552 A | 9/2003 |
| JP | 3458090 B2 | 10/2003 |
| JP | 3470119 B2 | 11/2003 |
| JP | 2003334387 A | 11/2003 |
| JP | 3491759 B1 | 1/2004 |
| JP | 2004016315 A | 1/2004 |
| JP | 2004016388 A | 1/2004 |
| JP | 3496874 B2 | 2/2004 |
| JP | 3500379 B1 | 2/2004 |
| JP | 3500383 B1 | 2/2004 |
| JP | 2004033266 A | 2/2004 |
| JP | 2004097610 A | 4/2004 |
| JP | 2004105309 A | 4/2004 |
| JP | 2004121397 A | 4/2004 |
| JP | 3526302 B1 | 5/2004 |
| JP | 2004141261 A | 5/2004 |
| JP | 3534345 B1 | 6/2004 |
| JP | 2004164519 A | 6/2004 |
| JP | 2004166994 A | 6/2004 |
| JP | 3545755 B2 | 7/2004 |
| JP | 3545983 B2 | 7/2004 |
| JP | 3546206 B2 | 7/2004 |
| JP | 3547374 B2 | 7/2004 |
| JP | 2004192069 A | 7/2004 |
| JP | 2004201937 A | 7/2004 |
| JP | 3561456 B2 | 9/2004 |
| JP | 3566195 B2 | 9/2004 |
| JP | 3573288 B2 | 10/2004 |
| JP | 3576994 B2 | 10/2004 |
| JP | 3582716 B2 | 10/2004 |
| JP | 2004283249 A | 10/2004 |
| JP | 2004298469 A | 10/2004 |
| JP | 2004321245 A | 11/2004 |
| JP | 3597465 B2 | 12/2004 |
| JP | 2004337256 A | 12/2004 |
| JP | 3611807 B2 | 1/2005 |
| JP | 2005046445 A | 2/2005 |
| JP | 2005049913 A | 2/2005 |
| JP | 3626711 B2 | 3/2005 |
| JP | 3634273 B2 | 3/2005 |
| JP | 2005095440 A | 4/2005 |
| JP | 3656118 B2 | 6/2005 |
| JP | 3686906 B2 | 8/2005 |
| JP | 3699660 B2 | 9/2005 |
| JP | 2005261586 A | 9/2005 |
| JP | 3702269 B2 | 10/2005 |
| JP | 2005287830 A | 10/2005 |
| JP | 2005301578 A | 10/2005 |
| JP | 3715513 B2 | 11/2005 |
| JP | 2005319025 A | 11/2005 |
| JP | 3727275 B2 | 12/2005 |
| JP | 2006020758 A | 1/2006 |
| JP | 3753425 B2 | 3/2006 |
| JP | 2006075264 A | 3/2006 |
| JP | 2006116046 A | 5/2006 |
| JP | 2006116047 A | 5/2006 |
| JP | 2006192157 A | 7/2006 |
| JP | 3804939 B2 | 8/2006 |
| JP | 3816931 B2 | 8/2006 |
| JP | 3822887 B2 | 9/2006 |
| JP | 3831695 B2 | 10/2006 |
| JP | 3869175 B2 | 1/2007 |
| JP | 2007029589 A | 2/2007 |
| JP | 3890445 B2 | 3/2007 |
| JP | 2007504901 A | 3/2007 |
| JP | 2008018287 A | 1/2008 |
| JP | 2008168143 A | 7/2008 |
| JP | 2009531153 A | 9/2009 |
| JP | 2010509000 A | 3/2010 |
| KR | 20010027533 A | 4/2001 |
| KR | 20050047024 A | 5/2005 |
| RU | 2010146213 A | 5/2012 |
| SG | 173496 A1 | 9/2011 |
| TW | 340049 | 3/2009 |

(56) References Cited

FOREIGN PATENT DOCUMENTS

| | | | |
|---|---|---|---|
| TW | 200951764 A | 12/2009 | |
| TW | 201006526 A | 2/2010 | |
| TW | 322023 | 3/2010 | |
| TW | 201116318 A | 5/2011 | |
| WO | WO-199717598 A1 | 5/1997 | |
| WO | WO-97/23845 A2 | 7/1997 | |
| WO | WO-9938588 A1 | 8/1999 | |
| WO | WO-01/63592 A2 | 8/2001 | |
| WO | WO-0163592 | 8/2001 | |
| WO | WO-2002030535 A1 | 4/2002 | |
| WO | WO-200402590 A1 | 1/2004 | |
| WO | WO-200402594 A1 | 1/2004 | |
| WO | WO-200424256 A1 | 3/2004 | |
| WO | WO-200424263 A1 | 3/2004 | |
| WO | WO-200427631 A1 | 4/2004 | |
| WO | WO-200430779 A1 | 4/2004 | |
| WO | WO-2004039055 A2 | 5/2004 | |
| WO | WO-200453800 A1 | 6/2004 | |
| WO | WO-2004052483 A1 | 6/2004 | |
| WO | WO-200482786 A1 | 9/2004 | |
| WO | WO-200487272 A1 | 10/2004 | |
| WO | WO-2004101093 A1 | 11/2004 | |
| WO | WO-2004107270 A1 | 12/2004 | |
| WO | WO-200527062 A1 | 3/2005 | |
| WO | WO-200527063 A1 | 3/2005 | |
| WO | WO-200530354 A1 | 4/2005 | |
| WO | WO-2005039212 A1 | 4/2005 | |
| WO | WO-200599842 A1 | 10/2005 | |
| WO | WO-2005107902 A1 | 11/2005 | |
| WO | WO-2005/113096 A1 | 12/2005 | |
| WO | WO-2005114648 A1 | 12/2005 | |
| WO | WO-200606274 A1 | 1/2006 | |
| WO | WO-200675494 A1 | 7/2006 | |
| WO | WO-07/055522 A1 | 5/2007 | |
| WO | WO-2007070738 A2 | 6/2007 | |
| WO | WO-2007078639 | 7/2007 | |
| WO | WO-2007/115299 A2 | 10/2007 | |
| WO | WO-2007111247 A1 | 10/2007 | |
| WO | WO-2007130582 A2 | 11/2007 | |
| WO | WO-2008001088 A2 | 1/2008 | |
| WO | WO-2008145952 A1 | 12/2008 | |
| WO | WO-2009021124 A2 | 2/2009 | |
| WO | WO-2010018485 A1 | 2/2010 | |
| WO | WO-2010036989 A1 | 4/2010 | |
| WO | WO-2011067469 A1 | 6/2011 | |
| WO | WO-11155958 A1 | 12/2011 | |

OTHER PUBLICATIONS

[Video] "E3 2010 Live Demo", where Ubi talked about MJ:TE for Kinect (<http://www.gametrailers.com/video/e3-2010-michael-jackson/101449>) Date not available.
[Video] MJ the Experience Kinect: release Apr. 2011, http//www.youtube.com/watch?v=N7oyxHIP48A.
[Video] 'Don't Stop' Gameplay Trailer: <http://www.gametrailers.com/video/dont-stop-michael-jackson/707336> (Nov. 10, 2010).
[Video] 'Ghosts' Gameplay Trailer: <http://www.gametrailers.com/video/ghosts-gameplay-michael-jackson/706825> (Oct. 27, 2010).
[Video] Dance Summit 2001: Bust a Groove (Released Nov. 2, 2000 for PS2); <http://www.youtube.com/watch?v=E8NjTGHYQcM>.
[Video] Dancing With the Stars—Activision, Zoe Mode; <http://www.youtube.com/watch?v=C7zBVfEJ0gg> (Oct. 2007).
[Video] Dancing with the Stars: We Dance—Activision, Zoe Mode; <http://www.youtube.com/watch?v=3lG0b-CT8vs> (Oct. 2008).
[Video] DDR Hottest Party; <http://www.youtube.com/watch?v=zk20hEzGmUY> (Sep. 2007).
[Video] E3 2010 Live Demo <http://www.gametrailers.com/video/e3-2010-michael-jackson/101449>; (Jun. 14, 2010).
[Video] Eyetoy Groove for PS2; <http://www.youtube.com/watch?v=c80aaOU_fuE>. Apr. 2004.
[Video] Gamescom '10—Billie Jean Demo <http://www.gametrailers.com/video/gc-10-michael-jackson/703294>(:58-1:13) (Aug. 20, 2010).

[Video] Gamescom '10—Working Day and Night Demo <http://www.gametrailers.com/video/gc-10-michael-jackson/703295> (Aug. 20, 2010).
[Video] Grease Dance—505 Games: release—Oct. 2011. http://www.youtube.com/watch?v=PaGBHSB2urg.
[Video] Hannah Montana: Spotlight World Tour (Released Nov. 6, 2007 for Wii); <http://www.youtube.com/watch?v=WtyuU2NaL3Q>.
[Video] Britney's Dance Beat (Released May 8, 2002 for PS2); <http://www.youtube.com/watch?v=-KR1dRGNX_w>.
[Video] Dance Dance Revolution: Hottest Party 3 (Released Sep. 27, 2009 for Wii) <http://www.youtube.com/watch?v=zk20hEzGmUY>.
[Video] Dance on Broadway—Ubisoft, Longtail Studios; <http://www.youtube.com/watch?v=eYaP-dT4z-M> (Jun. 6, 2010).
[Video] Dance on Broadway: Jun. 2010 (http://youtu.be/Wi9Y5HHcvtY).
[Video] Dancing with the Stars: Oct. 2007 (http://www.youtube.com/watch?v=8UChG2v5Dl).
Amplitude for Playstation. Retrieved from the Internet: www.target.com/gp/detail.hbnl/601-0682676-9911341?asin=B0000859TM&AFID. Retrieved on Feb. 22, 2005. 1 page.
Amplitude Review by Ryan Davis. Retrieved from the Internet: www.gamespot.com/ps2/puzzle/ampli~de /printable_ 6023980.html. Retrieved on Jun. 11, 2012. 4 pages.
Amplitude. Retrieved from the Internet: www.gamesquestdirect.com/71171972582.htrnl. Retrieved on Jun. 8, 2012. 2 pages.
Amplitude: Sony's Rocking Rhythm Game Outdoes Itself on All Fronts by Douglass C. Perry. Retrieved from the Internet: http://ps2.ign.com/articles/390/390620pl.thml. Feb. 22, 2005. 6 pages.
Association of British Scrabble Players. "Rolling System" ABSP, http://www.absp.org.uk/results/ratings_detail.shtml. Retrieved May 25, 2011 (4 pages).
Beat Planet Music (Import) Review by Christian Nutt. Retrieved from the Internet: www.gamespot.com/ps/ action/beatplanetmusiclprintable _ 2546762.html. Retrieved on Jun. 11, 2012. 3 pages.
Beatmania IIDX 9 Style. Retrieved from the Internet: www.play-asia.com/paOS-13-71-8-iu.html. Retrieved on Feb. 22, 2005. 2 pages.
Beatmania PlayStation Review from www.GamePro.com/sony/psx/games/reviews/89.shtml. Retrieved on Feb. 22, 2005. 1 page.
Beatmania Review. Retrieved from the Internet: www.gamesarefun.com/gamesdb/review.php?reviewid=294. Retrieved on Jun. 11, 2012. 1 page.
Beatmania IIDX 7 Style. Retrieved from the Internet: www.lik-sang.com/Info.php?category=27&products id=4061. Retrieved on Feb. 22, 2005. 1 page.
Beatnik Patent Sale Offering, Nov. 2008 (81 pp).
Bishop, Sam; Frequency: If you decide to pick up this game, you better give up ont he idea of getting a full night of sleep. via www.ign.com [online], Nov. 26, 2001 [retrieved on Mar. 1, 2006]. Retrieved from the Internet <URL: http://ps2.ign.com/articles/166/166450p1.html>. Retrieved on Jun. 8, 2012. 8 pages.
Boombox Icons, http://findicons.com/search/boombox, viewed on Jul. 31, 2012 copyright 2010 (1 page).
Bust a Groove Review by Jeff Gerstmann. Retrieved from the Internet: www.gamespolcom/ps/puzzlelbusta groove/printable_ 2546923.html. Retrieved on Jun. 11, 2012. 9 pages.
Bust a Groove. Retrieved from the Internet: www.buyritegames.com/product_information.asp?rc=frgl&number=PS-BUSTA2. Retrieved on Feb. 22, 2005. 1 page.
Bust a Groove. Retrieved from the Internet: www.estarland.com/index.asp?page=Playstation&cat=F&oroduct=6257&q. Retrieved on Jun. 11, 2012. 2 pages.
Bust a Groove: 989 Studios Best Game of the Year is a Funky Dance Sim thars Got the Fever by Doug Peny. Retrieved from the Internet http://psx.com/articles/152/152308pl.html. Retrieved on Jun. 8, 2012. 5 pages.
Dance Dance Revolution Review by Andy Chien. Retrieved from the Internet www.gamin-age.com/reviews /archive/old reviews/psx/ddr. Retrieved on Feb. 22, 2005. 3 pages.
Dance Dance Revolution Review by Ryan Davis. Retrieved from the Internet www.gamespotcom/ps/puzzle /dancedancerevolutionfprintable_2699724.html. Retrieved on Jun. 11, 2012. 9 pages.

(56) References Cited

OTHER PUBLICATIONS

Dance Dance Revolution, Konami via wvvw.ign.com [online], Apr. 4, 2001 [retrieved on Mar. 1, 2006]. Retrieved from the Internet <URL: http://psx.ign.com/articles/161/161525p1.html>. Retrieved on Jun. 14, 2012. 7 pages.
Dance Dance Revolution. Retrieved from the Internet: www.ebgames.com/ebxlproduct/224 789.asp. Retrieved on Feb. 22, 2005. 2 pages.
Dancing with the Stars Game Manual (1 page). Date not available.
Dave H, et al. StepMania Tutorial. Nov. 3, 2004. <http://web.archive.org/web/20041103 1145/vww.stepmania.conVstepmania/wiki.php?pagename=Tutorial>. Retrieved on Jun. 19, 2012. 7 pages.
Def Jam Vendetta Review by Alex Navarro. Retrieved from the Internet www.gamespot.com/ps2/actionf actionfdefjamvendetta/printable_ 6024297 .html. Retrieved on Jun. 11, 2012. 10 pages.
Def Jam Vendetta. Retrieved from the Internet www.ebgames.com/ebxlproduct/232378.asp. Retrieved on Feb. 22, 2005. 2 pages.
Def Jam Vendetta: Rapper's Delight or Fight-Night Fright? Smash Sumthin' and Find Out by Jon Robinson. Mar. 31, 2003. Retrieved from the Internet http://ps2.ign.com/articles/391/391713pl.html. Retrieved on Jun. 8, 2012. 6 pages.
Digital Play: Reloaded. Opening Reception. Museum of the Moving Image. Mar. 19, 2005. <http://web.archive.Org/web/20050319060247/http://www.movingimage.us/site/screenings/contenV2005/digital_play_reloaded.ht ml>. 1 page.
Donkey Konga Review by Ryan Davis. Retrieved from the Internet: www.gamespot.com/gamecubelpuzzle/ donkeykonga/printable_6108977.html. Retrieved on Jun. 11, 2012. 11 pages.
Donkey Konga. Retrieved from the Internet: www.ebgames.com/ebx/product/244024.asp. Retrieved on Jun. 11, 2012. 2 pages.
Donkey Konga: Could a Game Featuring Donkey Kong and Mini-Bongos ever Fail? Our Ful Review by Juan Castro. Retrieved from the Internet: cube.ign.com/articles/550/550723pl.html. Retrieved on Jun. 8, 2012. 6 pages.
DrumMana w/ Drum Set. Retrieved from the Internet www.estarland.com/index.asp?page=Playstation2&cat=RD&product=181268 &q. Retrieved on Jun. 11, 2012. 2 pages.
DrumMania (Import) Review by Jeff Garstmann. Retrieved from the Internet: www.gamespot.com/ps2/actionf drummania/prinlable_2546356.html. Retrieved on Jun. 11, 2012. 9 pages.
DrumMania OST. Retrieved from the Internet www.lik-sang.corn/info/php?category=264&products id=4793. Retrieved on Feb. 22, 2005. 2 pages.
DrumMania Review by Wynfwad. Retrieved from the Internet www.gamefaqs.com/console/ps2/review/ R56573.html. Retrieved on Jun. 11, 2012. 2 pages.
ESRB Game Ratings: Game Rating & Descriptor Guide via www.esrb.org[online], Retrived from the Internet: <URL: http:/Arvww.esrb.org/esrbratings_guide.asp#symbols>. Retrieved on Jun. 14, 2012. 3 pages.
Eye Toy Groove with Camera (Playstation 2). Retrieved from the Internet www.jr.com/JRProductPage.process?Product Code=PS2+97400&JRSource=google. Retrieved on Feb. 22, 2005. 1 page.
Eye Toy Groove with Eye Toy Camera PS2. Retrieved from the Internet: www.walmart.com/catalog/product.gsp?dest=9999999997&product id-2607013&s. Retrieved on Feb. 22, 2005. 1 page.
Eye Toy: Groove—The Little Camera That Could comes Back with a Few New Tricks by Ed Lewis. Retrieved from the Internet: htiy/ps2.ign.corn/artjcles/507/507854pl.html. Retrieved on Jun. 8, 2012. 8 pages.
Eye Toy: Groove Review by Ryan Davis. Retrieved from the Internet: wvm.gamespot.com/ps2/puzzle/ eyetoygroove/printable_6094754.html. Retrieved on Jun. 11, 2012. 10 pages.
Frequency—Pre-Played. Retrieved from the Internet www.ebgames.com/ebx/product/203370.asp. Retrieved on Feb. 22, 2005. 2 pages.
Frequency PS2 Review from GamePro.com, written by Dan Electro on Nov. 26, 2001. Retrieved from the Internet: www.gamepro.com/sony/ps2/games/reviews/18464.shtml. Retrieved on Jun. 11, 2012. 2 pages.
Frequency PS2. Retrieved from the Internet: www.walmart.com/catalog/producLgsp7dests9999999997&product id=1635738&s. Retrieved on Feb. 22, 2005. 2 pages.
Frequency Review by Ryan Davis. Retrieved from the Internet:www.gamespot.com/ps2/puzzle/frequency/ printable 2827476.html. Retrieved on Jun. 19, 2012. 9 pages.
Get on Da Mic Overview by Matt Gonzales. Retrieved from the Internet www.gamechronides.com/reviews/ ps2/getondamic/body.htm. Retrieved on Jun. 11, 2012. 3 pages.
Get on Da Mic Review by Jeff Gerstmann. Retrieved from the Internet wvw.gamespot.cx)rri/ps2/puzzle/getondamic/printable 6110242.html. Retrieved on Jun. 11, 2012. 10 pages.
Get on Da Mic. Retrieved from the Internet: www.ebgames.com/ebx/product/245102.asp. Retrieved on Jun. 11, 2012. 2 pages.
Gitaroo Man. Retrieved from the Internet www.estartand.com/index.asp?page=Piaystation2&cat=PZ&product=676&Q . . . Retrieved on Jun. 14, 2012. 2 pages.
Gitaroo-Man Review by David Smith. Retrieved from the Internet htt£-ys2.ign.conVara'c!es/354/ 354413pjLhtml. Retrieved on Jun. 11, 2012. 4 pages.
Gitaroo-Man Review by Ryan Davis. Retrieved from the Internet: www.gamesrx)t.coiTi/ps2/puzzle/gitaroomart/printable 2847915.html. Retrieved on Jun. 19, 2012. 9 pages.
Gitaroo-Man. Retrieved from the Internet vvvrw.buyritegames.com/productjnformation.asp?re=frgl&number=PS2-GITARO. Retrieved on Feb. 22, 2005. 1 page.
Guitar Freaks (Import) Review by Sam Kennedy. Retrieved from the Internet: www.gamespot.com/pslaction/ guitarfreaks/printable_2545966.html. Retrieved on Jun. 11, 2012. 10 pages.
Guitar Freaks Review by Wade Monnig. Retrieved from the Internet: www.gamesarefun.com/gamesdb/review. php? .reviewid=301. Retrieved on Jun. 11, 2012. 3 pages.
Guitar Freaks Sony. Retrieved from the Internet www.gameexpress.com/product_detail.cfm.?UPC=SCPS45422. Retrieved on Feb. 22, 2005. 1 page.
Guitar Freaks with Guitar. Retrieved from the Internet: www.buyritegames.com/product_informatlon.asp?rc=frgl&number=PSJ-GUilWG. Retrieved on Feb. 22, 2005. 1 page.
Guitar Hero (video game)—Wikipedia, the free encyclopedia—(Publisher—RedOctane) Release Date Nov. 2005. 25 pages.
Guitar Hero—Wikipedia, the free encyclopedia—Nov. 2005. http://en.wikipedia.org/w/index.php?title=guitarhero&oldid=137778068. Retrieved on May 22, 2012. 5 pages.
GuitarFreaks—Wikipedia, the free encyclopedia—(Publisher—Konami, Konami Digital Entertainment) Release Date 1998. Accessed on Mar. 19, 2009. 5 pages.
International Search Report issued for PCT/US2010/054300, dated May 31, 2011 (5 pages).
International Search Report, PCT/US2006/062287, dated May 10, 2007. 2 pages.
Ipodgames.com Tips. Dec. 4, 2004. <http://web.archive.org/web/20041204032612Awww.ipodgames.com/tips.html > 1 page.
Karaoke Revolution Review by Jeff Gerstmann. Retrieved from the Internet www.gamespot.com/ps2/puzzle/ karaokerevolution/printable ... 6081709.html. Retrieved on Jun. 14, 2012. 10 pages.
Karaoke Revolution. Retrieved from the Internet: www.ebgames.com/ebxlproduct/24806.asp. Retrieved on Feb. 22, 2005. 2 pages.
Karaoke Revolution: The Revolution will be Televised by Ed Lewis. Retrieved from the Internet: http://ps2.ign.com/articles/458/458064p1.html. Retrieved on Jun. 8, 2012. 7 pages.
Kuwayama, Y. Trademarks & Symbols, vol. 2: Symbolical Designs, Van Nostrand Reinhold Company, (Nov. 4, 1980). 4 pages.
Lohman, "Rockstar vs. Guitar Hero," (The Rebel Yell). Nov. 13, 2008, accessed on Mar. 19, 2009. 5 pages.
Mad Maestro!—Pre-Played. Retrieved from the Internet: www.ebgames.com/ebx/product/217604.asp. Retrieved on Feb. 22, 2005. 2 pages.
Mad Maestro! by Ryan Davis. Retrieved from the Internet: www.gamespot.com/ps2/puzzle.madmaestro/ printable_2856821.html. Retrieved on Jun. 19, 2012. 9 pages.

(56) References Cited

OTHER PUBLICATIONS

Mad Maestro: The First Orchestra-conducting Sim on US Soil—Is It All It Could Have Been? by David Smith. Retrieved from the Internet http://ps2.ign.com/articles/3551355561 p1.html. Retrieved on Jun. 8, 2012. 6 pages.
Microsoft Office Online Clip Art, http://office.microsoft.com/en-us/clipart/results.aspx?Scope=MC,MM,MP,MS&PoleAssetID=MCJ04316180000&Querty=Icons&CTT=6&Origin=EC01017435m (Feb. 21, 2007) (1 page).
Microsoft PowerPoint Handbook, (1 pages) (1992).
Mojib Ribbon Playtest by Anoop Gantayat. Retrieved from the Internet: htto://os2.ion.com/articles/442/442204p1.html. Retrieved on Jun. 8, 2012. 4 pages.
Mojib Ribbon—Review. Retrieved from the Internet: www.ntsc-uk.com/review.php?platform=ps2&game=MoiibRibbon. Retrieved on Jun. 14, 2012. 2 pages.
Mojib Ribbon. Retrieved from the Internet: www.lik-sang.comlInfo.php?category=27&productsid=3805&PHPSESSID=b9eQca. Retrieved on Feb. 22, 2005. 1 page.
Mojib Ribbon. Retrieved from the Internet: www.ncsxshop.com/cgi-bin/shop/SCPS.11033.html. Retrieved on Jun. 14, 2012. 2 pages.
NCSX.com; Game Synpopsys of Guitar Freaks and DrumMania Masterpiece Gold, with a date of Mar. 8, 2007, and with an Archive.org Wayback Machine Verified date of May 17, 2007, downloaded from http://web.archiv.org/web/20070517210234/http://www.ncsx.com/2007/030507/guitarfreaks_gold.htm (4 pages).
Non-Final Office Action as issued by The United States Patent and Trademark Office for U.S. Appl. No. 12/474,899, dated Jan. 19, 2011, 7 pages.
PaRappa the Rapper 2. Retrieved from the Internet:wvAV.amazon.eom/exedobidos/tg/deteil/-/B00005UNWD/ 104-4695527-8827110. Retrieved on Feb. 22, 2005. 2 pages.
PaRappa the Rapper Review by Jer Horwitz. Retrieved from the Internet: www.gamespot.com/pslpuzzlel parappatherapper/printable_2548866.html. Retrieved on Jun. 14, 2012. 9 pages.
Parappa the Rapper. Retrieved from the Internet: wvvw.estarland.com/index.asp?page=Playstation&cat=F&product=6871&q. Retrieved on Jun. 11, 2012. 2 pages.
Parappa the Rapper: PaRapper the Rapper is finally here, but does it live up to the hype? by Adam Douglas. Retrieved from the Internet http://psx.ign.com/articlesl150/150490p1.html. Retrieved on Jun. 8, 2012. 2 pages.
PopCap Games Site Review via www.download-free-games.com, retrieved on Mar. 3, 2006]. Retrieved from the Internet <URL:http7Avww.download-free-games.com/reviews/popcap_games.htm>. 2 pages.
Ramsey, A. Guitar Freaks and Drum Mania Masterpiece Gold FAQ v. 1.04, Apr. 2, 2007, downloaded from http://www.gamefaqs.com/console/ps2/file/937670/47326. 3 pages.
RedOctane. "Guitar Hero 2 Manual" Activision Publishing, Inc. (2006) (13 pages).
Rez PlayStation. Retrieved from the internet: http://global.yesasia.com/en/PrdDept.aspx/ pjd-1002847668. Retrieved on Jun. 14, 2012. 1 page.
Rez Review by Jeff Gerstmann. Retrieved from the Internet:www.qamespot.com/ps2/action/rez/printable 2838815.html. Retrieved on Jun. 11, 2012. 9 pages.
Rez. Retrieved from the Internet: www.estarland.com/playstation2.product.5426.html. Retrieved on Jun. 14, 2012. 2 pages.
Rez: You May Not Understand This Review. We May Not Either. But you should certainly play this game by.David Smith. Retrieved from the Internet: http://m.ign.com/articles/2002/01/09/rez. Retrieved on Jun. 11, 2012. 3 pages.
SingStar Party (SingStar2) Bundle. Retrieved from the Internet: www.gameswarehouse.com.Au/longpage.asp?gameid=10329. Retrieved on Feb. 22, 2005. 2 pages.
SingStar Party. Retrieved from the Internet: www.argos.co.uk/Webapp/wcs/stores/servlet/ProductDisplay?storeId=10001&langld. Retrieved on Feb. 22, 2005. 1 page.

SingStar Review (PS2) by James Hamer-Mortonl. Retrieved from the Internet http://ps2.twomtown.net/en uk/articles/ art.print.php?id=5279. Retrieved on Jun. 11, 2012. 5 pages.
SingStar Review by Luke Van Leuveren. Retrieved from the Internet http://palgn.com.aii/article.php7id-1282. Retrieved on Jun. 11, 2012. 5 pages.
Space Channel 5 Special Edition Review by Brad Shoemaker. Retrieved from the Internet: www.gamespot.corn/ps2/puzzle/spacecriannel5pait2/printeble_6085137.h Retrieved on Jun. 11, 2012. 10 pages.
Space Channel 5. Retrieved from the Internet: www.lik-sang.com/info.php?products_is=2050&likref=fro_gle4. Retrieved on Feb. 22, 2005. 1 page.
Space Channel 5: Description. Retrieved from the Internet: www.buyritegames.com/product_information.asp?rc=frgl&number=DC-SPACEC5. Retrieved on Feb. 22, 2005. 1 page.
Space Channel 5: Special Edition by Jason Thompson. Retrieved from the Internet www.popmattere.corn/ mulumerJia/reviews/s/space-channel-5.shtml. Retrieved on Jun. 8, 2012. 2 pages.
Taiko Drum Master Review by Justin Calvert. Retrieved from the Internet: www.gamespot.com/ps2 puzzie/taikodrummaster/printable_6111767.html. Retrieved on Jun. 14, 2012. 10 pages.
Taiko Drum Master w/ Drum. Retrieved from the Internet: www.ebgames.com/ebx/product/244015.asp. Retrieved on Jun. 14, 2012. 2 pages.
Taiko no Tatsujin. Retrieved from the Internet htlpy/games.channel.aol.com/review.adp?qameID-7569. Retrieved on Feb. 22, 2005. 3 pages.
Thalmann, "L'animation par ordinateur" http://web.archive.org/web/20060421045510/http://vrlab.epfl.ch/{thalmann/CG/infogr.4.pdf>, Apr. 21, 2006 (52 pages).
Vib Ribbon (PSX): Homepage, Screenshots by James Anthony. http://www.vib-ribbon.com/vibhtml/english/index.html. Retrieved on Jun. 14, 2012. 1 page.
Vib-Ribbon (Import) Review by Jeff Gerstmann. Retrieved from the Internet: www.gamespot.com/ps /puzzle/vibribbon/printabte 2550100.html. Retrieved on Jun. 14, 2012. 9 pages.
Vib-Ribbon. Retrieved from the Internet: www.ncsxshop.com/cgi-bin/shop/SCPS-45469.html. Retrieved on Feb. 22, 2005. 1 page.
Video MJ the Experience Kinect: announce—Oct. 2010: (http://www.youtube.com/watch?v=xLbiPicu0MM).
Video "Dance Online—Dance lessons gameplay" <http://www.youtube.com/watch?v=B4phOjfVNLk>. Last accessed on Nov. 8, 2012.
Video <http://www.bing.com/videos/search?q=dance+instruction+game&mid=E69356CFA1B6719FF5C8E69356CFA1B6719FF5C8&view=detail&FORM=VIRE5> (uploaded Jul. 27, 2010).
Video Alvin and the Chipmunks Chipwrecked—Majesco Sales: release—Nov. 2011 (http://www.youtube.com/watch?v=xKeW3CUtl4A&feature=related).
Video Dream Dance & Cheer (Released Sep. 13, 2009 for Wii) <http://www.youtube.com/watch?v=oi9vQjT1x5Q>.
Video Just Dance—Ubisoft Paris; <http://www.youtube.com/watch?v=t7f22xQCEpY>; (Nov. 17, 2009).
Video Just Dance 2—Ubisoft; <http://www.youtube.com/watch?v=kpaW9sM_M2Q> (Oct. 12, 2010).
Video Just Dance 2: Oct. 2010 (http://youtu.be/2ChliUgqLtw).
Video Just Dance: Nov. 2009 (http://youtu.be/rgBo-JnwYBw).
Video Kidz Bop Dance Party! The Video Game (Released Sep. 14, 2010 on Wii) <http://www.youtube.com/watch?v=l8VD9EvFdeM>.
Video Let's Cheer—Take 2 Interactive: release—Nov. 2011; announce—Jun. 2011 (http://www.youtube.com/watch?v=uv1lMBIw2Dw&feature=related).
Video MJ—Paris Week game demo—Oct. 29, 2010 http://www.dailymotion.com/video/xfg4oe_pgw-10-michael-jackson-experience-kinect_videogames?start=13#from=embed <http://www.dailymotion.com/video/xfg4oe_pgw-10-michael-jackson-experience-kinect_videogames?start=13>.
Video MJ the Experience Wii: Nov. 2010 (http://www.youtube.com/watch?v=8ZA59JY8Y_w).
Video MJ:TE Kinect from Aug. 19, 2010 at <http://www.youtube.com/watch?v=6AjGmSnN6qQ>; Michael Jackson The Experience Video Game—Kinect for Xbox 360—Gamescom 2010 HD.

(56) References Cited

OTHER PUBLICATIONS

Video MJ:TE on Wii (Nov. 2010); <http://www.youtube.com/watch?v=gmlMNGWxgvo>.
Video N.Y. Comic Con '10—Billie Jean Gameplay Demo: <http://www.gametrailers.com/video/nycc-10-michael-jackson/706056> (Oct. 13, 2010).
Video Tokyo Game Show '10—'Every Step' Trailer: http://www.gametrailers.com/video/tgs-10-michael-jackson/704548 (Sep. 15, 2010).
Video Victorious: Time to Shine—D3 publishers: Dec. 22, 2011 (http://www.youtube.com/watch?v=ud69OK02KGg&feature=fvst).
Video We Cheer 2 (Released Nov. 3, 2009 for Wii) <http://www.youtube.com/watch?v=-4oalxqnbll>.
Video <http://www.bing.com/videos/search?q=dance+instruction+game&mid=E69356CFA1B6719FF5C8E69356CFA1B6719FF5C8&view=detaii&FORM=VIRE5> (uploaded Jul. 27, 2010).
Video Dance on Broadway—Ubisoft, Longtail Studios; <http://www.youtube.comiwatch?v='eYaPdT4z-M>: (Jun. 6, 201Q}_.
Video Dancing With the Stars—Activision, Zoe Mode; <http://www.youtube.com/watch?v=C7zBVfEJO~:gp (Oct. 2007)
Video Dancing with the Stars: We Dance—Activision, Zoe Mode; <http://www.youtube.com/watch?v=31GOb-CT8vs> (Oct. 2008).
Video Dream Dance & Cheer (Released Sep. 13, 2009 for Wii) <http://www.voutube.com/watch?v=oi9vQiT1x5Q>.
Video Eyetoy Groove for PS2; <http://www.youtube.com/watch?v=c80aaOU fuE> (A(2ri12004).
Video Gamescom '1 0—Billie Jean Demo <http:/iwww.aarnetraiiHrs.corn/video/gc-•1 Q.. Michael-Jackson/703294>: 1:58-1 :13) (Aug. 20, 2010).
Video Grease Dance—505 Games: release—Oct. 2011 li_http://www.youtube.com/watch?v=PaGBHSB2urg).
Video Hannah Montana: Spotlight World Tour (Released Nov. 6, 2007 for Wii); <http://www.voutube.com/watch?v=WtyuU2NaL3Q>.
Virginia Tech Multimedia Music Dictionary: "P: Phrase" Virginia Tech University, http://www.music.vt.edu/musicdictionary/textp/Phrase.html. Retrieved May 25, 2011 (7 pages).
U.S. Appl. No. 12/913,493, filed Oct. 27, 2010 (69 pages).
U.S. Appl. No. 29/393,964, filed Jun. 10, 2011 (2 pages).
U.S. Appl. No. 29/393,967, filed Jun. 10, 2011 (2 pages).
U.S. Appl. No. 29/393,968, filed Jun. 10, 2011 (2 pages).
U.S. Appl. No. 29/393,970, filed Jun. 10, 2011 (2 pages).
U.S. Appl. No. 29/393,973, filed Jun. 10, 2011 (2 pages).
U.S. Appl. No. 29/393,975, filed Jun. 10, 2011 (2 pages).
Dance Dance Dance Revolution Max, Game Manual, released in the US by Konami Corporation, Oct. 29, 2002 (2 pages).
Taiko Drum Master Game Manual, Release Date Oct. 24, 2004 (18 pages).
Video Michael Jackson the Experience—Kinect: announce—Oct. 2010: (http://www.youtube.com/watch?v=xLbiPicu0MM), accessed Jun. 21, 2016, (1 page).
Video: Michael Jackson the Experience: Song Menu [North America]. Available at https://www.youtube.com/watch?v=pFlcYld2aw, accessed Jun. 21, 2016 (1 page).
[Video] Michael Jackson the Experience, Wii, http://www.nintendo.com/games/detail/smpbynnlvHGr3gN6PTn9kNc2htjE6apS, Developer UBISOFT Paris and Montreal, Publisher UBISOFT, initial release date, Nov. 23, 2010 (1 page).
BVH File Specification, Character Studio Tutorials, http://web.archive.org/web/20060321075406/http://character-studio.net/bvh_file_specification.htm, Mar. 21, 2006 (16 pages).
Craymer, L. et al., "A Scalable, RTI-Compatible Interest Manager for Parallel Processors", in Proceedings of the 1997 Spring Simulation Interoperability Workshop, 97S-SIW-154, 1997 (4 pages).
Petty, M.D. et al., "Experimental Comparisons of d-Rectangle Intersection Algorithms Applied to HLA Data Distribution", in Proceedings of the 1997 Fall Simulation Interoperability Workshop, 1997, 97F-SIW-016 (14 pages).
Singhal, S.K., Effective Remote Modeling in Large-Scale Distributed Simulation and Visualization Environments, PhD Thesis, Stanford University, Aug. 1996 (173 pages).
Singhal, S.K. et al., Chapters 5-8 *in Networked Virtual Environments—Design and Implementation*, ACM Press Books, SIGGRAPH Series, Jul. 1999 (180 pages).
Singhal, S.K. et al., "Using a Position History-Based Protocol for Distributed Object Visualization", in Designing Real-Time Graphics for Entertainment [Course Notes for SIGGRAPH '94 Course No. 14], Jul. 1994 (25 pages).
Van Hook, D.J. et al., "Approaches to Relevance Filtering", in Eleventh Workshop on Standards for the Interoperability of Distributed Simulations, Sep. 26-30, 1994 (3 pages).
Van Hook, D.J. et al., "Approaches to RTI Implementation of HLA Data Distribution Management Services", in Proceedings of the 15th Workshop on Standards for the Interoperability of Distributed Simulations, 1996 (16 pages).

* cited by examiner

GESTURE-BASED USER INTERFACE FOR NAVIGATING A MENU

CROSS-REFERENCE TO RELATED APPLICATIONS

This application claims benefit of priority to Application No. 61/255,462, filed Oct. 27, 2009 and entitled "Gesture-Based User Interface" by Challinor et al., the disclosure of which is incorporated herein by reference in its entirety.

FIELD OF THE INVENTION

The present invention relates generally to gesture-based interfaces and, more specifically, to using gestures to control a video game interface.

BACKGROUND

Although video games and video game consoles are prevalent in many homes, game controllers, with their myriad of buttons and joysticks, are still intimidating and confusing to people that do not often play video games. For these people, using a game controller to interact with the game is an obstacle to enjoying it.

To increase a user's feeling of immersion in the game, as well as to overcome the cumbersome nature of game controllers for users not familiar with them, some game platforms forego the use of traditional controllers and utilize cameras instead. The cameras detect a user's physical movements, e.g., the waving of his arm or leg, and then interpret those movements as input to the video game. This allows the user to use a more natural-feeling input mechanism he is already familiar with, namely the movement of his body, and removes the barrier-to-entry caused by the many-buttoned controller.

One example of a camera-based controller is the EyeToy camera developed by Logitech and used with the Sony PlayStation 2 game console. The EyeToy, and similar cameras, typically include a camera and a microphone. The EyeToy sends a 640×480 pixel video stream to the PlayStation, and the game executing on the PlayStation parses the frames of the video, e.g., calculating gradations of color between pixels in the frame, to determine what in the camera's field-of-view is the user ("player") and what is the background ("not player"). Then, differences in the stream over time are used to determine and recognize the user's movements, which in turn drive the user's interaction with the game console.

Other cameras used by game platforms include the DreamEye for the Sega Dreamcast, The PlayStation Eye (a successor to the EyeToy) for Sony's PlayStation 3, and the Xbox Live Vision for Microsoft's Xbox 360. These cameras all provide a typical single-input camera that can stream video or take still photographs, and some, such as the PlayStation Eye, additionally provide a microphone for audio input.

Microsoft is currently developing a depth-aware camera system in the form of Project Natal. A Natal system provides an RGB camera, a depth sensor, a multi-array microphone, and software that processes the inputs from the camera, depth sensor, and microphone. Beneficially, the Natal software generates, based on the input, a skeleton that roughly maps to the user's body. Specifically, rather than just determining a difference between "player" and "not player" like prior game cameras, Natal determines what is the user's right hand, left hand, head, torso, right leg, and left leg. This skeleton is preserved as a user moves his body in the camera's field of view, allowing for the tracking of specific limbs. This skeleton framework, however, is the extent of what Natal provides. Namely, no user interface is provided by Natal, and users must still use a game controller to interact with a game or menu system.

Other systems, based on non-camera technologies, have also been developed that attempt to track a user's movements. For example, the Nintendo Wii provides players with an infrared transmitter "Wii remote" that the user holds in his hand. The Wii remote is used as pointing device and has a built-in accelerometer to track changes in the Wii remote's position. The Wii remote is often paired with a "nunchuk" (which also has an accelerometer) that is held in the player's other hand, allowing the Wii to, in a sense, track the movements—or at least changes in the movements—of the user's hands. Another technology based on a hand-held controller is sixense, which is demonstrated at http://www.sixense.com High-end motion capture ("mo-cap") systems have also been used to track a user's movements. Typically mo-cap systems involve the user wearing a body suit that has dozens of white spheres located at relevant locations. The mo-cap cameras detect these spheres and use them to infer positional information about the user's body. Mo-cap systems, however, are expensive and not practical for the average user.

SUMMARY OF THE INVENTION

The invention includes methods, systems, computer program products and means for providing an intuitive user interface for interacting with a game console that obviates the need for, or use of, a typical game controller. Though Natal is used as an example herein, the invention is not limited to a Natal implementation.

In one embodiment, the user interface comprises an analog-like mechanism for manipulating a menu and icon system. The menu system allows the user to highlight a menu option or icon using movement along one axis and to activate the menu option or icon via movement on a different axis. In one embodiment, highlighting is associated with a vertical motion and activation is associated with a horizontal motion. The vertical motion can be tied to the vertical movement of a particular appendage, e.g., the up and down movement of the user's right arm, and the horizontal motion can be tied to the horizontal movement of that or another appendage, e.g., movement of the right arm or hand across the body from right to left. Other combinations of arm, leg, and body movements such as waving, kicking, head bobbing, etc., to achieve highlighting or activation would be appreciated by one skilled in the art.

Advantageously, the interface behaves similarly for a short person and a tall person relative to their own bodies. In one embodiment of the invention, appendage and body position determinations are made based on, and relative to, the skeleton of the person interpreted by the system, not on an absolute coordinate system within the camera's field of view. Other variations can utilize an absolute coordinate system to infer information about the user's body.

Typically, ranges are used to control the user interface because motion-tracking input is inherently noisy. Determining precisely where a user's appendages are is difficult due to the natural movement of the user over time and the lag between receiving camera input and processing it. Therefore, the menu system trains users to make gestures large enough—and therefore unambiguously different enough—to compensate for the noise, which simultaneously provides the benefit of eliminating false positives when determining what the user is attempting to accomplish.

In addition to providing an analog-like menu highlighting and activation process, the invention provides an intuitive means of scrolling additional menu options into the menu area visible to the user. Beneficially, this allows for a coarse-grained selection process for a long list of menu options which can then be refined into a fine-grained selection process among the options that have been scrolled into the menu area. In the scenario where there are many more choices than available slots in the main menu, certain spatial positions of the user's appendage in relation to the interpreted skeleton are reserved for navigating or scrolling quickly to menu choices that are far outside the range of the ones currently presented. In these cases, scrolling speed can be varied in accordance with the position of the user's appendage. For example, if the user moves his arm slightly above the position that corresponds to the top of the menu, new options scroll into the menu slowly. If the user raises his arm even higher, new options scroll into the menu more quickly.

The invention also provides an intuitive system for navigating back in a choice hierarchy. Specifically, where menu highlighting and activation are controlled by one appendage, navigating "back" is accomplished by reading the input associated from another appendage and dedicating input from that appendage to the back functionality. For example, in the scenario described above, the menu highlighting and activation are driven using the user's right hand or arm. Back navigation can then correspond to movement of the user's left hand, for example moving across the body from left to right.

The menu system provided herein is beneficial in that it can provide continuous visual and aural feedback to train the user to make unambiguous gestures. Separating the menu navigation into movements that are unambiguous, and in some embodiments combined with hysteresis, accounts for, and overcomes, the visual noise inherent in camera-based and other movement-interpretive systems.

In one embodiment, there is a method, executed on a game platform, for interacting with a menu system displayed on a display in communication with the game platform, based on input received via a sensor. The method and the components it interacts with can also be expressed as a system, in the form of a computer program product, or as an apparatus with means for accomplishing the interaction, where the structures correspond to those previously described, e.g., a display, a game platform, and a sensor (e.g., a camera). The method includes displaying a menu on the display with menu items, receiving a 3D skeleton with a set of two or more joints associated with a first spatial position of two or more reference points on a player's body; and providing interaction based on the 3D skeleton. For example, a scale vector is generated based on two or more of the joints of the 3D skeleton within the set of two or more joints and the scale vector is projected onto an axis. A range of values is assigned to the projected scale vector based on the two or more joints of the 3D skeleton and a value to is assigned to a joint, within the set of two or more joints, such as the wrist. This joint is associated with a highlighting action, and the value assigned to the joint is with respect to the range of values assigned to the projected scale vector. For example, if the projected scale vector is assigned a range from 0.0 to 1.0, the wrist can be assigned a 1.0 is it is at shoulder height, or a 1.5 if above shoulder height, or a 0 if at the user's side. A range of values is assigned to each menu item, with the range of values also being with respect to the range of values assigned to the projected scale vector. For example, one menu item may be assigned 0.0 to 0.2, another may be 0.21 to 0.4, and so on. These are just examples, and the ranges assigned to each are not limited to those described herein. Then, the value of the joint associated with the highlighting action is compared to the range of values of each menu item to determine a highlighted menu item, which is then indicated on the display as the highlighted menu item.

In one version, there is a method for interacting with a menu system displayed on a display in communication with the game platform, which is based on input received via a camera. This method and the components it interacts with can also be expressed as a system, in the form of a computer program product, or as an apparatus with means for accomplishing the interaction, where the structures correspond to those previously described, e.g., a display, a game platform, and a sensor (e.g., a camera). The method involves displaying a menu on the display comprising menu items, receiving a 3D skeleton with joints associated with at least one of the player's shoulders, a lower torso area of the player, and at least one of the player's wrist, and providing interaction with the menu based on these. This is accomplished by first generating a scale vector based on the distance between the 3D skeleton's shoulder joint and an approximation of the player's pelvis and then projecting the scale vector onto an axis. Then, a range of values is assigned to the projected scale vector based on the joint associated with the player's shoulder and on the approximation of the player's pelvis. Next (although the steps can be performed in any order) a value is assigned to a wrist joint, which is associated with a highlighting action. The value that is assigned to the wrist joint is with respect to the range of values assigned to the projected scale vector. A range of values is then assigned to each menu item, with the range of values assigned to each menu item also being with respect to the range of values assigned to the projected scale vector. Then, the value of the wrist joint is compared to the range of values of each menu item to determine a highlighted menu item; and then that menu items is indicated on the display as being highlighted.

In one embodiment, there is a method, executed on a game platform, for interacting with a menu system displayed on a display in communication with the game platform, based on input received via a sensor. The method and the components it interacts with can also be expressed as a system, in the form of a computer program product, or as an apparatus with means for accomplishing the interaction, where the structures correspond to those previously described, e.g., a display, a game platform, and a sensor (e.g., a camera). The method begins by receiving a 3D skeleton having a set of one or more joints associated with a first spatial position of one or more reference points on a player's body. Then, a first direction of potential movement is associated with a highlighting action and a second direction of potential movement, different than the first direction, is associated with an activating action. The first and second directions are greater than or equal to a first threshold difference in degrees with respect to a common axis and are less than or equal to a second threshold difference in degrees with respect to the common axis, e.g., the first threshold difference is 75 degrees and the second threshold difference is 105 degrees (alternatively, both are ninety degrees so the movements are perpendicular to each other). Then, a first spatial position of a joint within the set of one or more joints is determined. Next, one or more updated versions of the 3D skeleton are received, and a second spatial position of the joint is determined based on the one or more updated versions of the 3D skeleton. Then based on the first and second spatial positions of the joint, it is determined if the joint has moved in the direction associated with the highlighting action or in the direction associated with the activation action. After determining this, the action indicated by the movement of the joint is performed. Beneficially, if the joint has moved in the direction associated with the activation action, a change associated with the highlighting action, e.g., highlighting a menu item, is prevented.

There is also a method, executed on a game platform, for interacting with a menu system displayed on a display in communication with the game platform, based on input received via a sensor. The method and the components it interacts with can also be expressed as a system, in the form of a computer program product, or as an apparatus with means for accomplishing the interaction, where the structures correspond to those previously described, e.g., a display, a game platform, and a sensor (e.g., a camera). The method begins by displaying a menu on the display comprising menu items. Then a 3D skeleton is received that has a set of one or more joints associated with a first spatial position of one or more reference points on a player's body. A range of values is assigned to each menu item, the range of values assigned to each menu item being based on each menu item's respective position. Next, a value is assigned to a joint within the set of one or more joints (the joint is associated with a highlighting action), the value assigned to the joint being based on the joint's position. Then, the value of the joint is compared to the range of values of each menu item to determine a highlighted menu item; and that menu item is highlighted on the display.

Alternatively or additionally, there is also a method, executed on a game platform, for interacting with a menu system displayed on a display in communication with the game platform, based on input received via a sensor. The method and the components it interacts with can also be expressed as a system, in the form of a computer program product, or as an apparatus with means for accomplishing the interaction, where the structures correspond to those previously described, e.g., a display, a game platform, and a sensor (e.g., a camera). The method starts by receiving a 3D skeleton with a set of one or more joints associated with a first spatial position of one or more reference points on a player's body. Then a first spatial position of a joint in the set of one or more joints is determined, and an initial positional value is assigned to the beginning of an activation action based on the first spatial position of the joint. Next, a positional value is assigned to the completion of the activation action, and one or more updated versions of the 3D skeleton are received. Then a second spatial position of the joint is determined based on the one or more updated versions of the 3D skeleton, and it is determined if the second spatial position of the joint corresponds to the positional value assigned to the completion of the activation action. If so, the activation action is executed.

Alternatively, there is a similar method, executed on a game platform, for interacting with a game, displayed on a display in communication with the game platform, based on input received via a sensor. This method and the components it interacts with can also be expressed as a system, in the form of a computer program product, or as an apparatus with means for accomplishing the interaction, where the structures correspond to those previously described, e.g., a display, a game platform, and a sensor (e.g., a camera). The method begins by displaying a scrollable window on the display, the scrollable window having a first set of visual data in it, an area not associated with scrolling a second set of visual data into the scrollable window, and an area associated with scrolling the second set of visual data into the scrollable window. More specifically, in some embodiments, the edges of the window initiate scrolling the second set of data in and the middle of the window does not. The method involves receiving a 3D skeleton with two or more joints associated with a first spatial position of two or more reference points on a player's body. A scale vector is generated based on two or more of the joints of the 3D skeleton within the set of two or more joints, and the scale vector is projected onto an axis. A range of values is assigned to the projected scale vector based on the two or more joints within the set. Then, a value is assigned to a joint within the set of two or more joints, with the joint being associated with a scrolling action. The value assigned to the joint is with respect to the range of values assigned to the projected scale vector. A range of values is then assigned to the area associated with scrolling the visual data, with the range of values assigned to the area also being with respect to the range of values assigned to the projected scale vector. Then the value of the joint associated with the scrolling action is compared to the range of values assigned to the area associated with scrolling the second set of visual data into the scrollable window, and if the value of the joint is within the range assigned to the area associated with scrolling the second visual data into the scrollable window, scrolling the second set of visual data into the scrollable window.

Any of the above embodiments may employ the following additional functionality. The proximity of the value assigned to the joint to the range of values assigned to each menu item may also be indicated on the display. In some versions, the proximity is indicated using graphical indications similar to those used for highlighting, in proportion to the proximity. For example, as the joint gets closer to a menu item, even if not the highlighted menu item, the menu items close by may look like they are partially highlighted, and increasingly so as the joint gets closer. Also, in some embodiments, the range of values assigned to each menu item is a single, different value for each menu item.

In some versions, the axis that is described, and that is associated with a highlighting action, corresponds to an orientation of a menu displayed on the display.

Also, in some embodiments, one or more updated versions of the 3D skeleton can be received, and it is determined if positional information of the one or more updated versions of the 3D skeleton corresponds to the beginning of an activation action. If so, the beginning of the activation action is indicated on the display by altering the highlighted menu item. In some implementation, the activation action comprises movement of a joint in a direction substantially perpendicular to the axis. For example, the activation action can include movement of a joint associated with the activation action at least a first pre-determined distance in a direction substantially perpendicular to the axis and less than a second pre-determined distance in a direction substantially parallel to the axis. And doing so, and thereby completing the activation action, activates the highlighted menu item. Alternatively, the activation action can include movement of a joint associated with the activation action of at least a first distance based on two or more joints in the set of two or more joints of the 3D skeleton, in a direction substantially perpendicular to the axis and less than a second distance in a direction substantially parallel to the axis. This also would complete the activation action and activate the highlighted menu item. In both of these, or any embodiment herein, the joint associated with the activation action is the same joint as the joint associated with the highlighting action.

Beneficially, once the activation action has begun, changes in the value of the joint associated with the highlighting action do not change the highlighted menu item, and, in some implementations, the highlighted menu item is altered (e.g., stretched) in proportion to completion of the activation action. Additionally or alternatively, an audible cue can be played with characteristics in proportion to completion of the activation action.

Also, in some embodiments, the beginning of the activation action ceases to be indicated if the one or more updated versions of the 3D skeleton ceases to correspond to an activation action.

In any of these embodiments referring to two or more joints in the 3D skeleton, the two or more joints that the scale vector is based on can a shoulder joint and a hip joint, or a shoulder joint and a simulated pelvis joint. Any of these joints can be a computed approximation of a joint of the player.

Beneficially, scrolling the menu items that are displayed can be achieved by assigning a range of values to a scroll area, the range of values assigned to the scroll area being with respect to the range of values assigned to the projected scale vector. Then the value of the joint associated with the highlighting action is compared to the range of values assigned to the scroll area, and if the value of the joint is within the range of values assigned to the scroll area, scrolling a different set of menu items onto the display. In some versions, the rate at which the different set of menu items is scrolled onto the display is based on the value of the joint in relation to the range of values assigned to the scroll area. This can be done by assigning a first sub-range of values in the range of values assigned to the scroll area with a slow scrolling operation and assigning a second sub-range of values in the range of values assigned to the scroll area with a fast scrolling operation. Then if the value of the joint associated with the highlight action is determined to be within the sub-range assigned to the slow scrolling operation, scrolling the different set of menu items onto the display at a slow rate. But if the value of the joint associated with the highlight action is determined to be within the sub-range assigned to the fast scrolling operation, scrolling the different set of menu items onto the display at a faster than the slow rate.

There is also, for some versions, hysteresis for the highlighted menu item. This is accomplished by receiving an updated version of the 3D skeleton, assigning a second value to the joint associated with the highlighting action (the value being with respect to the range of values assigned to the projected scale vector) and if the second value is within a range of values assigned to the highlighted menu item, or is within a pre-determined range adjacent to the range of values assigned to the highlighted menu item, continuing to highlight the highlighted menu item. This keeps the current menu item highlighted if the joint has drifted slightly into the area of the next menu item (or the sensor/camera just perceives that due to noise in the input). Additionally, if the second value is not within the range of values assigned to the highlighted menu item and is not within the pre-determined range adjacent to the range of values assigned to the highlighted menu item, highlighted menu item ceases to be highlighted (because the joint has moved sufficiently far away to indicate that the player really meant to de-highlight the previously highlighted item).

Re-targeting is also possible for any of these. This is accomplished by receiving an updated version of the 3D skeleton, with the updated skeleton's set of two or more joints associated with a second spatial position of the two or more reference points on the player's body. Then, the scale vector is updated based on the updated skeleton; and the updated scale vector is re-projecting onto the axis.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which.

DETAILED DESCRIPTION

Figure 1A:
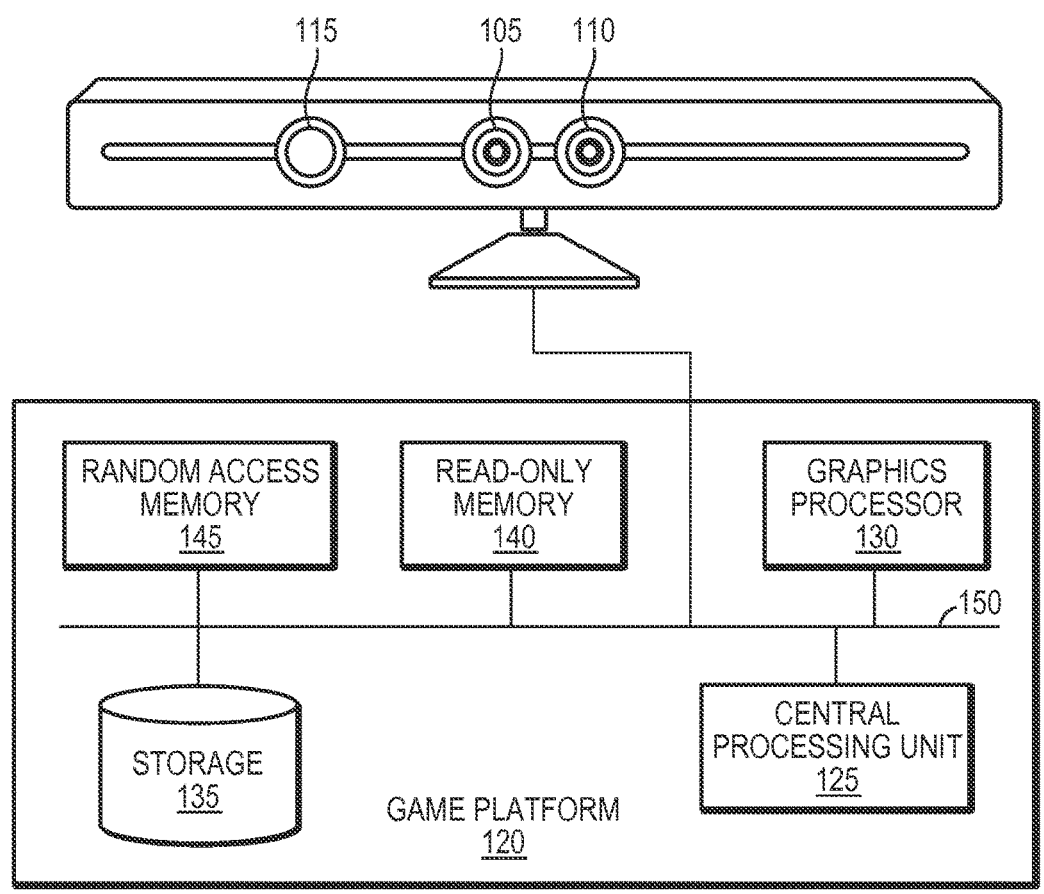
FIG. 1A depicts a game platform with a Project Natal camera system.

One embodiment of the present invention is based on the Project Natal framework developed by Microsoft Corporation of Redmond, Wash. As indicated in FIG. 1A, the Project Natal system includes an RGB camera 105, a depth sensor 110, a multi-array microphone 115, and a processor (not shown). The RGB camera 105 delivers a three-color (Red, Green, Blue) video stream to the game console, enabling facial recognition and full-body tracking. The depth sensor 110 is an infrared projector combined with a monochrome CMOS sensor. This allows a game console 120 utilizing Natal to recognize objects in the camera's field of view in three dimensions instead of forcing the game console to parse a two-dimensional video-stream. The multi-array microphone 115 parses voices and sound input, while simultaneously extracting and nullifying ambient noise. Project Natal also features a processor with proprietary software that coordinates the inputs of the Natal system and provides a three-dimensional, skeleton-based system to game developers. Developers can use this system to utilize three-dimensional position information of the joints in the user's body to interact with the game platform. Although Project Natal provides a framework for determining positional information of a user's body, it does not provide an intuitive menu system for controlling the console or games. Although Project Natal is used herein as a framework, the gesture-based user interface is applicable to any system that can interpret input and map it to relevant portions of the screen. While in some embodiments, a camera-based system is used to determine positional information about the user's body in three dimensions, in other embodiments, transducers attached to the user's body are used to detect the movements of the user's limbs. Other embodiments use infrared pointing devices or other motion tracking peripherals. All that is required is a system than can parse movement in two dimensions; adding dimension information from a third dimension, typically depth, simply makes the invention easier to implement due to the additional information provided to the system. In embodiments where the system uses a skeleton, such as Natal, relative body scale mapping is easier to accomplish.

Also shown in FIG. 1A is an exemplary game platform 120. The game platform typically includes a Central Processing Unit (CPU) 125, a graphics processor 130, storage component 135 such as a hard drive, Read Only Memory (ROM) 140, Random Access Memory (RAM) 145, all in signal communication via a bus 150. The bus 150 also connects to an input for the Project Natal System. In some embodiments, the Natal system connects to the game platform 120, e.g., an Xbox 360, via a Universal Serial Bus (USB) connection.

Figure 1B:
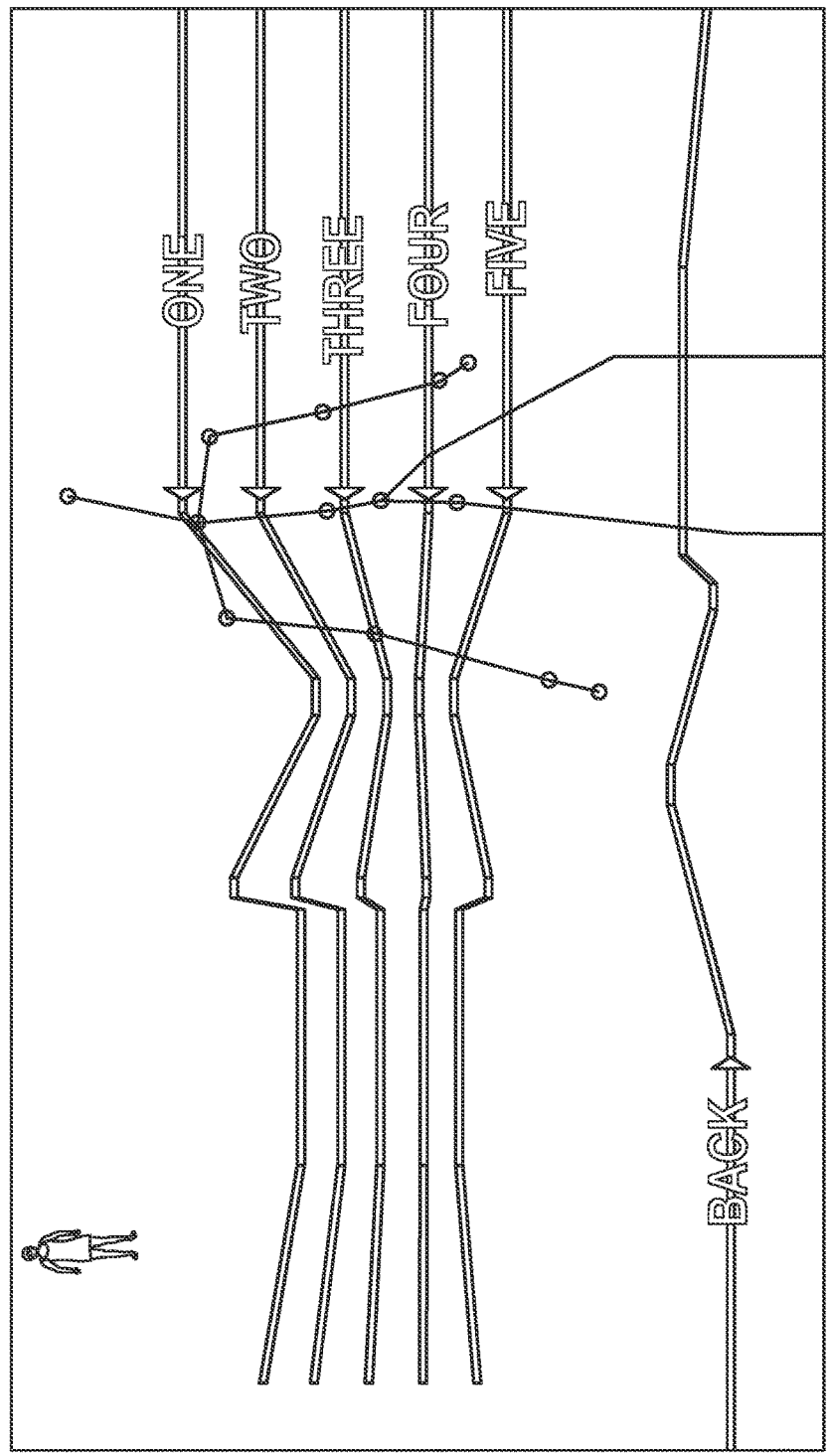
FIG. 1B depicts a three-dimensional skeleton provided by Natal.

As used herein, the terms "joint", "bone", and "skeleton" are intended to have the meaning one of skill in the art of motion capture and animation would ascribe to them. For example, a skeleton can comprise bones, but the number of bones and their positions are a function of the motion capture equipment and the animation rig and do not necessarily correlate to the number and positions of bones in a human skeleton. Similarly, a joint can be at the distal endpoint of a single bone (e.g., a fingertip or the head), and need not be at a point where two bones come together. An example of the Natal skeleton is shown in FIG. 1B. The skeleton generated by the Natal system provides a framework for the dance game, and allows for tracking of not only limbs generally, but specific joints as well. For example, the wrist joint 160 on the right arm is treated separately from the right elbow 165, which is treated differently than the right shoulder 170. Additional portions of the body are also recognized, such as the pelvis, middle of the torso, the head, the neck, and the knees and feet.

An example of the Natal skeleton is shown in FIG. 1B. The skeleton generated by the Natal system provides a framework for the gesture-based user interface, and allows for tracking of not only limbs generally, but specific joints as well. For example, the wrist joint on the right arm is treated separately from the right elbow, which is treated differently than the right shoulder. Additional portions of the body are also recognized, such as the pelvis, middle of the torso, the head, the neck, and the knees and feet.

Figure 1C:
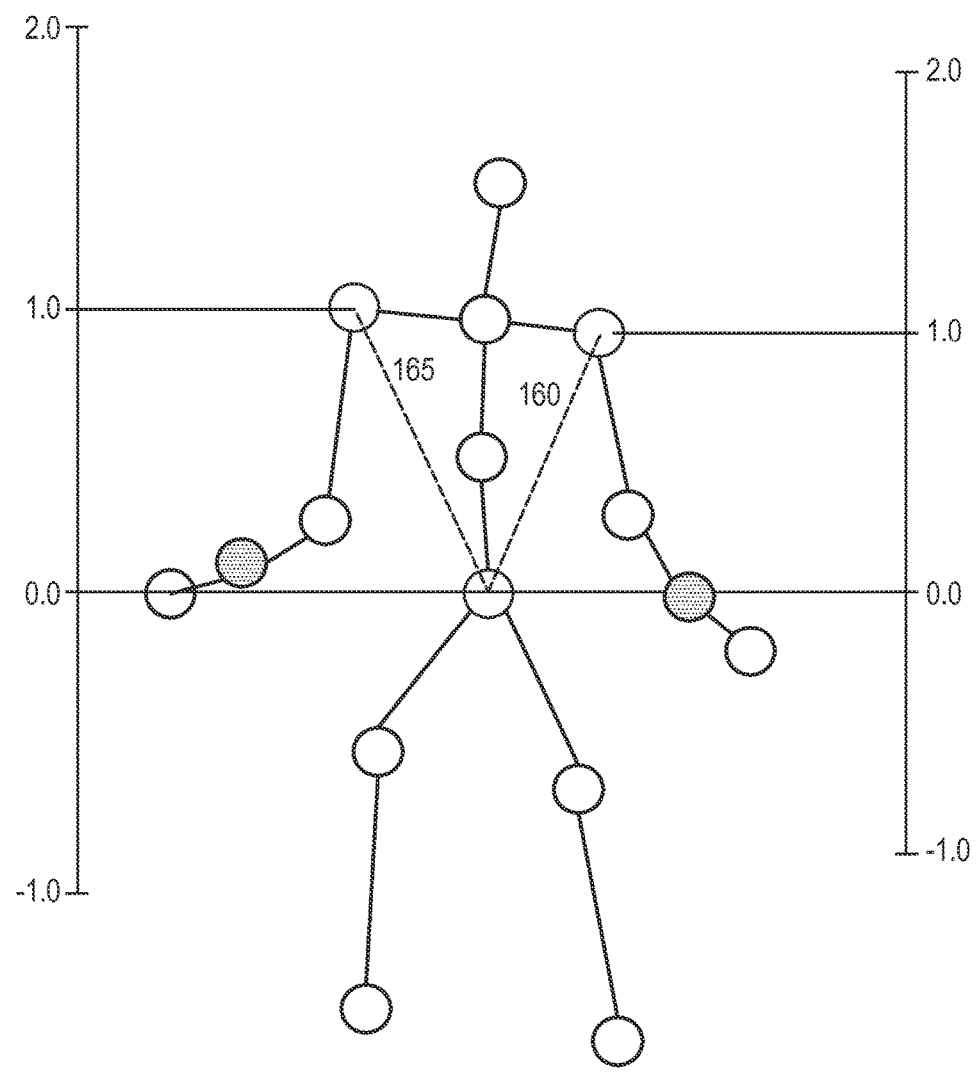
FIG. 1C shows an embodiment where scale vectors are projected onto a vertical axis.

One of the benefits provided by the skeleton-based system is that the skeletal model can be used to calculate scale vectors based on two or more joints. This provides a spatially relative system, i.e., how far is body part X from body part Y, instead of an absolute coordinate system. FIG. 1C shows one embodiment, where scale vectors 160, 165 are drawn from the mid-pelvis to each shoulder (in a sense forming a "V"). These scale vectors are also three-dimensional and will correspondingly tilt forward, backwards, or sideways depending on the user's posture. These scale vectors are then projected onto a vertical axis to define, for each wrist joint with respect to the user's hip, a range from "at hip height" to "at shoulder height," typically using values 0.0 to 1.0, respectively. Notably, because the scale vectors are calculated for each side, if a user's shoulders were tilted, as is the case in FIG. 1C, although the physical distance from pelvis to shoulder may differ for each side, the scale value for having either arm at hip height or up at shoulder's height would be the same, even though the wrist joints may be at different heights in an absolute coordinate system. These scale values are also updated constantly so that if a user's posture or body shifts, the system updates accordingly and the system is not locked into an initial reading of the user's body.

In another embodiment, the hip joint is estimated by approximating its position based on the pelvis. In those embodiments, a scale vector starts from each side at the hip and extends to the shoulder joint on that side (i.e., there is a left scale vector from left hip to left shoulder and a right scale vector from right hip to right shoulder). In some embodiments, approximated joint positions ("pseudo-joint" positions) can be used either to set the scale or determine a position within the scale range.

After projecting the scale vectors onto the vertical axis, movement of each arm can be tracked as a scale value on the y axis by determining the y position of the user's wrist joint (indicated by blackened circles in FIG. 1C). The axis runs from the hip to the right shoulder, with the vector describing a range from 0.0 to 1.0 (the numbers used herein are by way of example only and the vector can describe any enumerated range). In this example, 0.0 is the value associated with the user's wrist joint being approximately at hip height and 1.0 being the value for the user's wrist joint at shoulder height. When the user's arm is resting at his side, his wrist joint falls below the hip and is thus interpreted as a negative value. Placing his wrist joint above his shoulder causes the vertical value of his wrist joint to go above 1.0.

Scale values outside the range of the reference points are also useful, e.g., assigning a vector of 2.0 to a wrist joint that is as far above the shoulder as the shoulder is above the pelvis in a 0.0-to-0.1 pelvis/shoulder system. In some embodiments, though, the scales are capped at certain values such that further deviation beyond the cap does not change the scale value. For example, a wrist joint position that is twice as high as pelvis-to-shoulder distance would have a value of 2.0, which is the cap. Any wrist joint position higher is capped and is therefore also 2.0, but the invention is not limited to this embodiment. Although extreme scale values are not used for certain functions, e.g., menu highlighting, the information can be used for other functionalities, e.g., controlling scroll speed.

Other embodiments use hip-to-head measurements, knee-to-shoulder, etc., (pelvis-to-shoulder is merely an example) and the scale vectors can use any enumerated range, linear or non-linear.

Menu Highlighting

Figure 2A:
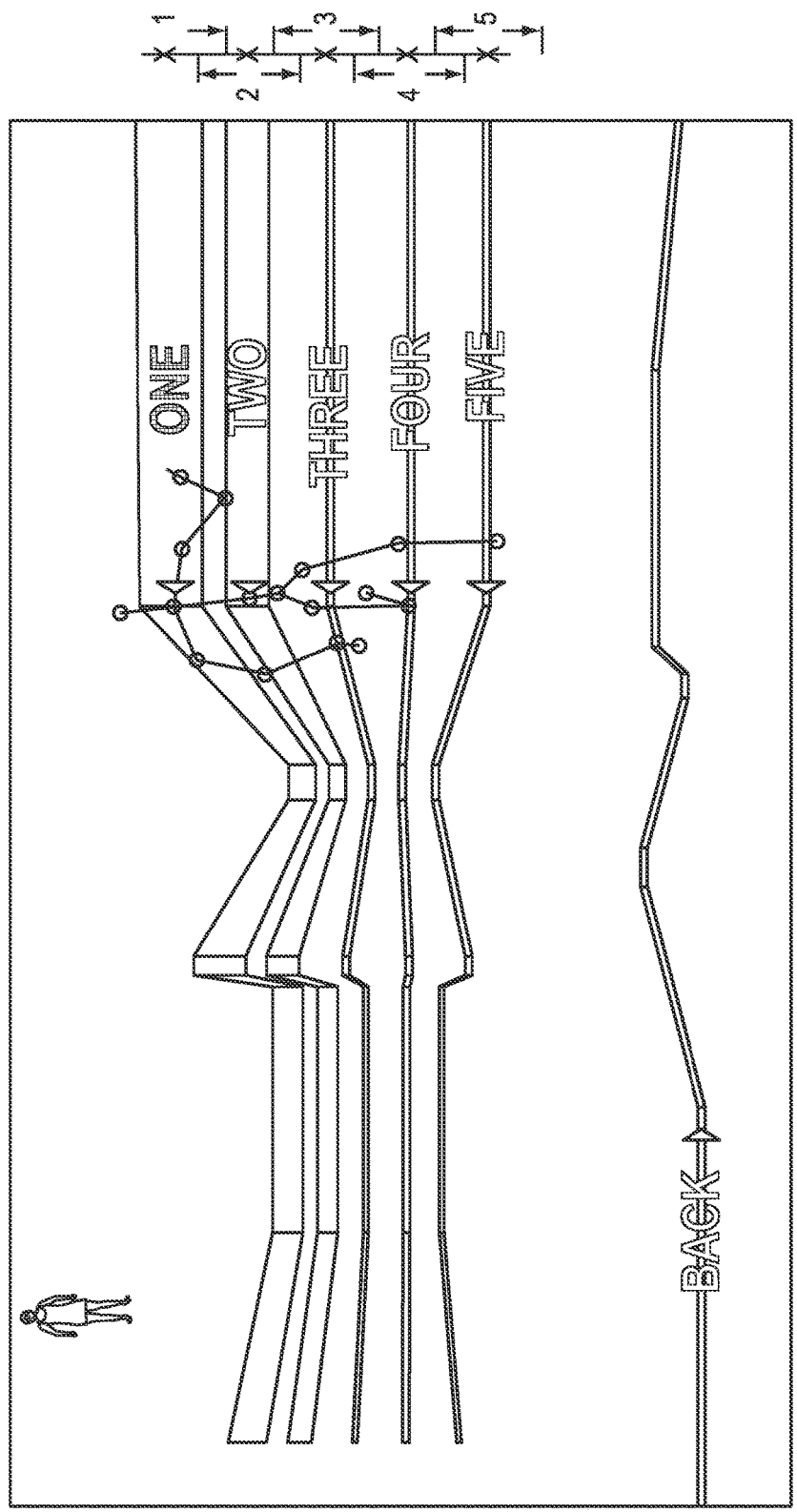
FIGS. 2A and 2B depict a menu option being highlighted based on the vertical position of the user's hand.
Figure 2B:
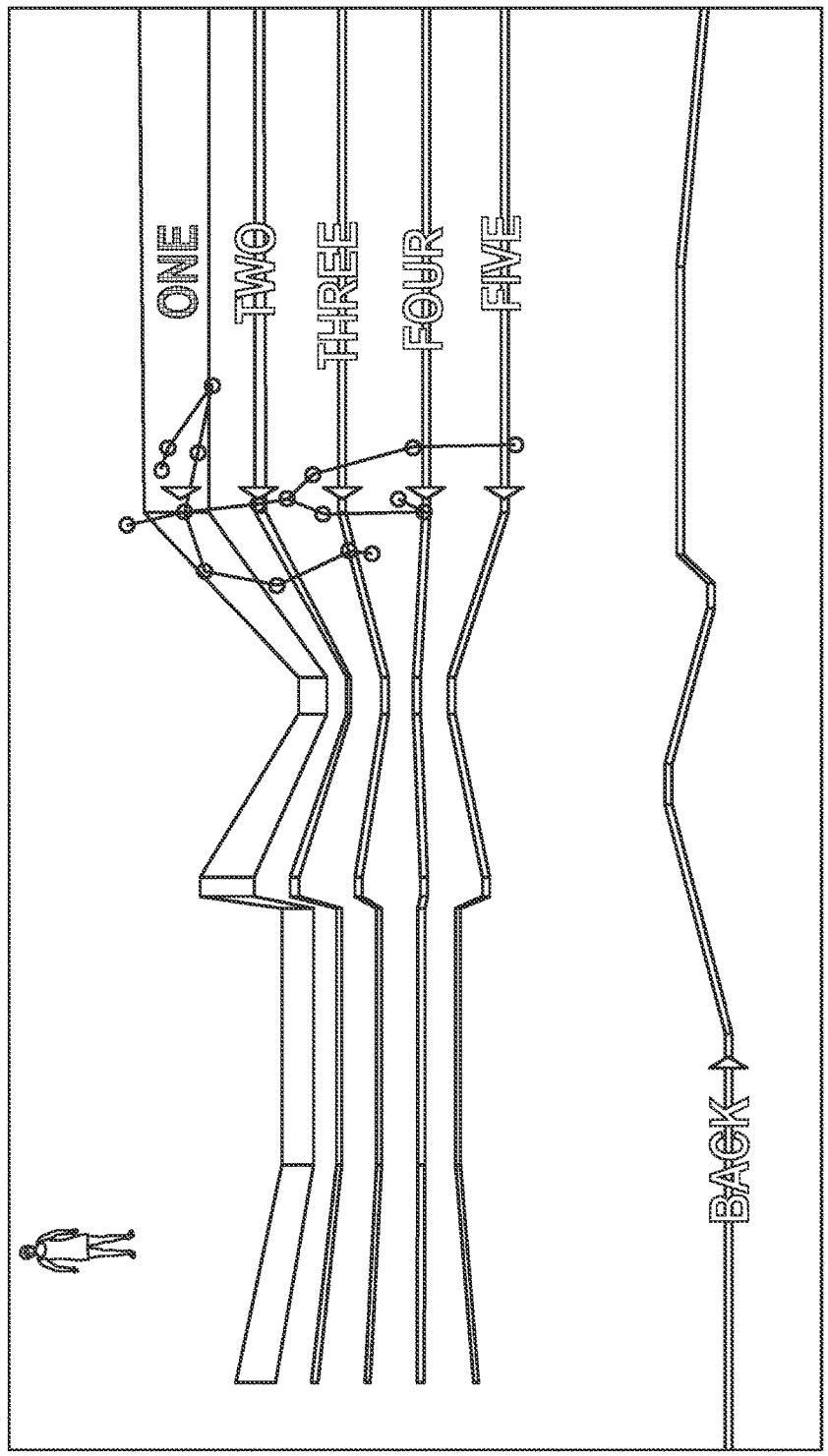

FIGS. 2A and 2B depict a menu option (also called a menu item) being highlighted. Interaction with the system begins when the user walks in front of the camera. Initially, the system is in a "release state;" no menu options are highlighted (or, in some embodiments, a default option is highlighted) and the invention is waiting for the user's input. In one embodiment, the release state is characterized by the user's wrist joint being positioned anywhere from at his side to approximately 8 inches in front of his hip. In one embodiment, this is done by determining the Z component of the vector formed from his hip to his wrist joint. In another embodiment, this is done by determining the Z component of the vector formed from his shoulder to his wrist joint. As the user raises his right arm from his side, the invention detects that the user's arm leaves the "dead zone" and begins interpreting the movement and position of the user's right arm as relating to his desired menu choice. The allowance for a dead zone is necessary because not all input is necessarily related to the data displayed on the screen or indicates that the user is trying to interact with the system. Specifically, the user's arms being at his sides could just indicate that he is relaxed. Or, if there is some movement, it could be the user just swinging his arms as he walks. Thus, slight deviation in the user's arm position relative to being directly at his side does not necessarily correspond to a desired menu option.

Once past the dead zone, the position of the user's arm relative to his body is determined, and the menu options highlight correspondingly. To determine which menu option the user is highlighting, each user interface element, here a menu option, has a specific vertical coordinate in the y axis, indicated in FIG. 2A as an "x". As each menu option is created, the active area for each option extends midway to the next menu option. For example, if the midpoint of each menu option is 10 units from the midpoint of the next menu option, the active area for any given menu option is its y coordinate plus-or-minus five units. The position of the user's wrist joint with respect to the skeletal range is used to determine which menu option the user is highlighting, each option having a value within this range. Based on the vertical component of its location, a menu option is highlighted. As the user moves his arm up and down, his wrist joint changes its scale value, thereby entering and leaving the active area for each menu option. In some implementations, the horizontal aspect of the user's wrist joint is ignored in determining menu highlighting, and highlighting is based entirely on the vertical scale value of the user's wrist joint.

In FIG. 2A, option One is highlighted. Its label "ONE" is presented in yellow (whereas the other menu options are presented in white) indicating that it is the "active" option. The thickness of One's ribbon is greater than that of Two and significantly more so than Three or the others. If the user moves his arm unambiguously into the region of option One, even if the user's arm later drifts into the area for option Two, option One remains highlighted (and subject to activation) until the user's arm has ventured a certain distance into option Two's territory. Although menu highlighting may be presented as continuous, i.e., as the user moves from one menu option to another, the highlighting correspondingly flows from the old choice to the new one, beneficially, the present invention will not change which menu option is actually active to a different menu option until it is clear that the user indeed wants to have the second menu option be the active one. This is accomplished by having hysteresis between menu options.

Hysteresis is useful in preventing oscillation between options when the user is midway between them or is leaving the area of one option and approaching the area of another. The hysteresis zones between options are typically five percent above and below the vertical midpoint between two adjacent menu options, although this is dependent on implementation and more or less allowance for hysteresis can be made. In FIG. 2A, these are represented by the arrows and numbered zones. A hysteresis zone maintains the state of one choice until the user's arm moves a certain distance into another choice. In this example, if the user has highlighted option One (and therefore option One is "active"), he can move his hand into the area of option Two without making Two active (indicated by the bottom of zone 1) although option Two will begin to grow to give feedback to the user that the user's wrist joint is approaching Two's area. If the user makes option Two active, he can then move his arm partially into the area of option One (indicated by zone 2) without activating it. This applies to the other menu options as well, Three (zone 3), Four (zone 4), and so on. By providing feedback to the user that the invention still considers his main choice to be menu option One, if the user really wants menu option Two, the highlighting of both will naturally cause the user to move his wrist joint down to make option Two the active option. Training the user to provide unambiguous input is useful in overcoming the noise inherent in a camera-based system.

Looking now at FIG. 2B, the user has raised his wrist joint so that it is slightly above shoulder height. The system interprets this position information as corresponding only to menu option One, and thus, menu option One is the only one that is highlighted.

Activation

Figure 3:
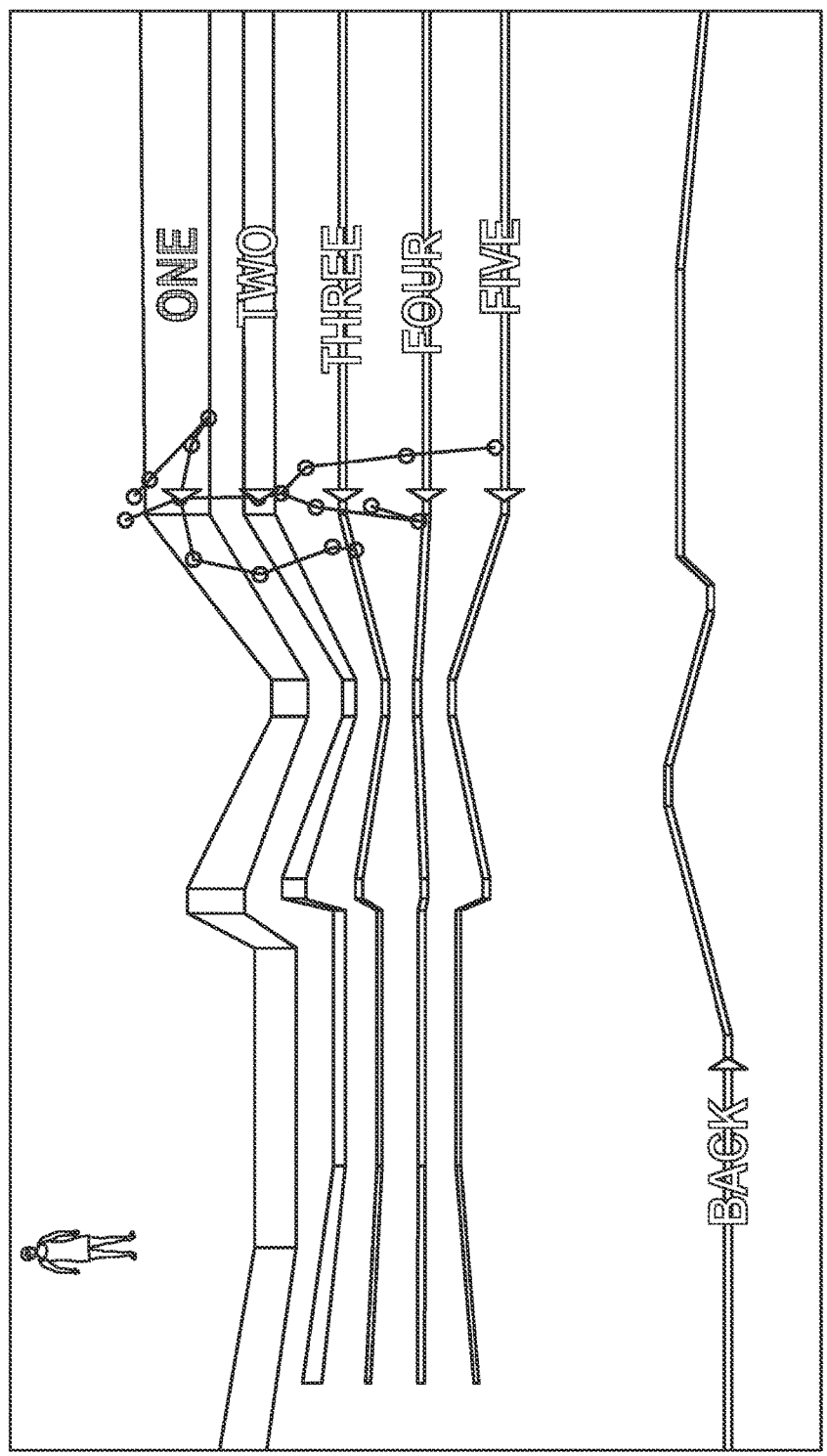
FIG. 3 depicts a menu option in the process of being activated by the user.
Figure 4:
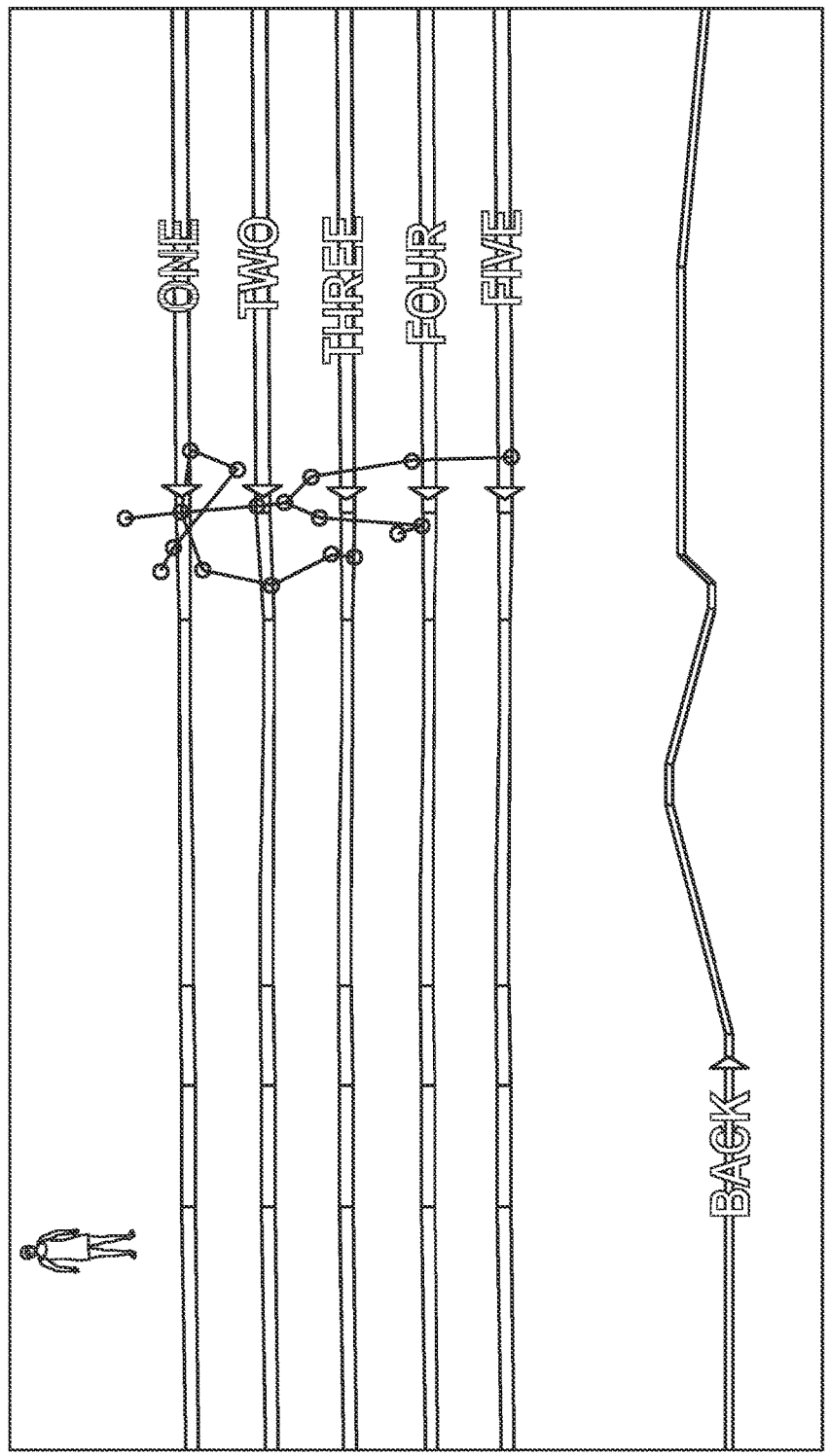
FIG. 4 shows a menu where menu option One has been activated.

Whereas FIGS. 2A and 2B depict menu option highlighting, FIGS. 3 and 4 depict menu option One in the process of being activated by the user. In the example used herein, this is accomplished by the user moving his right hand across his body, from right to left. As shown in FIG. 3, the user has moved his wrist joint leftward from in FIG. 2A and the ribbon for option One is correspondingly being pulled leftward. This activation process can be additionally accompanied by an audible sound with an analog component, i.e., that changes with the x position of the wrist joint such as a stretching noise or whoosh, which gives the user an additional indication that he is activating a particular option.

In some embodiments, activation works by tracing (that is, keeping track of) a continuous horizontal line based on the movement of the user's wrist joint along the x axis. If the user breaks the horizontal motion, the activation is released. If however, the horizontal line reaches a specified length, the motion is counted as a gesture. In one embodiment, the required length is approximately 20 inches. Beneficially, less than that length is counted as a partial gesture, proportional to what percentage of that length was reached.

In one embodiment, the horizontal line for activation is calculated differently than the position determination for the wrist joint during highlighting. Instead of determining if a user's wrist is approaching a particular zone, a series of inter-frame vectors are used to determine the movement of the wrist relative to the shoulder. When the wrist has moved a certain amount, the activation is complete.

In this embodiment, the vector from the right shoulder to the right wrist joint is determined for each frame. The equivalent vector from the previous frame is subtracted from the current vector to produce the inter-frame movement vector (to determine how much the wrist moved from frame to frame, relative to the shoulder). Note that each frame measures the position information of both the wrist and the shoulder, so if the user's shoulder is moving in the same direction as the user's wrist—as would be the case if the user were walking sideways—the inter-frame vector would be 0 since the relationship between the user's shoulder and wrist would not change between frames, even though both may have changed horizontal positions in an absolute coordinate system.

The inter-frame vector is then used to determine if the user has completed activation. Due to potential noise in the movement tracking system, if the magnitude of the inter-frame vector is less than a noise threshold, the current frame is skipped. Similarly, if the inter-frame vector is not within 45 degrees of horizontal right-to-left movement, this frame is considered an "error" and is also skipped. If the vector is the first inter-frame vector after an error, the x coordinate of the user's wrist joint is stored as the "initial wrist position" of the gesture. If this is not the first inter-frame vector after an error, the inter-frame vector is considered an interim inter-frame vector. As each interim inter-frame vector is inspected, the "initial wrist position" is subtracted from the x coordinate of the user's wrist joint to determine if the total distance moved exceeds the threshold distance for the gesture (in some embodiments, this distance is about 20 inches). If it has, then the movement is considered an activation.

Optionally, there can be a threshold on the number of errors that can happen before the gesture is released and the "initial wrist position" is cleared.

In some embodiments, the detection of an activation movement, i.e., right to left, locks the user into a menu option, ignoring additional highlighting motions such as up and down, unless the user releases that option by moving his hand left to right, or dropping it to his side before completing the activation motion. Correspondingly, to fully select an option, a user must move his arm from a given horizontal start position at the right of his body to a given horizontal position at the left of his body; he cannot select an option just by placing his right arm in the position that is left of his body. In some embodiments, the distance required for a horizontal motion to be considered a gesture is approximately 20 inches. In some embodiments, locking a user into the activation process occurs only after he has moved a specific minimum distance of the full motion in the horizontal plane, e.g., his wrist joint has traveled approximately 15% of the required distance, or approximately three inches in the examples provided herein. This prevents false positives and overcomes the noise inherent in motion-tracking systems.

Another means of overcoming false positives or false negatives is to give precedence to movement in one axis over movements in a second axis. For example, in one embodiment, if the user tries to indicate activation by moving his hand in a diagonal from close to his right hip up to his left shoulder, the vertical movement is ignored and the horizontal movement is processed as activation. In other embodiments, the opposite is true—horizontal movement is ignored and the diagonal motion is determined to be a change in menu option highlighting. Advantageously, tolerance is provided such that a combination of vertical and horizontal movements in a horizontal plane are interpreted as horizontal, up to a certain deviation of angle or distance from the plane. For example, in some embodiments, the invention accepts a deviation of plus-or-minus three inches, such that moving the user's arm in a slight diagonal swipe across his body from right to left with a total difference in height of six inches from start to finish is still considered a horizontal movement. The same can be applied to a vertical axis; moving horizontally plus or minus eight inches while the user's moves his arm vertically two feet disregards the horizontal input. This allows leeway in the user's interaction such that he does not have to match the designated horizontal or vertical axis exactly. These distances are by way of example only and may be changed based on the implementer's needs.

In some embodiments, however, movement in one plane can negate the input from another plane. Using the example above, if the user is moving his hand horizontally from right to left, but moves his hand vertically outside the tolerance zone of plus-or-minus three inches for the horizontal plane his hand position is associated with, e.g., he moves his hand vertically ten inches, the horizontal motion (activation) is considered negated and the menu system resets to a release state (or highlighting state if the user moves his hand back to a recognized vertical orientation).

Also in FIG. 3, menu option Two is also somewhat highlighted, but not as prominently as menu option One. As described above, this is indicative that the user's arm position is drifting into the area associated with menu option Two, but is not quite unambiguous enough to indicate that menu option Two is really what the user wants. Rather than highlighting one choice that corresponds to the absolute position of the user's arm, the user interface provides feedback that a user is moving from one menu option to another by "flowing" the highlighting from one menu option to the next according to the movements of the user's appendage. For example, assuming a user's right arm is at his side and is presented with five menu choices arranged vertically, as shown in FIGS. 2A, 2B, 3, and 4, as the user moves his arm up, the menu options are highlighted accordingly, first option Five, then Four, etc., until menu option One is highlighted. If the user drops his arm slightly, then option Two becomes slightly highlighted as well.

FIG. 4 shows the completion of menu option One being completely activated. One is a different color (red) than the other menu options and the ribbons for each option are now all narrow. Additionally, referring to the skeleton, his right wrist joint indicates that the user's wrist joint has crossed his body. Once the option is committed to, in this scenario, if the user moves his right hand up or down, or side to side, no input is registered since he has committed to menu option One and the invention is in the process of moving to the next menu screen or workflow based on the activation (or starting the game, etc, depending on what choice was activated). Beneficially, this prevents the invention from reading a very long gesture as two consecutive gestures. To go back to the menu highlighting and activation area, the user must swipe his left hand from left to right to activate the back functionality.

As stated above, the interpretation of the user's movements is not a binary determination. An option is not fully highlighted or activated until the user commits to the corresponding action. This allows a user to release a choice or change his mind mid-activation. As an example, a user may begin activating a particular menu option by moving his right arm from right to left, decide that he does not want that menu option, move his arm in the opposite direction or release his arm to a neutral horizontal position, then highlight a different menu option by moving vertically, and then use a horizontal swipe from right to left across the body for the activation.

Training users to make unambiguous indications is useful in overcoming noise in the motion-tracking system. To reinforce this training, in one embodiment, a release state is entered if the user does not commit to activation within a certain period of time. But the system cannot punish a user too much for being ambiguous because, in a sense, the limitations of the input mechanism are not the user's fault. Therefore, in other embodiments the invention does not require a horizontal activation movement to be completed within a given time frame. In embodiments where the activation process is based on the horizontal line drawn by the user's wrist joint, the user may complete the action as slowly as he wishes, or even stop midway and then continue, as long as he does not deviate too far in the vertical direction or reverse directions too far, which would trigger a release state (although reversing direction slightly indicates the beginning of a release, thereby giving visual feedback to the user that activation is like a spring). In these embodiments, if the total distance travelled right to left is less than 15% of the target distance, the activation is released.

Tutorial on Highlighting and Activation

Gestures that indicate the user's intent are simple for the user to understand and execute once they have been taught to the user. Gestures can be taught using screens that require the user to execute one or more gestures successfully in order to navigate away from the screen. For example, a tutorial screen for highlighting and activation can require a highlight gesture followed by an activation action in order to navigate away from the screen. Similarly, a tutorial screen for scrolling can require that the user scroll a target item into place in order to navigate away from the screen.

In addition, these screens can provide hints as to what sequence motions the user must make to complete the gesture. For example, in one implementations, there is a tutorial screen for highlighting and activation, where the movement associated with highlighting is vertical movement and the movement associated with activation is horizontal movement (where the right wrist is the appendage being tracked). When the user enters the screen, the screen indicates that the user must first execute a highlight gesture with his right wrist. This can be indicated by projecting the view from the camera onto part, or all, of the screen. In some embodiments, the image is reversed left to right so the result is as if the user is looking into a mirror. Then the skeleton is used to locate the right wrist in three-dimensional space, and this is projected into screen space to align with an image associated with the user's right wrist. An indicator can be drawn on the screen over an image associated with the right wrist, for example a circle can be drawn around the on-screen wrist, or around a cursor that represents the movement of the wrist. In some embodiments another indicator is drawn over the desired destination of the gesture. For example, a circle can be placed on the screen at the desired destination of the right wrist. In some embodiments, the two indicators are drawn in a complementary way that indicates that the two positions are linked. For example, the system might draw an empty circle around the user's wrist and a solid circle at the point where the user should move their wrist, or the an empty circle where the user is supposed to move his wrist, and a solid circle around the user's wrist. In some embodiments, the two indicators are joined in some way that indicates the linkage. For example, a line can be drawn between the wrist and the destination of the wrist. In some embodiments, and arrow can be drawn to indicate the direction the wrist should be moved.

Continuing with the example of highlighting and activation, once the system determines that the user has learned the highlighting action, or once the highlighting action is complete, the tutorial can train the user to provide an activation action. In some embodiments, the indicator for the target of the highlighting gesture, and any lines or arrows between the wrist and the target position, can be removed once the highlighting action is complete. A new indicator for the target of the activation action can be drawn, and connected to the wrist indicator using lines and arrows, as described above. In some embodiments, the indicators change depending on the gesture being trained. For example, the circles in the highlighting portion of the tutorial can be replaced by arrows pointing to the user's left when the user begins the activation portion of the tutorial.

Still considering the example of highlighting and activation, audio and visual feedback can be used to indicate to the user his progress towards completing the gesture. For example, a sound can be played that is modified in pitch or speed, based on the distance between the wrist and the target. For example, as the user's wrist gets closer to the target, the sound can go up in pitch, and as the user's wrist gets farther away from the sound—as would be the case in the user "releasing" the action—the sound could go down in pitch. Similarly, the colors or textures of the indicators or lines or arrows can be modified based on the distance between the wrist and the target, e.g., glow brighter as the wrist approaches completion, get dimmer are the wrist releases.

In some embodiments, a tutorial is a separate interface in the game. In some embodiments, a tutorial is embedded in the game as the first screen in which the user can navigate using gestures.

Variations for Highlighting and Activation

Highlighting and activation are not limited to the embodiments described above. In some embodiments, highlighting can be associated with the horizontal movement of one arm and activation can be associated with the horizontal movement of the other arm. Alternatively, highlighting can be associated with horizontal movement of an arm and activation associated with vertical movement of the same arm. In still other embodiments, activation and highlighting are both vertical actions, each performed using different arms. Highlighting and activation are not limited to just horizontal or vertical movements; other movements can be used to highlight and activate in other embodiments, e.g., diagonal swipes, circular motions, motions of pulling the user's hand towards the user or pushing it away from the user, left-to-right, right-to-left, up-to-down, down-to-up, and the like. The key is to have the highlighting and activation gestures be unambiguously different from one another, such that a movement-tracking system can distinguish between them.

Activation may also be accomplished using a form of "dead reckoning," i.e., accumulating movements over a certain distance threshold until the gesture is completed or released. Specifically, the invention determines a vector of the wrist joint position between two frames (a frame is the data captured at one moment in time; inter-frame calculations—or calculations between two frames—are those involving data from two different moments in time). The distance the wrist joint has moved is compared to a movement threshold, e.g., 2 inches. If the wrist has not moved more than the movement threshold, the inter-frame calculation is discarded (this allows the user to stop gesturing halfway through the motion and then continue the motion to completion). If it has, the angle of the movement is then compared to an angle threshold to determine whether the movement is sufficiently in the expected direction. In one embodiment where activation is right-to-left movement, the angle threshold is plus or minus 45 degrees of the x-axis (where the x-axis is considered to increase from right to left). In other words, the user's wrist is considered to be moving horizontally, right-to-left, if the inter-frame vector has an angle that is within plus or minus 45 degrees of the x-axis. If the wrist movement satisfies the above conditions, the dot product of the inter-frame vector with the unit vector parallel to the x-axis is accumulated until the magnitude of the vector from the first recorded wrist joint position to the last recorded wrist joint position is greater than or equal to the specified length. When it is, the gesture is considered an activation.

In some embodiments, activation is not determined by how far along the x-axis the user's wrist has moved. Instead, the position of the user's activating wrist is used, relative to one of the user's shoulders. Specifically, the shoulder-to-shoulder vector is projected onto the x-axis and a vertical plane, perpendicular to the x axis and running through the user's opposite-side shoulder, is established. In the embodiment where the right hand, moving right to left triggers activation, the position of the right wrist is compared to the plane running through the user's left shoulder. When the user's wrist joint crosses the vertical plane, the active item is activated.

In some embodiments of the invention, animation corresponding to the user's movements is continuous, that is, highlighting flows from one option to another, can run in either direction, e.g., up or down, or left and right for activation, and the movements reflected are in proportion to the user's movements, i.e., quick movement result in quick highlighting changes, slow movements are reflected slowly. In other embodiments, activation can appear as continuous while highlighting can be discrete, i.e., movement is not reflected as flowing from one to the other—instead one option is fully de-highlighted as another is fully highlighted. In still other embodiments, activation can be discrete and highlighting continuous. Combinations not listed herein would be appreciated by one skilled in the art and lack of a description herein does not limit the invention only to the embodiments described.

In some embodiments, activation is determined by the following sequence of steps. In this example, the wrist is used as the activating joint, but any joint in the animation skeleton, or pseudo joint computed from joints in the skeleton, can be used. Although the activation motion described here is horizontal, activation may be vertical, or may be along the z axis or along any linear combination of axes. All that is needed is that the activation motion direction is sufficiently different from the highlighting motion direction.

If no "initial wrist position" has been recorded, it is determined whether the initial wrist position should be recorded by comparing the horizontal position of the wrist to the horizontal position of a reference point, which has some relation to the user's body. If the wrist is further from the midline of the body than the reference point, the three-dimensional wrist position is recorded as the initial wrist position.

In some embodiments, the reference point is based on a joint in the skeleton or a pseudo-joint computed from joints in the skeleton. For example, the reference point may be based on the shoulder joint on the same side of the body as the wrist being measured. In some embodiments, the reference point is a fixed distance away from a joint in the skeleton or pseudo-joint computed from joints in the skeleton. For example, the reference point may be chosen to be 0.2 meters beyond the shoulder joint on the same side as the wrist being measured, in a direction away from the midline of the body.

Alternatively, the distance of the reference point from a joint in the skeleton or a pseudo-joint computed from joints in the skeleton may be based on the distances between two or more joints in the skeleton. For example, the reference point may be chosen to be beyond the shoulder in a direction away from the midline of the body by half of the distance between the shoulders. Specifically, a player with 30 centimeters between his shoulder and midline would have a reference point of 15 centimeters beyond his shoulder (i.e., outside his torso body on the same side). And a player with 24 centimeters between his shoulder and midline would have a reference point of 12 centimeters beyond his shoulder. Advantageously, using a relative measurement to compute the reference point makes the system more robust to users of different sizes.

Once the initial wrist position is recorded, successive frames of data are interpreted by the system. If the wrist joint is still beyond the reference point (away from the midline of body), or the wrist joint is in front of a second reference point by some threshold amount, the steps are continued. In some embodiments, the second reference point is based on the shoulder joint. In other embodiments, the second reference point is based on one or more other joints in the skeleton, such as the hip joint. If the wrist joint is not beyond the first reference point (that is, it is closer to the midline of the body than the reference point), and the wrist joint is not in front of the second reference point, the initial wrist position is cleared and the tracking begins again. In some embodiments the threshold amount is 0.2 meters. Beneficially, this ensures that the user's hand is in front of them, which tends to reduce false positive interpretations of activation.

For each successive frame of data that is received, the overall x displacement from the initial wrist position to the current wrist position is computed. This value is considered the "swipe distance".

Also for each successive frame of data that is received, the absolute value of overall y displacement from the initial wrist position is computed. This is called the "y error." Optionally, the maximum of zero and the overall z displacement from the initial wrist position is computed. This is called the "z error". Beneficially, clamping the minimum z error to zero avoids penalizing the user for drawing their hand towards their body at the end of the swipe, which is a natural motion that some people make.

Overall error, or "anti-swipe distance," is computed by combining the y error and the z error. In some embodiments, the z error is ignored. In some embodiments, the y error and z error are added together to produce the anti-swipe distance. In some embodiments, a fraction of the y error and a fraction of the z error are used to compute anti-swipe distance. The maximum anti-swipe distance since recording the initial wrist position is then recorded.

The "total swipe distance" is computed as the sum of the swipe distance and the maximum anti-swipe distance. If the total swipe distance is less than a first threshold (that accounts for minimal movement, or potential noise in the camera input), this frame is skipped, the initial wrist position is cleared, and the tracking begins again. In some embodiments, this threshold is zero meters. Beneficially, this allows the user to continue the activation gesture as long as he stays within a threshold number of degrees of horizontal. For example, if anti-swipe distance comprised 100% of y error, and the threshold is zero meters, the user only needs to keep his swipe within 45 degrees to the horizontal.

If the total swipe distance is greater than the first threshold, but less than a second threshold (the second threshold being the distance necessary to complete the activation), activation of the highlighted item continues. In some embodiments, the second threshold is 0.2 meters. If the total swipe distance is greater than the second threshold, the highlighted item is considered activated.

Scrolling

In addition to providing highlighting and activation from a menu with a fixed number of options, the invention provides an intuitive means of scrolling to additional menu options. In the scenario where there are more choices than available slots in the main menu, certain spatial positions of the person's appendage are reserved for navigating or "scrolling" quickly to menu options that are outside the range of the ones currently presented (and correspondingly scrolling undesired choices out of the current menu). In one embodiment, this is accomplished similarly to determining which menu option is being highlighted, i.e., a scale vector is created for each side from shoulder to pelvis, that scale is projected onto a vertical axis and depending on the location of the user's wrist joint, the invention determines the appropriate scroll speed. Beneficially, the scroll functionality can be built in conjunction with the menu highlighting by assigning the area normally assigned to the top menu option to the active area indicating a scroll up operation, and assigning the area normally assigned to the bottom menu operation to the active area indicating a scroll down operation. In some embodiments, there is also a hysteresis between the menu options area and the scroll areas, i.e., between the top option and the upward scroll zone, and between the bottom option and the downward scroll zone.

Figure 5A:
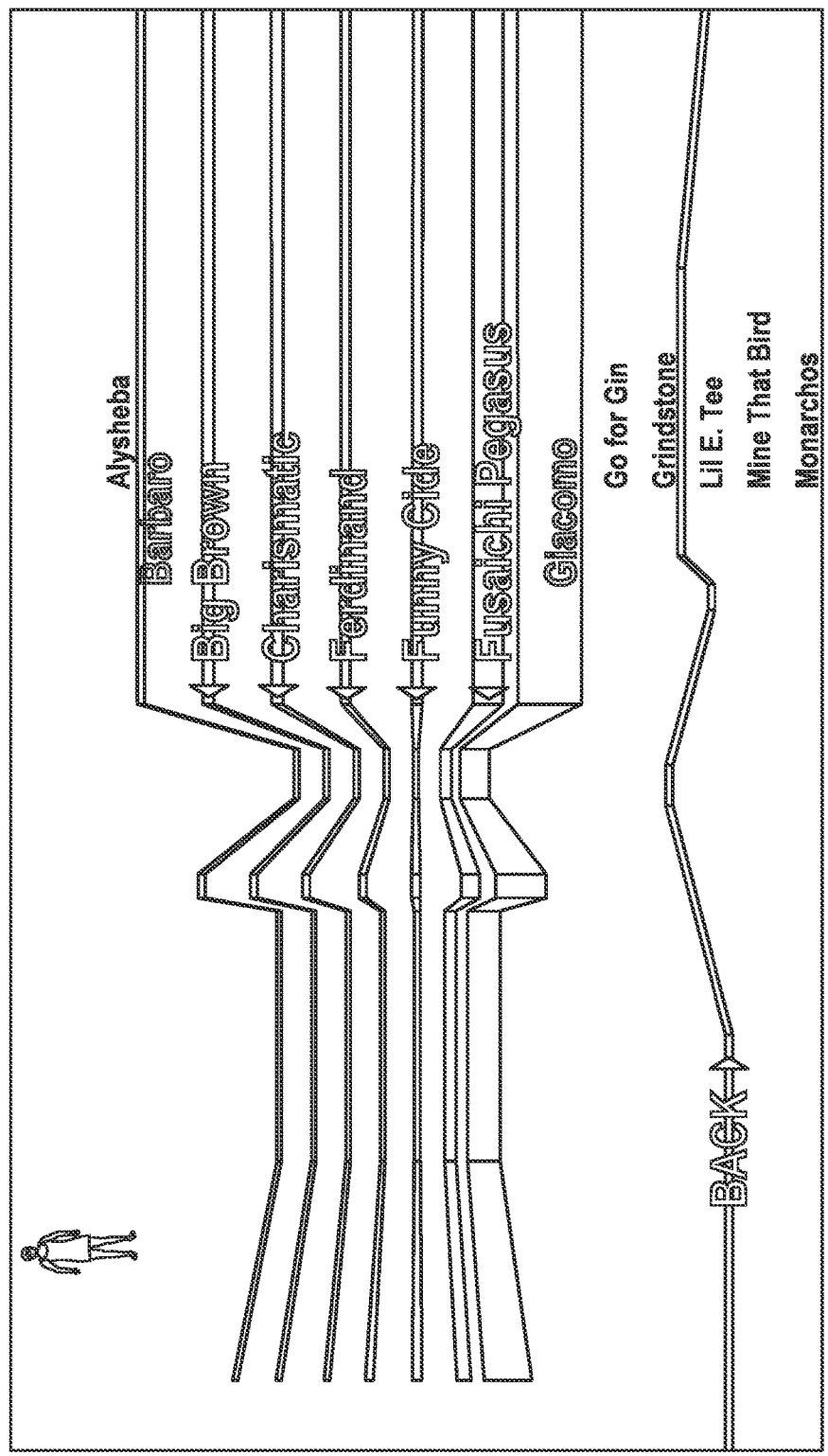
FIGS. 5A and 5B show one implementation of scrolling.
Figure 5B:
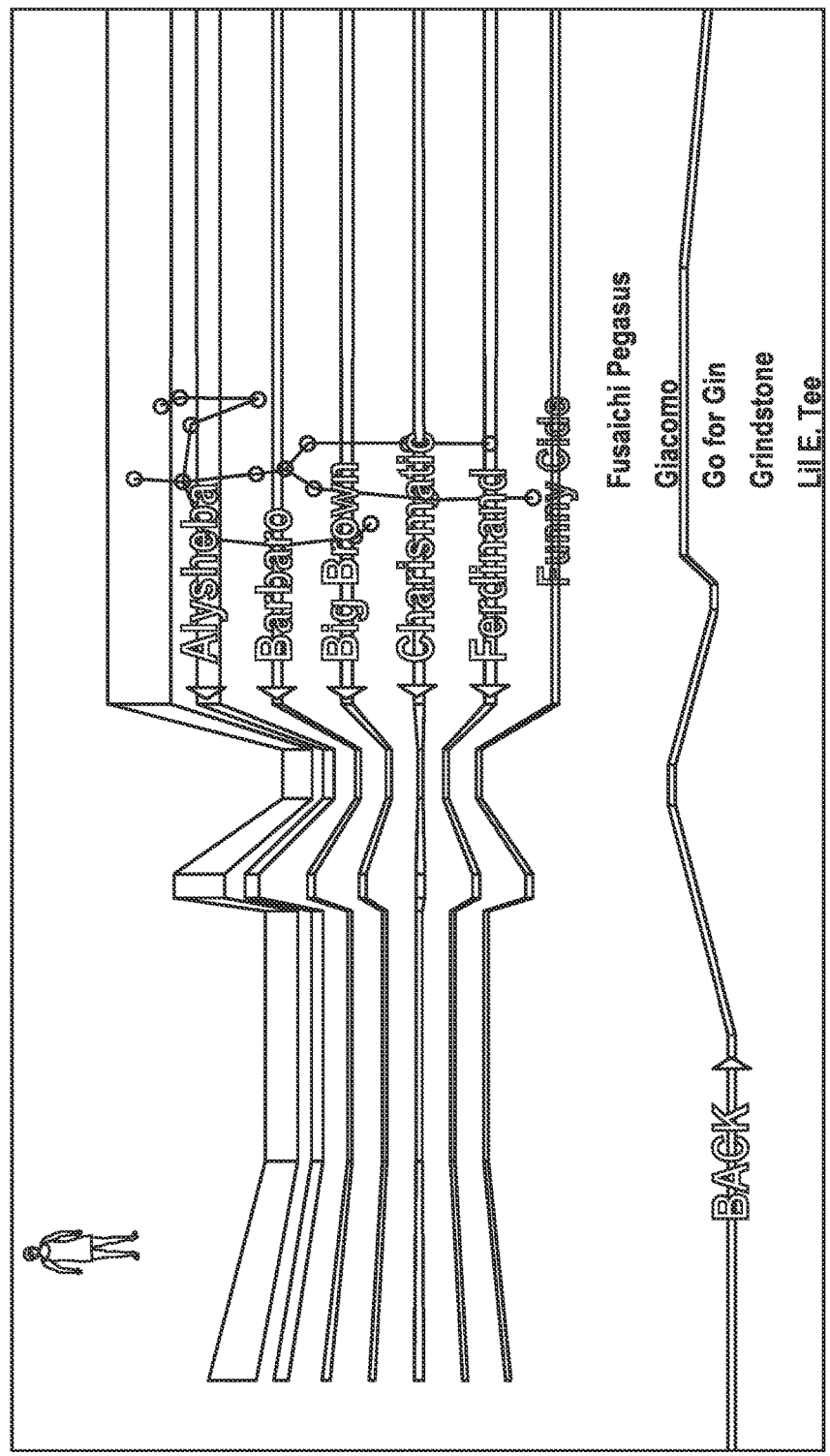

FIG. 5A shows one implementation of scrolling. In FIG. 5, options available to scroll into the menu from the top are "Barbaro" and "Alysheba." The menu options to scroll in from the bottom are "Giacomo," "Go for Gin," "Grindstone," and others. The bottommost menu option is highlighted because the user is scrolling options from beyond the bottom into the menu area. FIG. 5B shows that the user has moved his wrist joint up into the top menu option area and has thus scrolled Barbaro and Alysheba into the menu area.

In one embodiment, the skeletal model range 0.0 to 1.0 described above maps onto the screen space as follows: the value 0.0 is the vertical midpoint of the bottommost menu option and, in the case of a scrolling list, the bottommost menu option is the scroll-down area. Value 1.0 is the vertical midpoint of the topmost menu option, which, in the case of a scrolling list, is the scroll-up area. If the user's wrist joint is exactly at the same height as the shoulder (1.0), the corresponding point in screen space is the midpoint of the topmost menu option.

Scrolling speed can be changed depending on how far outside the 0.0 to 1.0 range the user's wrist joint is. For a scrolling list, in the range 1.0 to 2.0, upwards scroll speed increases (and downward scrolling increases from 0.0 to −1.0). In some embodiments, the speed is increased linearly. For example, the scroll speed ranges from 1 menu option being scrolled into the menu area per second at the shoulder (1.0), to 10 menu options being scrolled in per second at 2.0. In other embodiments, the speed is increased non-linearly. For example, if the wrist joint is in the scrolling area (further than the adjacent option's hysteresis zone), but is less than 1.0, the upward scroll rate would be 1 single-line scroll per second. As the wrist joint ranges from 1.0 to 2.0, however, the scroll rate would increase linearly up to 10 single-line scrolls per second.

Similar principles apply when with respect to scrolling down through options. When the invention determines that the user's arm is at or slightly below the range 0.0, menu options scroll into the menu area at a rate of 1 single-line scroll per second. If the user's wrist joint moves to −1.0, then menu options scroll into the menu area at a rate of 10 single-line scrolls per second.

In both scrolling operations, there is delay built in to ease the user into the scrolling speed. Specifically, in some embodiments, there is a 0.3 second delay between a user's wrist joint entering the active area for scrolling and the actual scrolling of menu options into the menu area. In some embodiments, the scrolling rate gradually increases to the target scrolling rate, rather than jumping directly to the target scrolling rate. This is simply to prevent the user from accidentally crossing the hysteresis threshold and scrolling several options into the menu area that are undesired.

Scroll speed, however, is not limited to having the user reach higher or lower in the scrolling areas. In some embodiments, specific motions can be used to control scroll speed, rather than the position of the user's wrist joint. For example, scroll speed can be controlled by how quickly the user is shaking his hand. In those embodiments, when the user moves his wrist joint into the scroll area, menu options are scrolled slowly into the menu area. If the user shakes his hand while it is in the scroll area, the scrolling speed increases. Correspondingly, if the user then shakes his hand slowly, the scroll speed decreases. Determining how fast a user shakes his hand can be accomplished in a variety of ways. In some embodiments, inter-frame calculations are performed on the wrist—similar to activation—and only repeated movement within adjacent time frames is determined. Alternatively, in other embodiments, several adjacent frames of the RGB camera and/or the depth camera are compared to determine if the position of the wrist joint (or hand joint) changed quickly across the compared frames, e.g., had a position value that oscillated between two areas over the frames.

In some embodiments, audio feedback can be provided during scrolling, reinforcing the scrolling action the user is selecting. In some embodiments, a sound can be played as each item is scrolled into place, thus producing an increasingly rapid sound effect as scrolling speed increases. In other embodiments, sound effects are not produced on a strictly one-for-one basis as each item is scrolled into place, but can be produced in proportion to the scrolling speed. In some embodiments, the sound can be different depending on scroll direction, so that scrolling up can produce a different set of sound effects than scrolling down. In some embodiments, scroll speeds below a threshold value can produce sound effects on a strictly one-for-one basis as each item is scrolled into place, and above the threshold value, sound effects can be produced in proportion to the scrolling speed. In some embodiments, the sound effects played in proportion to the scrolling speed can be produced by playing a sound loop where the speed or pitch or both speed and pitch are proportional to the scrolling speed.

Viewport Scrolling

The advantages provided by the invention for scrolling additional menu items into a menu display can also apply to cases of scrolling of a viewport over any large data set. In one embodiment, a viewport is displayed on the screen, within which visual data is presented. A 3D skeleton is received from the sensor, and a body-relative scale vector is determined by projecting the vector between two joints onto an axis of motion for the viewport. In some embodiments, the two joints are a shoulder joint and a hip joint on the same side of the body. In some embodiments, the two joints are a shoulder joint and a pseudo-joint computed to approximate the center of the pelvis, however the two joints may be any two joints that are roughly aligned with the axis of motion. In some embodiments the axis of motion for the viewport is vertical, but the axis can be horizontal (where the two joints could be the user's shoulder joints) or any other orientation. The scale vector is assigned a range of values based on the two joints. For example, the projected hip joint can be assigned the value 0.0, and the projected shoulder joint can be assigned the value 1.0.

Next, a value for a "pointing joint" from the 3D skeleton is assigned to the range of values on the projected scale vector. In some embodiments the pointing joint is the wrist joint. For example, if the projected scale vector has a value of 0.0 at the right hip and a value of 1.0 at the right shoulder, and the right wrist is held vertically midway between the hip and the shoulder, the value of the wrist joint would be 0.5.

In some embodiments, the value of the pointing joint is compared to the reference point in the range of values of the projected scale vector. In some of these embodiments, the reference point is the midpoint of the range of values. If the value of the pointing joint is above a threshold distance from the reference point, a scrolling action is executed, the threshold distance providing protection from noisy input. In some embodiments, the threshold distance is a fixed distance, for example 5 cm. In some embodiments, the threshold distance is relative to the projected scale vector, for example 0.1 units. In some embodiments, the rate of scrolling is in proportion to the distance from the reference point. In some embodiments, the rate of scrolling is at one of a fixed number of levels, based on fixed threshold distances of the pointing joint from the reference point.

In some embodiments, the direction of scrolling is based on the direction the pointing joint is from the reference point. For example, if the axis of motion is vertical, and the pointing joint is below the reference point, the viewport is scrolled down, and if the pointing joint is above the reference point, the viewport is scrolled up.

In some embodiments, the scrolling mechanism is applied to two axes of motion for the viewport simultaneously. In some of these embodiments, the two axes are substantially perpendicular to one another. For example, simultaneously with the vertical scrolling, horizontal scrolling may be performed. In some embodiments with horizontal scrolling, the two joints used to produce the scale vector are the two shoulders, and the axis of motion is horizontal. In some embodiments with horizontal scrolling, the reference point is the midpoint between the two shoulders. In other embodiments with horizontal scrolling, reference point is the shoulder on the same side of the body as the pointing joint. In some embodiments applying to two axes of motion simultaneously, the pointing joint is the same for both axes of motion. For example, the viewport can be scrolling over map data. The right wrist is the pointing joint for both horizontal and vertical movement. The viewpoint scrolls over the virtual map in a direction corresponding to the movement of the wrist, and in proportion to the body size as measured along each axis independently.

In some embodiments, rather than positions of joints being used directly, the positions of joints are averaged over time to avoid jitter.

Back Navigation

Figure 6:
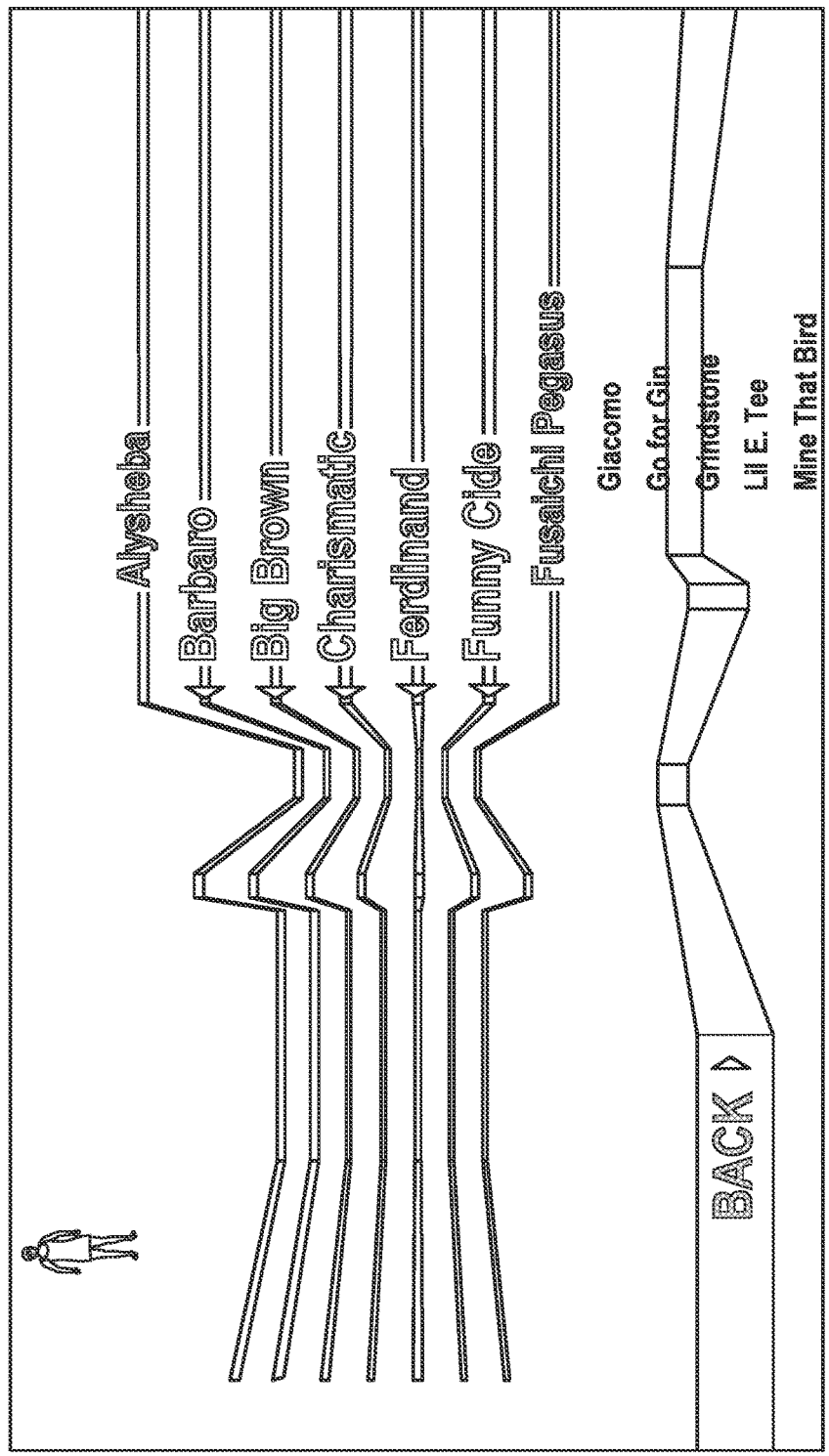
FIG. 6 shows activation of the "back" functionality.

FIG. 6 shows activation of the "back" functionality, where the user has swiped his left hand from left to right. Correspondingly, the Back ribbon is active (BACK is in yellow lettering) and the Back ribbon is being pulled left to right.

Rather than provide a forward-and-back type functionality from one appendage or that has no relation to the appendage used—as is the case with the "cover flow" in Apple, Inc.'s iTunes—segregating the possible inputs provided by each appendage prevents the system from misinterpreting the user's actions. Specifically, in the example case provided, even in the user moves his left hand up parallel to his right hand and moves it vertically, the input from the left hand will not trigger the highlighting or activation of a menu, because those actions are dedicated to the right hand. Similarly, if the user moves his right hand from left to right, it does not trigger a back action because the back action can only be accomplished using the user's left hand.

Beneficially, in some embodiments, the back button is always present in the same area and the user must highlight and activate the back button in the same manner. This provides a consistent user interface to the user, thereby making the user more comfortable with navigating a menu in a manner he is not accustomed to. In these embodiments, the user moves his hand into the area corresponding to the back area, as if the back area were a bottommost menu option on the left side, before he can make a horizontal left-to-right swipe to activate the back functionality.

User Orientation

In any camera-based input system, it can be hard for the user to know where he is in the camera's field of view, or to know how to position himself in a way that is optimal for the camera. One aspect of the invention assists one or more users in determining where they are in the camera's field of view, where they need to move to be more optimally positioned, and which of the users is considered the active player.

In some embodiments, if the camera system does not detect a user in its field of view, an image from the camera can be projected onto part, or all, of the display screen. This image can be reversed right to left to simulate a mirror. If a user enters the field of view of the camera, the image from the camera can be dimmed or removed, and the outline of the user can be presented instead. This outline can be filled in, and various graphical effects such as textures and lighting can be added to hint at the user's position relative to the optimal position, and to indicate whether this user is considered the active player. For example, the active player can be filled-in in white, while the background scene is rendered in monochrome red. If a second user enters the field of view of the camera, that user's outline can be filled in as well, indicating that they are being tracked. If they are not considered the active user, a different set of graphical effects can be used. For example, a non-active user's outline can be filled in with red, or with a texture indicating that they are not considered by the system to be an active user. In this way, any number of users can enter the field of view and be tracked individually, and the active user can be indicated. In cases where there is more than one active user, all active users can be indicated differently from the non-active users, and they can be distinguished as different players by overlaying different icons, using different textures, labeling the figures on the screen, using different colors, or by any other means familiar to one skilled in the art.

In addition to indicating the presence of users and which user or users are active, the system can reinforce optimal positioning by giving feedback to the user when they step to far to one side or the other, or are too high or too low with respect to the camera angle, or are too close or too far from the camera. For example, as a user begins moving too far to the left, the corresponding edge of the on-screen display can begin to pulse a warning color. In some embodiments, the pulsation begins when the extremity of the user furthest toward that edge of the camera's field of view is within a eighth of the size of the camera's field of view along that dimension. For example, if the camera's field of view is two meters wide, pulsation along the left edge of the on-screen display (from the user's perspective) can begin when the user's left wrist is within 0.25 meters of the left edge of the camera's field of view. In some embodiments, a text message instructing the user is presented. In some embodiments, icons or animations are used to instruct the user on proper placement of their body.

Additional Variations

The examples given herein of a user highlighting and selecting menu choices with his right hand and using his left hand to go back can be adapted for left-handed users as well. For example, the left hand is used for menu highlighting (still up and down) and activation (left to right for left-handed users) and the right hand is used for back functionality (moving right to left).

The use of a skeleton system is also not required. Any system that can detect movement can be used. For example, rather than assigning highlighting and activation to only the right arm, the system can interpret any motion up and down as highlighting and any motion from right to left to be activation. In one embodiment, the system can simply detect the closest point on the user's body to the screen and interpret that to be the user's manipulating hand. In any of these embodiments, the techniques described herein can be used for to highlight any type of menu item, e.g., check boxes, radio buttons, drop downs, and the like.

In some embodiments, execution of game software limits the game platform 120 to a particular purpose, e.g., playing the particular game. In these scenarios, the game platform 120 combined with the software, in effect, becomes a particular machine while the software is executing. In some embodiments, though other tasks may be performed while the software is running, execution of the software still limits the game platform 120 and may negatively impact performance of the other tasks. While the game software is executing, the game platform directs output related to the execution of the game software to a display, thereby controlling the operation of the display. The game platform 120 also can receive inputs provided by one or more players, perform operations and calculations on those inputs, and direct the display to depict a representation of the inputs received and other data such as results from the operations and calculations, thereby transforming the input received from the players into a visual representation of the input and/or the visual representation of an effect caused by the player.

The above-described techniques can be implemented in digital electronic circuitry, or in computer hardware, firmware, software, or in combinations of them. The implementation can be as a computer program product, i.e., a computer program tangibly embodied in a machine-readable storage device, for execution by, or to control the operation of, data processing apparatus, e.g., a programmable processor, a computer, a game console, or multiple computers or game consoles. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or game console or on multiple computers or game consoles at one site or distributed across multiple sites and interconnected by a communication network.

Method steps can be performed by one or more programmable processors executing a computer or game program to perform functions of the invention by operating on input data and generating output. Method steps can also be performed by, and apparatus can be implemented as, a game platform such as a dedicated game console, e.g., PLAYSTATION® 2, PLAYSTATION® 3, PSP® or PSP2® manufactured by Sony Corporation; WII™, NINTENDO 3DS, NINTENDO DS®, NINTENDO DSi™, or NINTENDO DS LITE™ manufactured by Nintendo Corp.; or XBOX® or XBOX 360® manufactured by Microsoft Corp. or special purpose logic circuitry, e.g., an FPGA (field programmable gate array) or an ASIC (application-specific integrated circuit) or other specialized circuit. Modules can refer to portions of the computer or game program and/or the processor/special circuitry that implements that functionality.

Processors suitable for the execution of a computer program include, by way of example, special purpose microprocessors, and any one or more processors of any kind of digital computer or game console. Generally, a processor receives instructions and data from a read-only memory or a random access memory or both. The essential elements of a computer or game console are a processor for executing instructions and one or more memory devices for storing instructions and data. Generally, a computer or game console also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer or game console having a display device, e.g., a CRT (cathode ray tube) or LCD (liquid crystal display) monitor, a television, or an integrated display, e.g., the display of a PSP® or Nintendo DS. The display can in some instances also be an input device such as a touch screen. Other typical inputs include a camera-based system as described herein, simulated instruments, microphones, or game controllers. Alternatively input can be provided by a keyboard and a pointing device, e.g., a mouse or a trackball, by which the user can provide input to the computer or game console. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer or game console having a graphical user interface through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing/gaming system can include clients and servers or hosts. A client and server (or host) are generally remote from each other and typically interact through a communication network. The relationship of client and server arises by virtue of computer programs running on the respective computers and having a client-server relationship to each other.

The invention has been described in terms of particular embodiments. The alternatives described herein are examples for illustration only and not to limit the alternatives in any way. The steps of the invention can be performed in a different order and still achieve desirable results. Other embodiments are within the scope of the following claims.

The invention claimed is:

1. A method, executed on a game platform, for interacting with a menu system displayed on a display in communication with the game platform, based on input received via a sensor, the method comprising:
   displaying a menu on the display comprising menu items displaced axially along a display axis having a first direction;

receiving a 3D skeleton having a joint associated with a corresponding reference point on a player's body;
determining a position for the joint along a linear gesture axis that is parallel to the first direction, where the joint is associated with a highlighting action;
highlighting a menu item based on the position of the joint along the linear gesture axis;
determining a plurality of vectors, wherein each vector represents a movement of the joint defined by a difference in position of the joint between a pair of two consecutive frames;
identifying at least some vectors within the plurality of vectors that satisfy one or more conditions, wherein the one or more conditions include a condition that the at least some vectors each have a length greater than a predetermined minimum movement threshold;
summing at least a component of the at least some vectors, while not summing other vectors in the plurality of vectors that do not satisfy the one or more conditions;
determining that the sum of the at least a component of the at least some vectors is greater than a specified length; and
activating the highlighted menu item in response to the determination that the sum is greater than the specified length.

2. The method of claim 1, further comprising assigning a set of position values to each menu item.

3. The method of claim 1, wherein the one or more conditions further include a condition that the at least some vectors are each within an angle threshold of perpendicular to the first direction.

4. The method of claim 1, wherein the highlighted menu item is activated only when the joint moves less than a certain distance in the first direction.

5. The method of claim 1, further comprising:
determining that the joint has moved a minimum distance that is less than the specified length along a second direction perpendicular to the first direction;
in response to the determination that the joint has moved the minimum distance along the second direction, locking the highlighted menu item so that changes in the position of the joint along the linear gesture axis do not change the highlighted menu item.

6. The method of claim 1, further comprising:
assigning a position value to a scroll area;
determining that the scroll area is active based on the position of the joint and the position value of the scroll area; and
when the scroll area is active, scrolling at least one different menu item onto the display.

7. The method of claim 1, further comprising:
determining that the joint has moved a minimum distance that is less than the specified length along a second direction perpendicular to the first direction;
in response to the determination that the joint has moved the minimum distance along the second direction, altering the appearance of the highlighted menu item to indicate a beginning of an activation action.

8. The method of claim 1, wherein at least some of the at least some vectors that satisfy the one or more conditions are associated with non-consecutive pairs of frames.

9. A processor-based system for interacting with a menu based on input received via a sensor system, the system comprising:
the sensor system configured to sense input from a player, the sensor system in communication with a game platform having a processor;
a display in communication with the game platform;
the processor in the game platform being configured to:
display a menu on the display comprising menu items displaced axially along a display axis having a first direction;
receive a 3D skeleton having a joint associated with a corresponding reference point on a player's body;
determine a position for the joint along a linear gesture axis that is parallel to the first direction, where the joint is associated with a highlighting action;
highlight a menu item based on the position of the joint along the linear gesture axis;
determine a plurality of vectors, wherein each vector represents a movement of the joint defined by a difference in position of the joint between a pair of two consecutive frames;
identify at least some vectors within the plurality of vectors that satisfy one or more conditions, wherein the one or more conditions include a condition that the at least some vectors each have a length greater than a predetermined minimum movement threshold;
sum at least a component of the at least some vectors, while not summing other vectors in the plurality of vectors that do not satisfy the one or more conditions;
determine that the sum of the at least a component of the at least some vectors is greater than a specified length; and
activate the highlighted menu item in response to the determination that the sum is greater than the specified length.

10. The system of claim 9, wherein the processor is further configured to assign a set of position values to each menu item.

11. The system of claim 9, wherein the processor is further configured to:
determine that the joint has moved a minimum distance that is less than the specified length along a second direction perpendicular to the first direction;
in response to the determination that the joint has moved the minimum distance along the second direction, alter the appearance of the highlighted menu item to indicate a beginning of an activation action.

12. The system of claim 9, wherein the one or more conditions further include a condition that the at least some vectors are each within an angle threshold of perpendicular to the first direction.

13. The system of claim 9, wherein the processor is configured to activate the highlighted menu item only when the joint moves less than a certain distance in the first direction.

14. The system of claim 9, wherein the processor is further configured to:
determine that the joint has moved a minimum distance that is less than the specified length along a second direction perpendicular to the first direction;
in response to the determination that the joint has moved the minimum distance along the second direction, lock the highlighted menu item so that changes in the position of the joint along the first direction do not change the highlighted menu item.

15. The system of claim 9, wherein the processor is further configured to:

assign a position value to a scroll area;
determine that the scroll area is active based on the position of the joint and the position value of the scroll area; and
when the scroll area is active, scroll at least one different menu item onto the display.

16. The system of claim 9, wherein at least some of the at least some vectors that satisfy the one or more conditions are associated with non-consecutive pairs of frames.

\* \* \* \* \*